(12) United States Patent
Masiello et al.

(10) Patent No.: US 7,389,209 B2
(45) Date of Patent: Jun. 17, 2008

(54) VALUING AND OPTIMIZING SCHEDULING OF GENERATION ASSETS FOR A GROUP OF FACILITIES

(75) Inventors: Ralph D. Masiello, Solebury, PA (US); Mihaela Manoliu, Mamaroneck, NY (US); Petter Skantze, New York, NY (US)

(73) Assignee: Sungard Energy Systems Inc., New York, NY (US)

( * ) Notice: Subject to any disclaimer, the term of this patent is extended or adjusted under 35 U.S.C. 154(b) by 962 days.

(21) Appl. No.: 10/336,542

(22) Filed: Jan. 2, 2003

(65) Prior Publication Data

US 2004/0006502 A1      Jan. 8, 2004

Related U.S. Application Data

(60) Provisional application No. 60/377,709, filed on May 3, 2002.

(51) Int. Cl.
  *G06F 7/60* (2006.01)
  *G06F 17/10* (2006.01)
  *G06F 17/00* (2006.01)
  *G06F 17/50* (2006.01)

(52) U.S. Cl. ............................. 703/2; 706/927; 705/7; 705/8

(58) Field of Classification Search ............... 705/7–11, 705/412, 36 R, 37, 35, 400; 700/286–291, 700/295; 703/2, 3, 4; 706/925, 926
See application file for complete search history.

(56) References Cited

U.S. PATENT DOCUMENTS

| | | | |
|---|---|---|---|
| 5,524,077 A | 6/1996 | Faaland et al. | 364/402 |
| 5,621,654 A * | 4/1997 | Cohen et al. | 700/287 |
| 5,692,233 A | 11/1997 | Garman | 705/36 |
| 5,819,237 A | 10/1998 | Garman | 705/36 |
| 5,926,822 A | 7/1999 | Garman | 707/503 |

(Continued)

FOREIGN PATENT DOCUMENTS

JP        406168107 A  *   6/1994

OTHER PUBLICATIONS

Arguello-Serrano et al. Nonlinear Control of a Heating, Ventilating, and Air Conditioning System with Thermal Load Estimation; IEEE Transactions on Control Systems Technology, vol. 7, No. 1, Jan. 1999; pp. 56-63.*

(Continued)

*Primary Examiner*—Igor N. Borissov
(74) *Attorney, Agent, or Firm*—Woodcock Washburn LLP

(57) ABSTRACT

The present invention provides methods and systems for determining anticipated profit from facilities such as electrical power generation facilities, for determining values for assets based on profitability of facilities, and for determining optimal operational scheduling options for facilities. Methods and systems are provided which utilize a dynamic programming algorithm and a decision tree based model in which one or more operating constraints are implicitly modeled, facilitating computational tractability. Additionally, methods and systems are provided that utilize a dynamic programming algorithm and a decision tree based model that accounts for a combined effect of price paths with specified uncertainty as well as operational constraints. Furthermore, methods and systems are provided that address profitability, valuation, and scheduling in relation to a group, or portfolio, of facilities, accounting for liquidity factors as well as group, or global, constraints.

26 Claims, 55 Drawing Sheets

U.S. PATENT DOCUMENTS

| | | | | |
|---|---|---|---|---|
| 5,933,815 | A * | 8/1999 | Golden | 705/36 R |
| 5,974,403 | A | 10/1999 | Takriti et al. | 705/412 |
| 6,021,402 | A | 2/2000 | Takriti | 705/412 |
| 6,122,623 | A | 9/2000 | Garman | 705/36 |
| 6,157,874 | A | 12/2000 | Cooley et al. | 700/295 |
| 6,185,483 | B1 | 2/2001 | Drees | 700/295 |
| 6,223,101 | B1 | 4/2001 | Sakamoto et al. | 700/276 |
| 6,321,207 | B1 | 11/2001 | Ye | 705/8 |
| 6,408,262 | B1 * | 6/2002 | Leerberg et al. | 703/2 |
| 6,718,291 | B1 * | 4/2004 | Shapiro et al. | 703/2 |
| 6,879,974 | B1 * | 4/2005 | Ninomiya et al. | 706/62 |
| 7,065,475 | B1 * | 6/2006 | Brundobler | 703/2 |
| 2002/0010667 | A1 * | 1/2002 | Kant et al. | 705/35 |
| 2005/0262013 | A1 * | 11/2005 | Guthner et al. | 705/38 |

OTHER PUBLICATIONS

Tseng, Chung-Li, et al., Short-Term Generation Asset Valuation, *Proceedings of the 32nd Hawaii International Conference on System Sciences*, 1999.

Gardner, Doug, et al., Valuation of Power Generation Assets : A Real Options Approach, *Algo Research* Quarterly, vol. 3, No. 3, Dec. 2000.

Clewlow, Les, The Challenges of Pricing and Risk Management of Energy Derivatives, *Lacima Group, Ltd.* Nov. 27, 2001.

Bjorgan, Roger, et al., Financial Risk Management in a Competitive Electricity Market *University of Washington*, Seattle, WA, *Department of Electronics*.

Skantze, Petter, et al. Valuation of Generation Assets with Unit Commitment Constraints under Uncertain Fuel Prices *Massachusetts Institute of Technology Energy Laboratory Paper* No. MIT EL 006-006, Nov. 2000.

Raikar, Santosh, et al. Interruptible Physical Transmission Contracts for Congestion Management *Massachusetts Institute of Technology Energy Laboratory Paper* No. MIT EL 01-010 WP, Feb. 2001.

Gozum, Ozge Nadia, Decisions Tools for Electricity Transmission Service and Pricing: A Dynamic Programming Approach *Thesis Document at the Massachusetts Institute of Technology*, May 16, 2001.

* cited by examiner

2700 determine liquidity adjusted anticipated optimal schedules for a group of facilities

2904 determine an anticipated profitablility of the group of facilities over a period of time, based on the schedules

2906 determine a value of an asset, based on the profitability

| Admissible Output Levels (MW) | Associated Average Heat Rate (Btu/KWh) |
|---|---|
| $Q_{Min}$ = 20 | 8000 |
| 40 | 7700 |
| 60 | 7550 |
| 80 | 7400 |
| $Q_{Max}$ =100 | 7600 |

| Elect. Price | $18.5 | $21.2 | $22.4 |
| --- | --- | --- | --- |
| Gas Price | $2.35 | $2.32 | $2.28 |
| | hour 1 | hour 2 | hour 3 |

| | Hour of Operation | Output/runtime | High Bound | Low Bound |
|---|---|---|---|---|
| 32 | 1/2/2002 | 0 | 1 | 19.0643871226 | 17.071626605 |
| 32 | 1/2/2002 1:00:00 AM | 0 | 2 | 18.3578764638 | 14.720635287 |
| 32 | 1/2/2002 2:00:00 AM | 0 | 3 | 18.5506811356 | 13.3203619309 |
| 32 | 1/2/2002 3:00:00 AM | 0 | 4 | 19.3501052017 | 12.4420387703 |
| 32 | 1/2/2002 4:00:00 AM | 0 | 5 | 12.9760937644 | 12.2791980054 |
| 32 | 1/2/2002 5:00:00 AM | 0 | 5 | 15.8360074841 | 14.1807027388 |
| 32 | 1/2/2002 5:00:00 AM | 50 | 1 | 14.9855168313 | 14.1807027388 |
| 32 | 1/2/2002 6:00:00 AM | 0 | 1 | 42.7320266626 | 19.7295815977 |
| 32 | 1/2/2002 6:00:00 AM | 0 | 5 | 23.2830458244 | 19.7295815977 |
| 32 | 1/2/2002 6:00:00 AM | 50 | 1 | 20.849317735 | 19.7295815977 |
| 32 | 1/2/2002 6:00:00 AM | 80 | 1 | 20.849317735 | 19.7295815977 |
| 32 | 1/2/2002 7:00:00 AM | 0 | 1 | 40.916369076 | 16.9166173969 |
| 32 | 1/2/2002 7:00:00 AM | 0 | 2 | 40.916369076 | 16.9166173969 |
| 32 | 1/2/2002 7:00:00 AM | 0 | 5 | 21.0964517701 | 16.9166173969 |
| 32 | 1/2/2002 7:00:00 AM | 50 | 1 | 18.8912837845 | 16.9166173969 |
| 32 | 1/2/2002 7:00:00 AM | 80 | 1 | 18.8912837845 | 16.9166173969 |
| 32 | 1/2/2002 7:00:00 AM | 110 | 1 | 17.8767060701 | 16.9166173969 |
| 32 | 1/2/2002 8:00:00 AM | 0 | 1 | 45.1440869657 | 16.7135755339 |

4400

4500

4600

4700

4800

4900

5000

5100

5200

5300

5400

5500

VALUING AND OPTIMIZING SCHEDULING OF GENERATION ASSETS FOR A GROUP OF FACILITIES

CROSS-REFERENCE TO RELATED APPLICATIONS

The present application claims priority to U.S. Provisional Application Ser. No. 60/377,709, filed May 3, 2002, and entitled, "Generation, Valuation and Dispatch Model," which application is hereby incorporated herein by reference in its entirety.

Additionally, the present application is related to the U.S. Application titled, "Valuing and Optimizing Scheduling of Generation Assets," filed on even date herewith, which application is hereby incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

1. Field of the Invention

The present invention relates to methods and systems for operational scheduling of facilities, such as electrical energy generation facilities, and valuation of facilities and assets such as generation assets, and more particularly, to methods and systems for determining optimal operational scheduling for facilities, for determining anticipated profitability of facilities, and for determining values of assets such as generation assets.

2. Description of the Related Art

Electrical power generation facilities generally operate to convert fuel into electrical energy for profit. As such, the facilities are a type of energy generation asset, and their value at a given time is based on their anticipated profitability. Investing and trading in generation assets is possible through certain forms of financial instruments, such as real option contracts, whose value can be linked to a generation facility (or facilities), its operation, or the power produced by the facility. Particularly, the value of such instruments is often associated with the profitability of operation of a facility over a specified period of time. Such profitability can be affected by many factors, including price paths for fuel and other relevant commodities, as well as scheduling of operation of the facility, including, for example, generation rate increases and decreases made during the period. A profitability assessment should naturally assume that an attempt will be made, throughout the period of time, to schedule operation of the facility so as to optimize its profitability. Of course, determining optimal scheduling of a facility is important in its own right for scheduling decision-making, as well as being necessary for accurate valuation of generation assets and associated financial instruments. The important tasks of determining optimal scheduling as well as valuing generation facilities pose difficult challenges, due in part to the large number of interdependent variables involved, as well as the uncertainties of such things as relevant future price paths.

Optimal scheduling of a generation facility over a period of time is influenced by many variable factors. One set of factors that can influence optimal scheduling includes prices at various times during the period, or price paths, of commodities used by the facility at a rate dependent on the rate of generation of the facility. For example, for a fuel powered electrical generation facility, the market price path for fuel over the period of time can influence optimal scheduling. In addition, the market price path, over the period of time, for electricity, as generated by the facility, can also influence optimal scheduling.

Another set of factors can include constraints associated with operation of the facility. For example, electrical power generation facilities are generally subject to physical constraints including maximum and minimum generation rates while the facility is operating, maximum and minimum operating times, or run-times, and maximum generation rate increases and decreases per unit of time (herein termed, respectively, maximum ramp up and ramp down rates). In addition, other constraints can relate to costs associated with specific scheduling actions or conduct under specific circumstances, such as start-up costs and shutdown costs. For example, start-up costs can include the cost of a necessary quantity of a certain type of fuel used for initiation of operation, which can be different and more expensive than a primary operation fuel. The effect of these various constraints on formulating optimal scheduling is sometimes referred to as the "unit commitment" problem.

Further, in some situations, it is attempted to optimize the schedules of, and value, each of a group of facilities, with constraints that apply to the group as a whole, such as, for example, a cumulative generation quota applying to the sum total generation output of the group. In addition, in some group optimization and valuation situations, price paths for commodities, such as fuel and electricity, can be influenced by the operation of each facility in the group, which is sometimes referred to as a liquidity problem. In such cases, optimal scheduling of each facility can depend in part on operation of each of the other facilities in the group.

As demonstrated by the above, optimal scheduling of one or more generation facilities over a period of time requires informed decision-making over the period of time, taking into account any relevant prices at particular times throughout the period, e.g. price paths, as well as constraints as they apply at particular times throughout the period, including operating limits and costs associated with certain operating actions. Further complicating matters, some constraints can themselves be dependent on previous operation scheduling. It must also be noted that optimal scheduling at a particular time during the period can, and must, take into account circumstances as they have developed prior to, and exist at, that particular time, since an actual operator would be aware of such circumstances. Optimal scheduling at a given time further requires taking into account the current forecasts and probabilities as to relevant future circumstances, including relevant price paths, of which an operator would also be aware. Herein, "optimal scheduling" includes scheduling which is optimized in the sense of an actual operator making optimal decisions over the period of time.

Given the complexity of determining optimal scheduling, determining an anticipated profitability is naturally also complex. To assess the profitability, and hence the value, of a generation facility over a future period of time, optimal scheduling decision-making is to be assumed over that period of time. Optimal scheduling over a period of time, however, can only be realistically assessed by considering, at various different times throughout the period of time, the information available to, and the circumstances confronting, an operator at each of the various different times, such as, for example, at each hour interval or day interval. To assume that an operator has exact knowledge of future circumstances is, of course, unrealistic, just as it is unrealistic to assume that an operator is unaware of past and present circumstances. As such, to be accurate, assessments of optimal scheduling over a period of time, from the point of view of an operator during the period of time, must take into account, at various particular times over the period, optimal scheduling decision-making at each of various times, assuming knowledge of present circumstances by the operator and projections regarding future circumstances, as such circumstances and decision-making evolves throughout the period.

It is well recognized in the art that valuation and optimization of scheduling of facilities such as electrical power generation facilities present important and complex challenges, and numerous approaches and techniques have been developed to attempt to address such problems. Some such approaches apply financial instrument forms or financial modeling techniques to the power generation context. For example, some approaches, such as spark spread option modeling, use stochastic, or probabilistic, techniques to model relevant price paths. Some varieties, such as enhanced or "swing" spark spread option modeling, used in European style securities, can include the use of Monte Carlo simulations to randomly generate data such as relevant price paths in accordance with a specified forecast and probabilistic characteristics.

While spark spread option modeling takes into account forecasts and specified uncertainty with regard to such factors as relevant price paths, facility constraints, examples of which are discussed above, are not modelable using such techniques. In decision making with regard to trading in financial instruments whose value depends on the value of a generation facility, spark spread option modeling is sometimes used in combination with "hedging" strategies. Hedging strategies, which can involve trading in certain financial instruments such as futures contracts, are used to attempt to reduce risk when investing in markets involving a specified estimated or forecasted uncertainty. Hedging strategies, however, do not remedy or even address the accuracy, and therefore the degree of value, of the underlying technique by which values of instruments are calculated. Spark spread option modeling, whether or not used with hedging, does not take into account relevant constraints, and, as such, cannot provide accurate valuation models for generation facilities and other facilities, nor can such modeling techniques be used to optimize scheduling.

Another category of approaches used in the context of generation facility valuation and scheduling optimization is traditional dynamic programming. In this context, traditional dynamic programming techniques typically use a backward iteration algorithm, sometimes through a mathematical decision tree, to attempt to optimize generation facility scheduling over a period of time divided into a number of time intervals. In combination with input constraints and forecasted price paths, traditional dynamic programming can be used to attempt to value generation facilities and financial instruments associated therewith. Constraints are typically modeled by including a variable in the dynamic programming optimization formulas to represent the constraint. By dividing a time period into a discrete number of evaluated intervals rather than evaluating the time period as a continuous period, the potentially formidable mathematics involved in traditional dynamic programming can be made somewhat less intractable. Even with such interval division, however, as the number of explicitly modeled constraints grows, the mathematics become increasingly complex at a rate geometrically proportional to the number of explicitly modeled variables. This complexity can be explained by the fact that each explicitly modeled variable increases the dimensionality of a theoretical mathematical "surface" on which is plotted the range of possible scenarios contemplated by the traditional dynamic programming method. For this reason, the computational unmanageability of explicitly modeling many constraints is known as the "curse of dimensionality."

Some traditional dynamic programming techniques use, as input, mathematically formulated constraints and a specified price path for fuel and electricity, and use backward iteration to attempt to find a profit-maximizing operation schedule. Traditional dynamic programming, however, is deterministic in that it fails to take into account uncertainty with regard to relevant future price paths. Traditional dynamic programming effectively attempts to determine an optimal schedule for a facility assuming perfect and sure knowledge of future prices, which is, of course, unrealistic.

In addition, existing techniques may not take into account certain types of heat rate functions, or heat rate curves. A heat rate curve can specify the efficiency of a generation facility as a function of the facility's generation rate. Existing techniques may only be capable of handling convex or monotonically increasing heat rate curves. In reality, however, generators are often characterized by decreasing heat rate curves.

In recognition of the incomplete adequacy of spark spread option modeling and of traditional dynamic programming by themselves, methods have been developed which attempt to combine the stochastic price path modeling advantages of spark spread option modeling with the backward iterative scheduling optimization approach of dynamic programming. One such method proceeds as follows. First, based on specified forecasted price paths, traditional dynamic programming is used to generate what is considered to be an optimal operation schedule over a period. Next, given a specified uncertainty about the forecasted price path, a set of possible price paths are generated, by Monte Carlo simulation or otherwise. Next, the previously determined optimal schedule is applied to each of the price path possibilities. Profit or loss for the facility is calculated for each price path scenario, and may be calculated by summing profit or loss at each of the time intervals. Averaging profit or loss over all of the scenarios yields an anticipated profitability over the period.

One problem with the foregoing method, however, is that the same originally determined schedule is applied in each price path scenario. In reality, the determined schedule has only been optimized for the single original forecasted price path scenario. As such, the schedule is not optimized for the various generated price path scenarios. In reality, for each different price path scenario, an operator would have the opportunity to adjust scheduling throughout the period, based on evolving price paths or other variables, to attempt to maximize profit in that particular scenario. By effectively assuming an operator who is oblivious to changing price paths and other variables, this method undervalues the profitability of the facility. Ultimately, therefore, using a set schedule over various price path scenarios is unrealistic and inaccurate.

Another method which attempts to combine the advantages of spark spread option based modeling and dynamic programming proceeds as follows. First, based on a forecasted price path and an anticipated specified uncertainty with regard to the price path, a set of possible price paths are generated, using Monte Carlo simulations or otherwise. Next, for each price path scenario, traditional dynamic programming is used to determine what is considered to be an optimal schedule for each price path scenario. Next, profit or loss is determined for each price path scenario using, for each price path scenario, the optimal schedule for that particular scenario.

One problem with the foregoing method is that, for each different price path scenario, the traditional dynamic programming technique used models a situation in which the exact price paths for the entire period are known throughout the entire period. As such, the foregoing method effectively assumes that the operator has complete and exact knowledge of future price paths. By using unrealistically optimized schedules, the foregoing method overvalues the profitability of the facility over the period of time.

In summary, despite the above described attempts at combining the advantages of both traditional dynamic programming and spark spread option modeling, none of the existing methods for valuation and optimization of scheduling of generation facilities succeeds in providing accurate results. In reality, an operator has knowledge of past and present circumstances, including past and present scheduling as well as past and present price paths. With regard to anticipated future price paths, the best an operator can do is to use presently available information for stochastic projections, or forecasts, of price paths or other variables, which can include, for example, a forecasted price path and a specified projected level of uncertainty over time with regard thereto. Such stochastic projections will of course change at each successive time of evaluation, as price paths and scheduling paths continually evolve. Consequently, evaluation regarding an optimal scheduling action at each successive interval must be determined based on the exact price path and scheduling path knowledge as it has evolved up to that time, combined with the stochastic projection information available at that time.

References in this and related technical areas are representative of the state of the art as described above. U.S. Pat. No. 5,974,403, issued on Oct. 26, 1999 to Takriti et al., discusses a computerized method for forecasting electrical power spot price and for forecasts related to power trading. Employing stochastic price path forecasting techniques and discussing hedging techniques, U.S. Pat. No. 5,974,403 does not adequately model various dynamic scheduling factors.

U.S. Pat. No. 6,021,402, issued on Feb. 1, 2000 to Takriti, discusses scheduling for generators for risk management purposes. Multiple price path scenarios are generated, and decision-tree based dynamic programming is applied to optimize scheduling in each scenario.

The article, "Interruptible Physical Transmission Contracts for Congestion Management," Santosh Raikar and Marija Ilic, Energy Laboratory Publication No. MIT EL 01-010WP, Energy Laboratory, Massachusetts Institute of Technology, February 2001, discusses trinomial tree based traditional dynamic programming techniques as applied to transmission contracts, as well as enhanced spark spread option stochastic techniques, but does not adequately model various constraints in a dynamic, stochastic context.

The article, "Valuation of Generation Assets with Unit Commitment Constraints under Uncertain Fuel Prices," Petter Skantze, Poonsaeng Visudhiphan, and Marija Ilic, Energy Laboratory Publication No. MIT EL 00-006, Energy Laboratory, Massachusetts Institute of Technology, November 2000, discusses the use of multinomial trees and stochastic price path forecasting techniques, generating a set of price path scenarios and applying dynamic programming to each.

The Article, "The Challenges of Pricing and Risk Management of Energy Derivatives," Les Clewlow, AC3 Financial Engineering Using High Performance Computing, Nov. 27, 2001, discusses stochastic price path forecasting techniques, but does not adequately model various constraints in a dynamic, stochastic context.

The article, "Financial Risk Management in a Competitive Electricity Market," Roger Bjorgan, Chen-Ching Lui, Jacqes Lawarree, University of Washington, discusses dynamic programming and the use of hedging techniques.

The Master's Thesis, Decision Tools for Electricity Transmission Service and Pricing: a Dynamic Programming Approach," Ozge Nadia Gozum, Massachusetts Institute of Technology, 2000, discusses use of Monte Carlo simulation to generate a set of price paths, and application of dynamic programming to each.

In summary, references in the field demonstrate a recognition of the need to combine the advantages of dynamic programming with the advantages of stochastic price path modeling to realistically value and optimize scheduling of a facility, such as a generation facility. The state of the art, however, has not succeeded in providing a method to effectively combine the two. In addition, the state of the art does not provide a method to overcome the curse of dimensionality inherent in explicit modeling of numerous constraints in traditional dynamic programming.

For all of the above reasons, there is a need in the art for a method for valuing and optimizing scheduling of facilities, such as generation facilities, that effectively combines the advantages of traditional dynamic programming with the advantages of stochastic price path modeling. In addition, there is a need in the art for a method which realizes the advantages of traditional dynamic programming while avoiding mathematical intractability caused by the "curse of dimensionality."

SUMMARY OF THE INVENTION

The present invention provides methods for valuing and optimizing scheduling operation of assets including generation assets such as fuel powered electrical energy generators, and methods valuing financial instruments based on such assets. In some embodiments, through implicit modeling of constraints, advantages of dynamic programming are achieved while maintaining mathematical tractability. In some embodiments, methods are provided that combine the advantages of stochastic price modeling with the advantages of dynamic programming by using a decision tree based model that together models constraints affecting operation of facilities as well as stochastically models relevant price paths, such as fuel or electrical energy price paths. In some embodiments, valuation or optimization is performed jointly for a portfolio of generation facilities, the operation of each of which facilities affects optimization of scheduling of other of the facilities.

In one embodiment, the invention provides a computerized method for facilitating scheduling of operation of a facility for at least a first time interval of a period of time. The method includes generating a decision tree based model accounting for a combined effect, on the scheduling of the operation of the facility, of: at least one specified forward price path, over the period of time, including at least one price of at least one commodity associated with operation of the facility; at least one specified level of uncertainty with regard to the at least one specified forward price path; and, at least one specified constraint associated with at least a first state of at least one state of at least one operating parameter associated with the operation of the facility. The method further includes applying a dynamic optimization algorithm to the decision tree based model to determine an optimal scheduling option for at least the first interval of time. The method further includes storing in a memory optimal scheduling option information associated with the optimal scheduling option.

In another embodiment, the invention provides a computerized method for determining an anticipated profitability of operation of a facility over a period of time. The method includes generating a decision tree based model accounting for a combined effect, on scheduling of the operation of the facility over the period of time, of: at least one specified forward price path, over the period of time, including at least one price of at least one commodity associated with operation of the facility; at least one specified level of uncertainty with regard to the at least one specified forward price path; and, at least one specified constraint associated with at least a first state of at least one state of at least one operating parameter associated with the operation of the facility. The method further includes applying a dynamic optimization algorithm to the decision tree based model to determine the anticipated profitability over the period of time. The method further includes storing in a memory anticipated profitability information associated with the anticipated profitability.

In another embodiment, the invention provides a computer usable medium storing program code which, when executed by a computer, causes the computer to execute a computerized method for facilitating scheduling of operation of a facility for at least a first time interval of a period of time. The method includes generating a decision tree based model accounting for a combined effect, on the scheduling of the operation of the facility, of: at least one specified forward price path, over the period of time, including at least one price of at least one commodity associated with operation of the facility; at least one specified level of uncertainty with regard to the at least one specified forward price path; and, at least one specified constraint associated with at least a first state of at least one state of at least one operating parameter associated with the operation of the facility. The method further includes applying a dynamic optimization algorithm to the decision tree based model to determine an optimal scheduling option for at least the first interval of time. The method further includes storing optimal scheduling option information associated with the optimal scheduling option in a memory.

In another embodiment, the invention provides a computer usable medium storing program code which, when executed by a computer, causes the computer to execute a computerized method for determining an anticipated profitability of operation of a facility over a period of time. The method includes generating a decision tree based model accounting for a combined effect, on scheduling of the operation of the facility over the period of time, of: at least one specified forward price path, over the period of time, including at least one price of at least one commodity associated with operation of the facility at least one specified level of uncertainty with regard to the at least one specified forward price path; and, at least one specified constraint associated with at least a first state of at least one state of at least one operating parameter associated with the operation of the facility. The method further includes applying a dynamic optimization algorithm to the decision tree based model to determine the anticipated profitability over the period of time. The method further includes storing in a memory anticipated profitability information associated with the anticipated profitability.

In another embodiment, the invention provides a computerized system for facilitating scheduling of operation of a facility for at least a first time interval of a period of time. The system includes means for generating a decision tree based model accounting for a combined effect, on the scheduling of the operation of the facility, of: at least one specified forward price path, over the period of time, including at least one price of at least one commodity associated with operation of the facility at least one specified level of uncertainty with regard to the at least one specified forward price path; and, at least one specified constraint associated with at least a first state of at least one state of at least one operating parameter associated with the operation of the facility. The system further includes means for applying a dynamic optimization algorithm to the decision tree based model to determine an optimal scheduling option for at least the first interval of time. The system further includes means for storing in a memory optimal scheduling option information associated with the optimal scheduling option.

In another embodiment, the invention provides a computerized system for determining an anticipated profitability of operation of a facility over a period of time. The system includes means for generating a decision tree based model accounting for a combined effect, on scheduling of the operation of the facility, of: at least one specified forward price path, over the period of time, including at least one price of at least one commodity associated with operation of the facility; at least one specified level of uncertainty with regard to the at least one specified forward price path; and, at least one specified constraint associated with at least a first state of at least one state of at least one operating parameter associated with the operation of the facility. The system further includes means for applying a dynamic optimization algorithm to the decision tree based model to determine the anticipated profitability over the period of time.

In another embodiment, the invention provides a computerized system for facilitating scheduling of operation of a facility for at least a first time interval of a period of time, including a processor and a memory accessible by the processor. The processor is programmed for: generating a decision tree based model accounting for a combined effect, on optimization of the scheduling of the operation of the facility, of: at least one specified forward price path, over the period of time, including at least one price of at least one commodity associated with operation of the facility, the at least one specified forward price path being determined from information stored in the memory; at least one specified level of uncertainty with regard to the at least one specified forward price path, the at least one specified level of uncertainty being determined from information stored in the memory; and, at least one specified constraint associated with at least a first state of at least one state of at least one operating parameter associated with the operation of the facility, the at least one specified constraint being determined from information stored in the memory. The processor is further programmed for applying a dynamic optimization algorithm to the decision tree based model to determine an optimal scheduling option for at least the first interval of time.

In another embodiment, the invention provides a computational method for facilitating scheduling of operation of a facility for at least a first time interval of a period of time. The method includes generating a decision tree based model accounting for a combined effect, on the scheduling of the operation of the facility, of: at least one specified forward price path, over the period of time, including at least one price of at least one commodity associated with operation of the facility; at least one specified level of uncertainty with regard to the at least one specified forward price path; and, at least one specified constraint associated with at least a first state of at least one state of at least one operating parameter associated with the operation of the facility. The method further includes applying a dynamic optimization algorithm to the decision tree based model to determine an optimal scheduling option for at least the first interval of time.

In another embodiment, the invention provides a computerized method for facilitating joint scheduling of operation of each of a plurality of facilities for at least a first time interval of a period of time. The method includes determining a set of preliminary anticipated optimal schedules for each of the plurality of facilities. The determining a set of preliminary anticipated optimal schedules includes generating a decision tree based model for each of the plurality of facilities, each of the decision tree based models accounting for a combined effect, on the optimization of the scheduling of the operation of each of the plurality of facilities, of: at least one specified control price path including at least one price, over the period of time, of at least one commodity associated with the operation of each of the plurality of facilities, the at least one price of the at least one commodity being affected by the operation of each of the facilities over the period of time; at least one specified level of uncertainty with regard to the at least one control price path; and, at least one specified constraint associated with at least a first state of at least one state of at least one operating parameter associated with the operation of each of the plurality of facilities. The determining a set of preliminary anticipated optimal schedules further includes applying a dynamic optimization algorithm to the decision tree based models to determine a set of preliminary anticipated optimal schedules, the set of preliminary anticipated optimal schedules including a schedule for each of the plurality of facilities over the period of time. The method further includes generating a set of liquidity adjusted price paths for the at least on commodity over the period of time, the set of liquidity adjusted price paths being generated based at least on the at least one specified control price path, the set of preliminary anticipated optimal schedules, and a specified liquidity function. The method further includes, utilizing an optimal control price path search algorithm that utilizes iterative performance of the determining step and the generating step with updating of the at least one control price paths according to the liquidity adjusted price paths, determining an optimal control price path and an anticipated optimal set of schedules, the anticipated optimal set of schedules including a schedule for each of the plurality of facilities. The method further includes determining an optimal scheduling option for each of the plurality of facilities based on anticipated optimal set of schedules. The method further includes storing in a memory optimal scheduling information associated with the optimal scheduling option for each of the plurality of facilities.

In another embodiment, the invention provides a computerized method for determining an anticipated profitability of operation of a plurality of facilities for a period of time. The method includes determining a set of preliminary anticipated optimal schedules for each of the plurality of facilities. The determining a set of preliminary anticipated optimal schedules includes generating a decision tree based model for each of the plurality of facilities, each of the decision tree based models accounting for a combined effect, on the optimization of the scheduling of the operation of each of the plurality of facilities, of: at least one specified control price path including at least one price, over the period of time, of at least one commodity associated with the operation of each of the plurality of facilities, the at least one price of the at least one commodity being affected by the operation of each of the facilities over the period of time; at least one specified level of uncertainty with regard to the at least one specified control price path; and, at least one specified constraint associated with at least a first state of at least one state of at least one operating parameter associated with the operation of each of the plurality of facilities. The determining a set of preliminary anticipated optimal schedules further includes applying a dynamic programming algorithm to the decision tree based models to determine a set of preliminary anticipated optimal schedules, the set of preliminary anticipated optimal schedules including a schedule for each of the plurality of facilities over the period of time. The method further includes generating a set of liquidity adjusted price paths for the at least on commodity over the period of time, the set of liquidity adjusted price paths being generated based at least on the at least one specified control price path, the set of preliminary anticipated optimal schedules, and a specified liquidity function. The method further includes, utilizing an optimal control price path search algorithm that utilizes iterative performance of the determining step and the generating step with updating of the at least one control price paths according to the liquidity adjusted price paths, determining an optimal control price path and an anticipated optimal set of schedules, the anticipated optimal set of schedules including a schedule for each of the plurality of facilities. The method further includes determining the anticipated profitability of the plurality of facilities based on the anticipated optimal set of schedules. The method further includes storing in a memory the anticipated profitability information associated with the anticipated profitability.

In another embodiment, the invention provides a computer usable medium storing program code which, when executed by a computer, causes the computer to execute a computerized method for facilitating joint scheduling of operation of each of a plurality of facilities for at least a first time interval of a period of time. The method includes determining a set of preliminary anticipated optimal schedules for each of the plurality of facilities. The determining a set of preliminary anticipated optimal schedules includes generating a decision tree based model for each of the plurality of facilities, each of the decision tree based models accounting for a combined effect, on the optimization of the scheduling of the operation of each of the plurality of facilities, of: at least one specified control price path including at least one price, over the period of time, of at least one commodity associated with the operation of each of the plurality of facilities, the at least one price of the at least one commodity being affected by the operation of each of the facilities over the period of time; at least one specified level of uncertainty with regard to the at least one specified control price path; and, at least one specified constraint associated with at least a first state of at least one state of at least one operating parameter associated with the operation of each of the plurality of facilities. The determining a set of preliminary anticipated optimal schedules further includes applying a dynamic optimization algorithm to the decision tree based models to determine a set of preliminary anticipated optimal schedules, the set of preliminary anticipated optimal schedules including a schedule for each of the plurality of facilities over the period of time. The method further includes generating a set of liquidity adjusted price paths for the at least on commodity over the period of time, the set of liquidity adjusted price paths being generated based at least on the at least one specified control price path, the set of preliminary anticipated optimal schedules, and a specified liquidity function. The method further includes, utilizing an optimal control price path search algorithm that utilizes iterative performance of the determining step and the generating step with updating of the at least one control price paths according to the liquidity adjusted price paths, determining an optimal control price path and an anticipated optimal set of schedules, the anticipated optimal set of schedules including a schedule for each of the plurality of facilities. The method further includes determining an optimal scheduling option for each of the plurality of facilities based on anticipated optimal set of schedules. The method further includes storing in a memory optimal scheduling information associated with the optimal scheduling option for each of the plurality of facilities.

In another embodiment, the invention provides a computer usable medium storing program code which, when executed by a computer, causes the computer to execute a computerized method for determining an anticipated profitability of operation of a plurality of facilities for a period of time. The method includes determining a set of preliminary anticipated optimal schedules for each of the plurality of facilities. The determining a set of preliminary anticipated optimal schedules includes generating a decision tree based model for each of the plurality of facilities, each of the decision tree based models accounting for a combined effect, on the optimization of the scheduling of the operation of the plurality of the facilities, of: at least one specified control price path including at least one price, over the period of time, of at least one commodity associated with the operation of each of the plurality of facilities, the at least one price of the at least one commodity being affected by the operation of each of the facilities over the period of time; at least one specified level of uncertainty with regard to the at least one specified control price path; and, at least one specified constraint associated with at least a first state of at least one state of at least one operating parameter associated with the operation of each of the plurality of facilities. The determining a set of preliminary anticipated optimal schedules further includes applying a dynamic programming algorithm to the decision tree based models to determine a set of preliminary anticipated optimal schedules, the set of preliminary anticipated optimal schedules including a schedule for each of the plurality of facilities over the period of time. The method further includes generating a set of liquidity adjusted price paths for the at least on commodity over the period of time, the set of liquidity adjusted price paths being generated based at least on the at least one specified control price path, the set of preliminary anticipated optimal schedules, and a specified liquidity function. The method further includes, utilizing an optimal control price path search algorithm that utilizes iterative performance of the determining step and the generating step with updating of the at least one control price paths according to the liquidity adjusted price paths, determining an optimal control price path and an anticipated optimal set of schedules, the anticipated optimal set of schedules including a schedule for each of the plurality of facilities. The method further includes determining the anticipated profitability of the plurality of facilities based on the anticipated optimal set of schedules. The method further includes storing in a memory anticipated profitability information associated with the anticipated profitability of the plurality of facilities.

In another embodiment, the invention provides a system for facilitating joint scheduling of operation of each of a plurality of facilities for at least a first time interval of a period of time. The system includes means for determining a set of preliminary anticipated optimal schedules for each of the plurality of facilities. The means for determining a set of preliminary anticipated optimal schedules includes means for generating a decision tree based model for each of the plurality of facilities, each of the decision tree based models accounting for a combined effect, on the optimization of the scheduling of the operation of the plurality of the facilities, of: at least one specified control price path including at least one price, over the period of time, of at least one commodity associated with the operation of each of the plurality of facilities, the at least one price of the at least one commodity being affected by the operation of each of the facilities over the period of time; at least one specified level of uncertainty with regard to the at least one specified control price path; and, at least one specified constraint associated with at least a first state of at least one state of at least one operating parameter associated with the operation of each of the plurality of facilities. The means for determining a set of preliminary anticipated optimal schedules further includes means for applying a dynamic optimization algorithm to the decision tree based models to determine a set of preliminary anticipated optimal schedules, the set of preliminary anticipated optimal schedules including a schedule for each of the plurality of facilities over the period of time. The system further includes means for generating a set of liquidity adjusted price paths for the at least on commodity over the period of time, the set of liquidity adjusted price paths being generated based at least on the at least one specified control price path, the set of preliminary anticipated optimal schedules, and a specified liquidity function. The system further includes means for utilizing an optimal control price path search algorithm that utilizes iterative performance of the determining step and the generating step with updating of the at least one control price paths according to the liquidity adjusted price paths, determining an optimal control price path and an anticipated optimal set of schedules, the anticipated optimal set of schedules including a schedule for each of the plurality of facilities. The system further includes means for determining an optimal scheduling option for each of the plurality of facilities based on anticipated optimal set of schedules. The system further includes means for storing in a memory optimal scheduling option information associated with the optimal scheduling option for each of the plurality of facilities.

In another embodiment, the invention provides a system for determining an anticipated profitability of operation of a plurality of facilities for a period of time. The system includes means for determining a set of preliminary anticipated optimal schedules for each of the plurality of facilities. The means for determining a set of preliminary anticipated optimal schedules includes means for generating a decision tree based model for each of the plurality of facilities, each of the decision tree based models accounting for a combined effect, on the optimization of the scheduling of operation of the plurality of the facilities, of: at least one specified control price path including at least one price, over the period of time, of at least one commodity associated with the operation of each of the plurality of facilities, the at least one price of the at least one commodity being affected by the operation of each of the facilities over the period of time; at least one specified level of uncertainty with regard to the at least one specified control price path; and, at least one specified constraint associated with at least a first state of at least one state of at least one operating parameter associated with the operation of each of the plurality of facilities. The means for determining a set of preliminary anticipated optimal schedules further includes means for applying a dynamic programming algorithm to the decision tree based models to determine a set of preliminary anticipated optimal schedules, the set of preliminary anticipated optimal schedules including a schedule for each of the plurality of facilities over the period of time. The system further includes means for generating a set of liquidity adjusted price paths for the at least on commodity over the period of time, the set of liquidity adjusted price paths being generated based at least on the at least one specified control price path, the set of preliminary anticipated optimal schedules, and a specified liquidity function. The system further includes means for utilizing an optimal control price path search algorithm that utilizes iterative performance of the determining step and the generating step with updating of the at least one control price paths according to the liquidity adjusted price paths, determining an optimal control price path and an anticipated optimal set of schedules, the anticipated optimal set of schedules including a schedule for each of the plurality of facilities. The system further includes means for determining the anticipated profitability of the plurality of facilities based on the anticipated optimal set of schedules. The system further includes means for storing in a memory anticipated profitability information associated with the anticipated profitability of the plurality of facilities.

In another embodiment, the invention provides a system for facilitating joint scheduling of operation of each of a plurality of facilities for at least a first time interval of a period of time. The system includes a processor and memory accessible by the processor. The processor is programmed for determining a set of preliminary anticipated optimal schedules for each of the plurality of facilities. The determining a set of preliminary anticipated optimal schedules includes generating a decision tree based model for each of the plurality of facilities, each of the decision tree based models accounting for a combined effect, on the optimization of the scheduling of the operation of each of the plurality of facilities, of: at least one specified control price path including at least one price, over the period of time, of at least one commodity associated with the operation of each of the plurality of facilities, the at least one price of the at least one commodity being affected by the operation of each of the facilities over the period of time; at least one specified level of uncertainty with regard to the at least one specified control price path; and, at least one specified constraint associated with at least a first state of at least one state of at least one operating parameter associated with the operation of each of the plurality of facilities. The determining a set of preliminary anticipated optimal schedules further includes applying a dynamic optimization algorithm to the decision tree based models to determine a set of preliminary anticipated optimal schedules, the set of preliminary anticipated optimal schedules including a schedule for each of the plurality of facilities over the period of time. The processor is further programmed for generating a set of liquidity adjusted price paths for the at least on commodity over the period of time, the set of liquidity adjusted price paths being generated based at least on the at least one specified control price path, the set of preliminary anticipated optimal schedules, and a specified liquidity function. The processor is further programmed for, utilizing an optimal control price path search algorithm that utilizes iterative performance of the determining step and the generating step with updating of the at least one control price paths according to the liquidity adjusted price paths, determining an optimal control price path and an anticipated optimal set of schedules, the anticipated optimal set of schedules including a schedule for each of the plurality of facilities. The processor is further programmed for determining an optimal scheduling option for each of the plurality of facilities based on anticipated optimal set of schedules.

In another embodiment, the invention provides a computational method for facilitating joint scheduling of operation of each of a plurality of facilities for at least a first time interval of a period of time. The method includes determining a set of preliminary anticipated optimal schedules for each of the plurality of facilities. The determining a set of preliminary anticipated optimal schedules includes generating a decision tree based model for each of the plurality of facilities, each of the decision tree based models accounting for a combined effect, on the optimization of the scheduling of the operation of each of the plurality of facilities, of: at least one specified control price path including at least one price, over the period of time, of at least one commodity associated with the operation of each of the plurality of facilities, the at least one price of the at least one commodity being affected by the operation of each of the facilities over the period of time; at least one specified level of uncertainty with regard to the at least one control price path; and, at least one specified constraint associated with at least a first state of at least one state of at least one operating parameter associated with the operation of each of the plurality of facilities. The determining a set of preliminary anticipated optimal schedules further includes applying a dynamic optimization algorithm to the decision tree based models to determine a set of preliminary anticipated optimal schedules, the set of preliminary anticipated optimal schedules including a schedule for each of the plurality of facilities over the period of time. The method further includes generating a set of liquidity adjusted price paths for the at least on commodity over the period of time, the set of liquidity adjusted price paths being generated based at least on the at least one specified control price path, the set of preliminary anticipated optimal schedules, and a specified liquidity function. The method further includes, utilizing an optimal control price path search algorithm that utilizes iterative performance of the determining step and the generating step with updating of the at least one control price paths according to the liquidity adjusted price paths, determining an optimal control price path and an anticipated optimal set of schedules, the anticipated optimal set of schedules including a schedule for each of the plurality of facilities. The method further includes determining an optimal scheduling option for each of the plurality of facilities based on anticipated optimal set of schedules.

Additional aspects of the present invention will be apparent in view of the description which follows.

BRIEF DESCRIPTION OF THE FIGURES

The invention is illustrated in the Figures of the accompanying drawings which are meant to be exemplary and not limiting, in which like references are intended to refer to like or corresponding parts, and in which:

FIG. 29 is a flow chart depicting a method for using determined liquidity adjusted anticipated optimal schedules for a group of facilities to determine a value of an asset, according to one embodiment of the invention;

FIG. 34 depicts a table of generation rates and associated heat rates for the generator associated with the heat rate function depicted in FIG. 33, according to one embodiment of the invention;

FIG. 37 depicts a table of prices used in mapping of operating costs and revenues to a decision tree, according to one embodiment of the invention;

FIG. 43 depicts a table of values associated with an optimal decision rule, according to one embodiment of the invention;

DETAILED DESCRIPTION OF THE INVENTION

Figure 1:
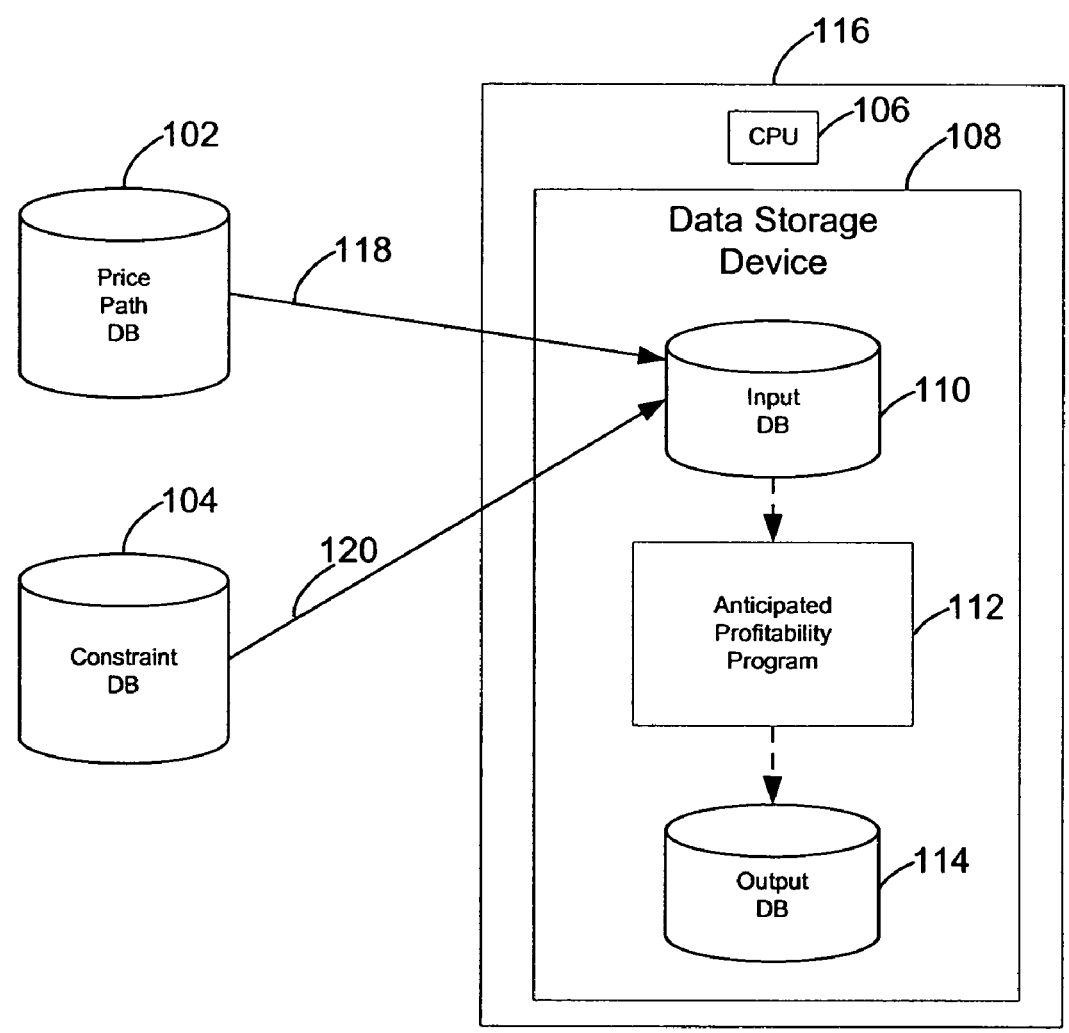
FIG. 1 is a block diagram depicting a computer system including an anticipated profitability program that utilizes a model with implicitly modeled constraint(s), according to one embodiment of the invention.

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

The present invention provides computational methods for determining anticipated profit from facilities such as electrical power generation facilities, for determining values for assets based on anticipated profitability of facilities, and for determining optimal operational scheduling options for facilities.

In some embodiments, methods are provided which utilize a dynamic programming algorithm and a decision tree based model in which one or more operating constraints are implicitly modeled, facilitating computational tractability. In some embodiments, methods are provided that utilize a decision tree based model in which numerous constraints are efficiently modeled in terms of only two operational state parameters, specifically, generation rate and runtime.

Additionally, methods are provided that utilize a dynamic programming algorithm and a decision tree based model that accounts for a combined effect of forward price paths with specified uncertainty as well as operational constraints. In some embodiments, methods are provided that utilize a decision tree based model that accounts for a combined effect, on scheduling optimization, of stochastic forward price paths as well as operational constraints. In some embodiments, methods are provided that utilize a decision tree based model in which a node of a tree is characterized by four parameters, specifically, time, price, generation rate and run time.

Additionally, methods are provided that address profitability, valuation, and scheduling in relation to a group, or portfolio, of facilities, accounting for liquidity factors as well as group, or global, constraints.

While many of methods of the invention can be greatly facilitated or accelerated by the use of one more computers, many methods include computations that can be performed without a computer.

While the invention is described primarily with reference to input information including price path information and constraint information and with reference to generation facilities, the methods of the invention can be applied to utilize other suitable types of input information as well as suitable types of subjects other than generation facilities or other than facilities. In addition, while the invention is described primarily with respect to determining such things as anticipated profitability, asset valuation, and optimal scheduling, the methods of the invention can be utilized to determine other suitable types of valuable information.

Herein, "decision tree" and "decision based tree" include any kind of multinomial tree. Additionally, herein, dynamic programming and dynamic optimization are used interchangeably to describe iterative optimization methods. The term "dynamic programming" is not intended to necessarily imply or utilize computer programming, although computers can be used to perform dynamic programming operations. For example, dynamic programming methods typically utilize backwards iteration through one or more decision trees. For instance, a decision tree can include numerous nodes marking intervals in a period of time, and the dynamic programming method can be backwards in the sense of progressing from a final, or-latest, node in the period to a first, or earliest, node in the period. Further, as used herein, a computer program or computer programming can include any type of computer programming that can be utilized to accomplish the methods as described herein on one or more computers, and can include, for example, any of code, applications, software, algorithms, databases, programming modules, application programming interface (API) tools, data mining tools, search engines, and simulation engines such as Monte Carlo simulation engines.

Herein, reference is made to various specified or input information such as forecasted price path information, price path uncertainty information, constraint information, heat rate curves, liquidity functions, and control price paths, which information can be utilized in the methods, programs, and algorithms of the invention. In various embodiments of the invention, this information can be acquired or derived in a variety of ways. In some embodiments, various information may be obtained from an operator or operating entity of a facility or facilities, such as relevant operational constraints that are known to the operator. In some embodiments, some information, such as price path and price path uncertainty information, can be acquired, derived or estimated based on available public or private records and forecasts. In some embodiments, some of the information is acquired based on information available at a given time as well as information acquired based on the best judgment, estimation, or forecast of an operator at a given time.

FIG. 1 is a block diagram 100 depicting a computer system including an anticipated profitability program 112 that utilizes a model with one or more implicitly modeled constraints, according to one embodiment of the invention. A computer 116, including a central processing unit 106 (CPU) and a data storage device 108, may be connected to a price path database 102 and a constraint database 104. The data storage device 108 may include an input database 110, an anticipated profitability program 112 and an output database 114.

It is to be understood that, while the price path database 102 and constraint database 104 are depicted as being separate, in some embodiments, the databases 102, 104 can be a single database containing both price path information and constraint information. In addition, in some embodiments, the price path database 102 and constraint database 104 can reside in the computer 116 itself, such as in the data storage device, 108. While the input database 110 and output database 114 are depicted as being separate, they also can be a single database containing input and output information.

The databases 102, 104 can be connected to the computer 116 in various ways, including, in some embodiments, through one or more networks which can include one or more local area networks, one or more personal area networks, one or more wide area networks, or the Internet, for example. In some embodiments, the databases 102, 104 can be contained by and part of or associated with one or more computers.

The data storage device 108 of the computer 116 can include various amounts of RAM for storing computer programs and other data. In addition, the computer 116 can include other components typically found in computers, including one or more output devices such as monitors, other fixed or removable data storage devices such as hard disks, floppy disk drives and CD-ROM drives, and one or more input devices, such as mouse pointing devices and keyboards.

Generally, the computer 116 operates under and executes computer programs under the control of an operating system, such as Windows™, Macintosh™, or UNIX. Generally, computer programs of the present invention are tangibly embodied in a computer-readable medium, e.g., RAM, disks including portable disks, or CD ROMs. Under the control of an operating system, computer programs may be loaded from data storage devices into computer RAM for subsequent execution by a CPU. The computer programs include instructions which, when read and executed by the computer, cause the computer to perform the steps necessary to execute elements of some embodiments of the present invention.

As indicated by arrows 118; 120, information is communicated from the databases 102, 104 to the input database 110 of the computer 116, in some embodiments. The anticipated profitability program 112 obtains the information from the input database and is executed to output information that is stored in the output database 114.

The price path database 102 provides price path information such as one or more forward or forecasted price paths, such as forecasted market price paths, for one or more goods or services, such as commodities, e.g., fuel and electricity, which are relevant to profitability of a facility. For example, for a fuel powered electrical energy or power generation facility, the price path information can include a forecasted market price path for one or more types of fuel used by the facility as well as a market price path for electrical energy or power.

The constraint database 104 contains constraint information specifying, or allowing determination by the anticipated profitability program 112, of operational constraints relevant to profitability of the facility, such as, for example, maximum and minimum generation rates while the facility is operating, maximum and minimum operating times, or run-times, and maximum generation rate increases and decreases per unit of time (known as maximum ramp up and ramp down rates), start-up costs and shutdown costs.

In some embodiments, the price path information includes at least a specified price for each of one or more commodities for each of a specified number of points in time, or intervals, in the future during a specified period of time, or sufficient information so that such prices can be determined or estimated by the anticipated profitability program 112. For example, the price path information can include a function for calculating prices over time according to the function, from which prices at various points in time can be obtained, or prices for intervals during the period of time can be estimated.

In some embodiments, the anticipated profitability program 112 generates a model associated with the facility, which model utilizes one or more implicitly modeled constraints, and utilizes a dynamic programming algorithm to determine anticipated profitability for the facility over the period of time, which anticipated profitability is considered to be reasonable based on optimal scheduling decision-making over the period of time from the point of view of an operating entity for the facility over the period of time. Anticipated profitability can be expressed in various ways, such as monetary units of profit or loss over an interval, intervals, or a period, or in other ways to reflect non-monetary profit or loss as may be appropriate. In some embodiments, anticipated profitability is determined as an average, mean, median, or other statistical value derived from multiple possible anticipated profitability scenarios.

Figure 2:
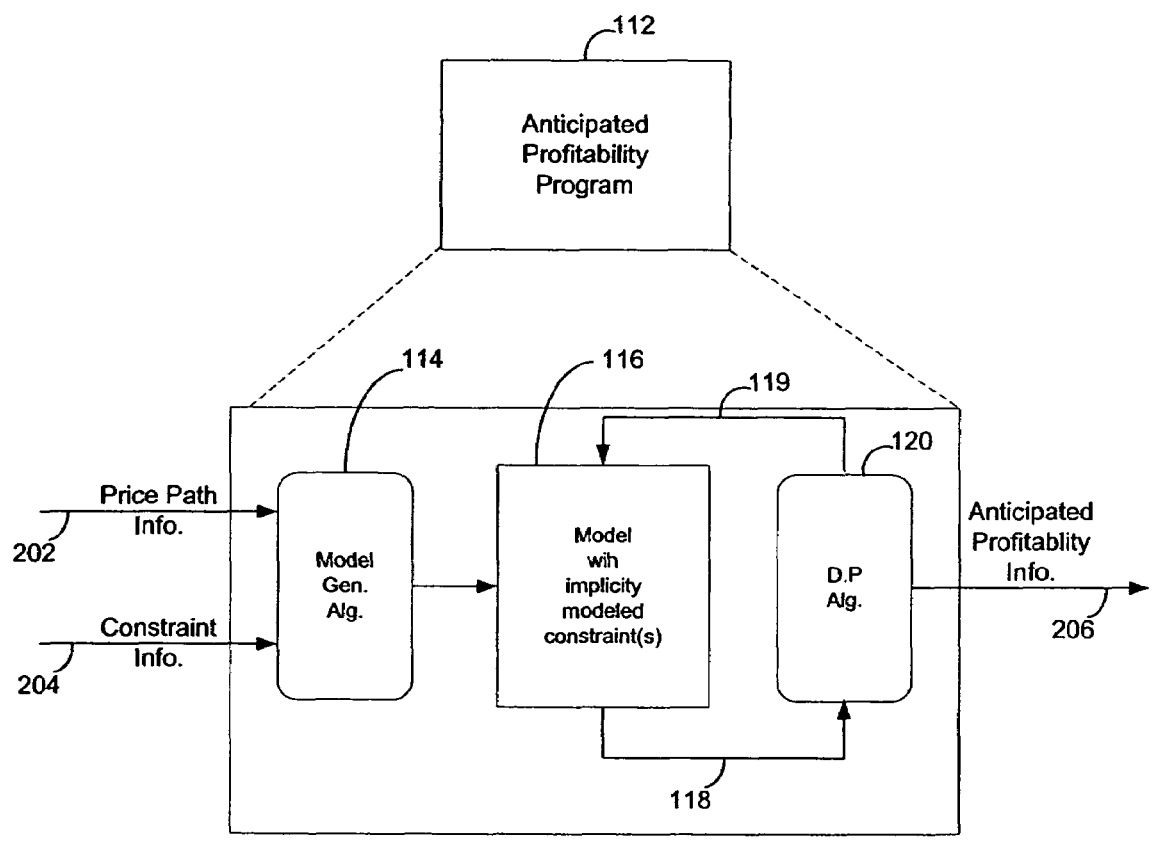
FIG. 2 is a block diagram depicting operation of the anticipated profitability program depicted in FIG. 1, utilizing a model with implicitly modeled constraint(s), according to one embodiment of the invention.

FIG. 2 is a block diagram 200 depicting operation of the anticipated profitability program 112 depicted in FIG. 1, utilizing a model 116 with one or more implicitly modeled constraints, according to one embodiment of the invention.

As depicted in FIG. 2, price path information 202 and constraint information 204 are obtained by the model generation algorithm 114 of the anticipated profitability program 112. Utilizing the information, the model generation algorithm generates the model 116, which can be, for example, a trinomial tree based model. The model accounts for a combined effect, on optimization of scheduling, of the price path or paths as well as the constraint or constraints. By affecting optimization of scheduling, the price path or paths and constraint or constraints also affect anticipated profitability. Utilizing the model 116, a dynamic programming algorithm 120 is applied or executed to determine and output anticipated profitability information 206, which can be stored in the output database 114 of the computer 116. The backwards iterative technique utilized by the dynamic programming algorithm 120 is depicted by arrows 118 and 119. In some embodiments, the dynamic programming algorithm 120 utilizes backwards iteration through nodes of a trinomial tree based model, determining profit or loss at each represented time interval of the period, as marked by the nodes. In some embodiments, the dynamic programming algorithm 120 outputs anticipated profitability information including an anticipated profit or loss over the period of time, as well as anticipated profit or loss for each interval of time during the period of time.

Figure 3:
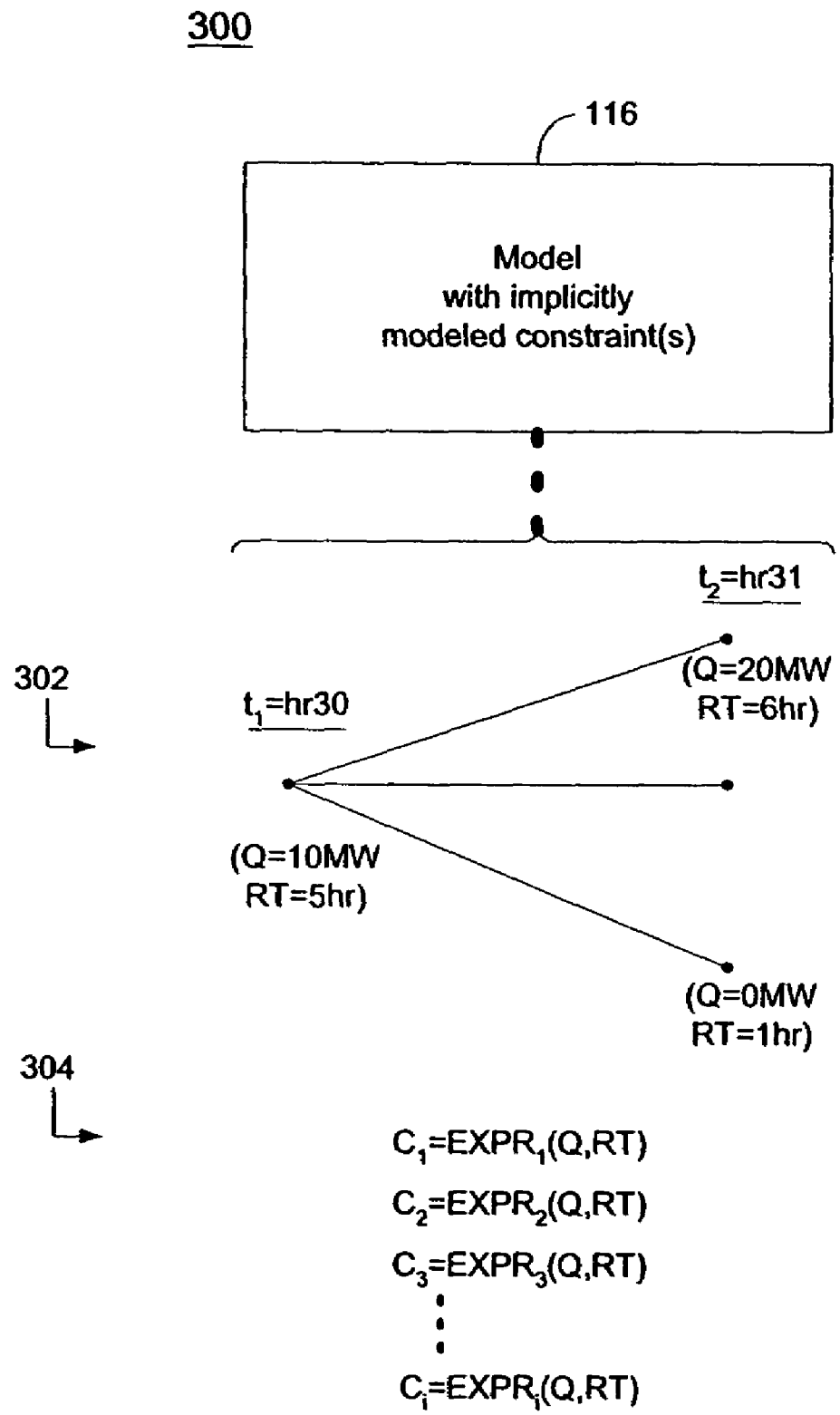
FIG. 3 is a block diagram depicting structuring of the model with implicitly modeled constraint(s), as depicted in FIG. 2, according to one embodiment of the invention.

FIG. 3 is a block diagram 300 depicting structuring of the model 116 with one or more implicitly modeled constraints, as depicted in FIG. 2, according to one embodiment of the invention, for an energy generation facility. As depicted, the model 116 is a trinomial tree based model. A set of nodes 302 is also depicted. Each node is characterized by generation rate Q, in megawatts, or MW, and runtime, or RT, representing, if the facility is represented as generating, or "ON", an amount of time the facility is represented as having been ON, and if the facility is represented as not generating, or "OFF", an amount of time the facility is represented as having been OFF. Included also is a representation 304 of operational constraints $C_1$-$C_j$. As depicted, each constraint is represented by a variable expression, $EXPR_{1-J}$, each of the expressions characterizing a constraint in terms of the parameters Q and RT. Examples of constraints are described herein, among other places, under section headings, "Constraints on the Generation Options," "Operational Costs," and "Capturing dynamic constraints in a decision tree." Details regarding an example of parameters, specifically, $Q_h$ and $RT_h$, are provided herein, among other places, under section headings, "State Space Model For Generation Asset," and "Capturing dynamic constraints in a decision tree."

It is to be appreciated that the model 116 includes fewer parameters than constraints. Herein, a model that implicitly models at least one constraint means a model that utilizes a single model parameter in formulation of more than one constraint and that contains fewer parameters than constraints. Any constraint that has a unique model parameter used in the formulation of that constraint and no other constraint is referred to as an expressly modeled constraint. Any constraint that is not an expressly modeled constraint, and which is utilized in a model having fewer parameters than constraints, is referred to as an implicitly modeled constraint. By utilizing implicit modeling, the model, and computational methods utilizing the model, are greatly simplified while still accounting for the effect of numerous constraints. Additional description in accordance with the foregoing, including further discussion of explicit modeling, can be found herein, among other places, under section heading, "Optimizing over Global Constraints." Examples of parameters and constraints that can be utilized in a model incorporating implicit modeling can be found herein, for example, under section headings, "Constraints on the generation options," "Operational Costs," "State Space Model For Generation Asset," "Capturing dynamic constraints in a decision tree," "Discrete State Space Formulation," "Ruthless Exercise," and "User Defined Operating Levels."

Figure 4:
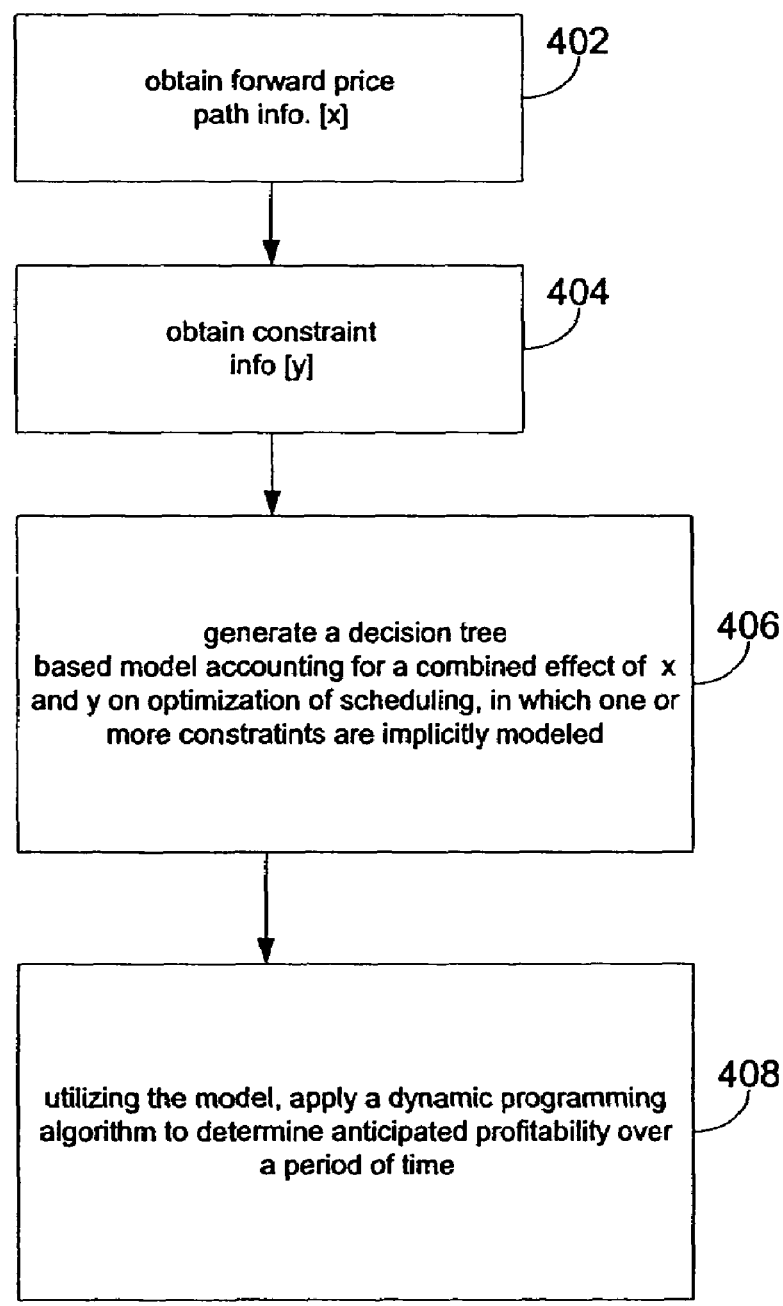
FIG. 4 is a flow chart depicting a method for operation of the anticipated profitability program depicted in FIG. 2, according to one embodiment of the invention.

FIG. 4 is a flow chart depicting a method 400 for operation of the anticipated profitability program 112 depicted in FIG. 2, according to one embodiment of the invention. At step 402, the anticipated profitability program 112 obtains forward price path information (X) relevant to anticipated profitability of the facility. At step 404, the anticipated profitability program 112 obtains constraint information (Y) relevant to anticipated profitability of the facility. At step 406, model generation algorithm 114 generates a decision tree based model accounting for a combined effect, on optimization of scheduling of the facility, of X and Y, and in which one or more constraints are implicitly modeled. At step 408, utilizing the model 116, the dynamic programming algorithm 120 is applied to determine anticipated profitability over the period of time, which can include anticipated profit or loss over the entire period as well as profit or loss for individual intervals of time during the period. More detail regarding some embodiments of the steps of FIG. 4 and certain steps of FIGS. 7, 10, 14, 17, 20, 22, 24, and 26-30 can be found herein, among other places, under section headings, "Overview of some embodiments of optimization and modeling methods," "Optimization for the deterministic case," "Stochastic Price Model," "Trinomial Tree Model of Market Price Uncertainty," "Optimization algorithm for the stochastic case," "Outputs Returned by the Stochastic Optimization Algorithm," "Extracting Decision Surfaces," and "Passing Simulations Through the Model."

Figure 5:
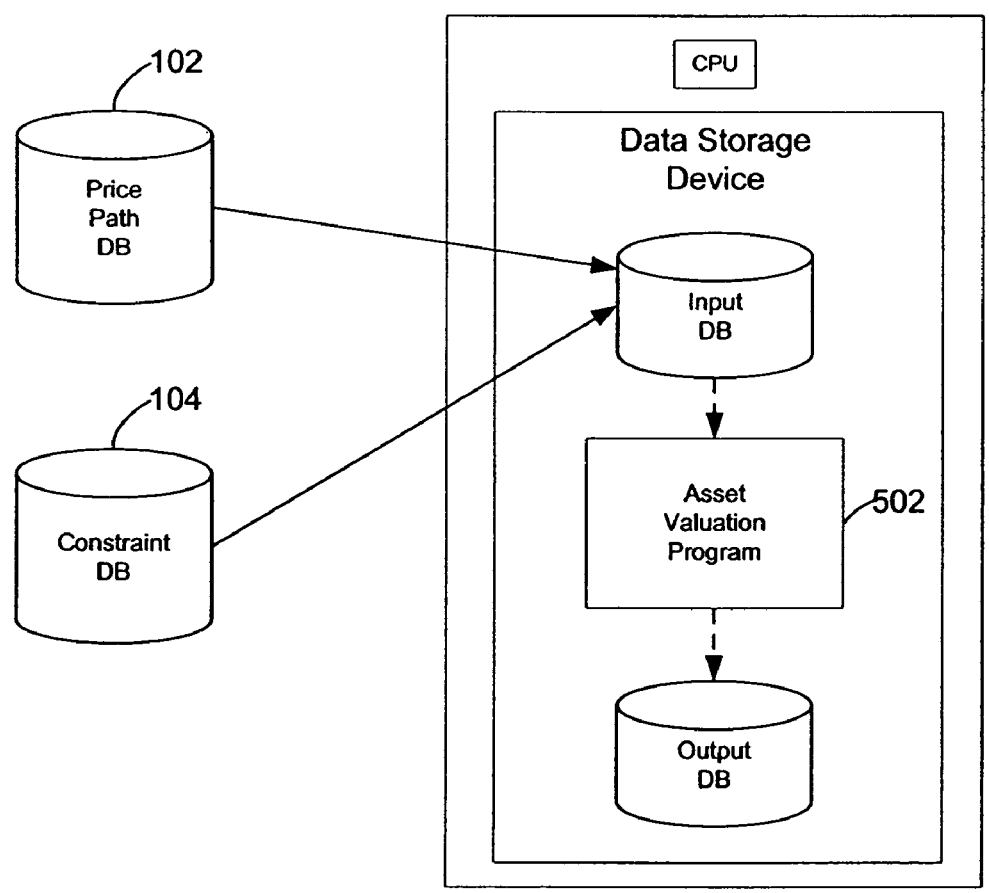
FIG. 5 is a block diagram depicting a computer system including an asset valuation program that utilizes a model with implicitly modeled constraint(s), according to one embodiment of the invention.

FIG. 5 is a block diagram depicting a computer system 500 including an asset valuation program 502 that utilizes a model with one or more implicitly modeled constraints, according to one embodiment of the invention. As depicted, the system 500 is in some ways similar to the system of FIG. 2; however, the anticipated profitability program 112 is replaced by the asset valuation program 502. In some embodiments, the asset valuation program 502 includes the anticipated profitability program 116. While some embodiments of the invention are described including reference to generation assets, it is to be noted that methods and systems according to some embodiments of the invention can be applied with respect to any of various types of assets and are not limited to application with respect to generation assets.

Figure 6:
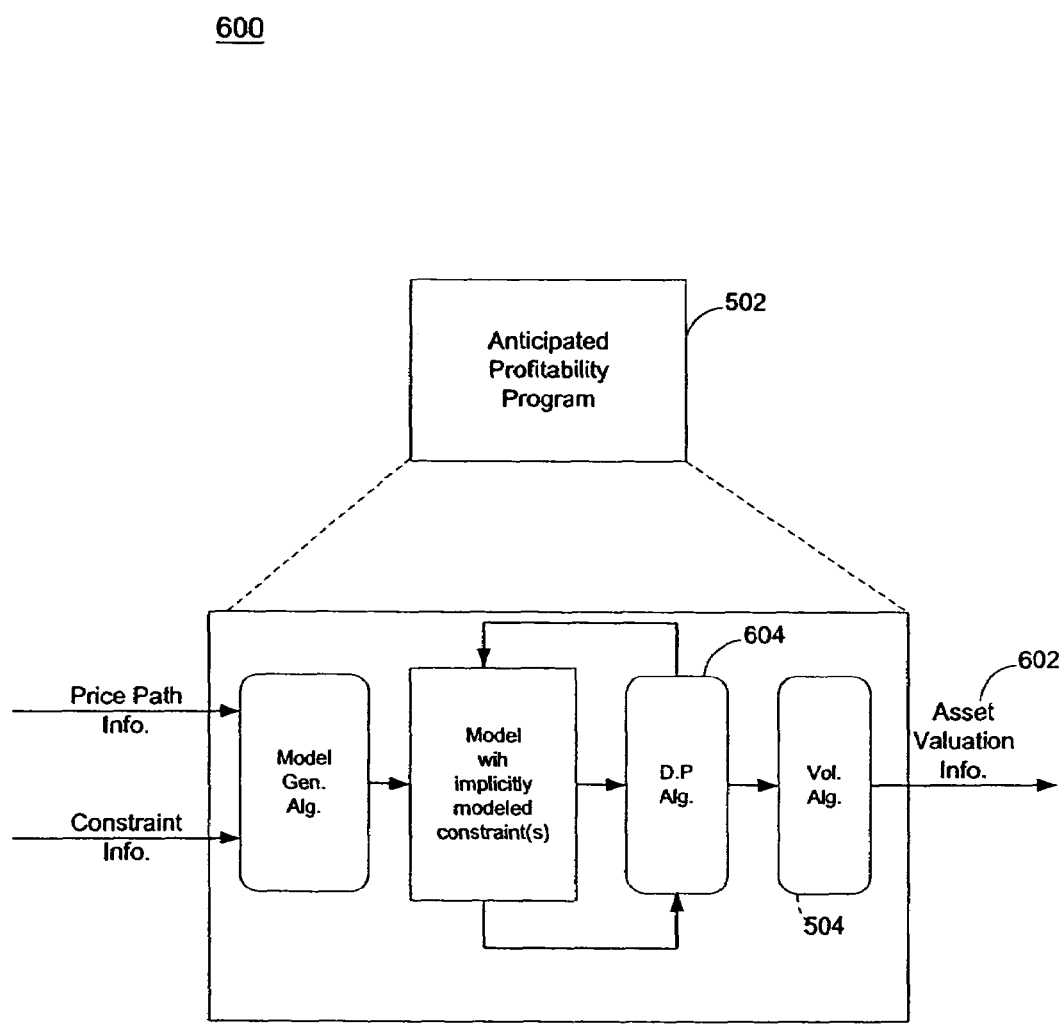
FIG. 6 is a block diagram depicting operation of the asset valuation program depicted in FIG. 5, utilizing a model with implicitly modeled constraint(s), according to one embodiment of the invention.

FIG. 6 is a block diagram 600 depicting operation of the asset valuation program 502 depicted in FIG. 5, utilizing a model with one or more implicitly modeled constraints, according to one embodiment of the invention. The system 600 is in some ways similar to the system 200 depicted in FIG. 2; however, the anticipated profitability program 112 is replaced by the asset valuation program 502, and a valuation algorithm 504 receives output from the dynamic programming algorithm 604, from which the valuation algorithm 504 determines and outputs asset valuation information 602. In some embodiments, the asset valuation program 502 can be used to determine or estimate a present value of a generation asset, such as a real option contract, the value of which is dependent upon the profitability or the scheduling of the facility for the period of time or an interval or intervals thereof. In some embodiments, and as depicted, the valuation algorithm 504 utilizes the output of the dynamic programming algorithm 120, which can include optimal scheduling information as well as profitability information, determining the value of the asset utilizing a mathematical formulation of the value of the asset based on the information.

Figure 7:
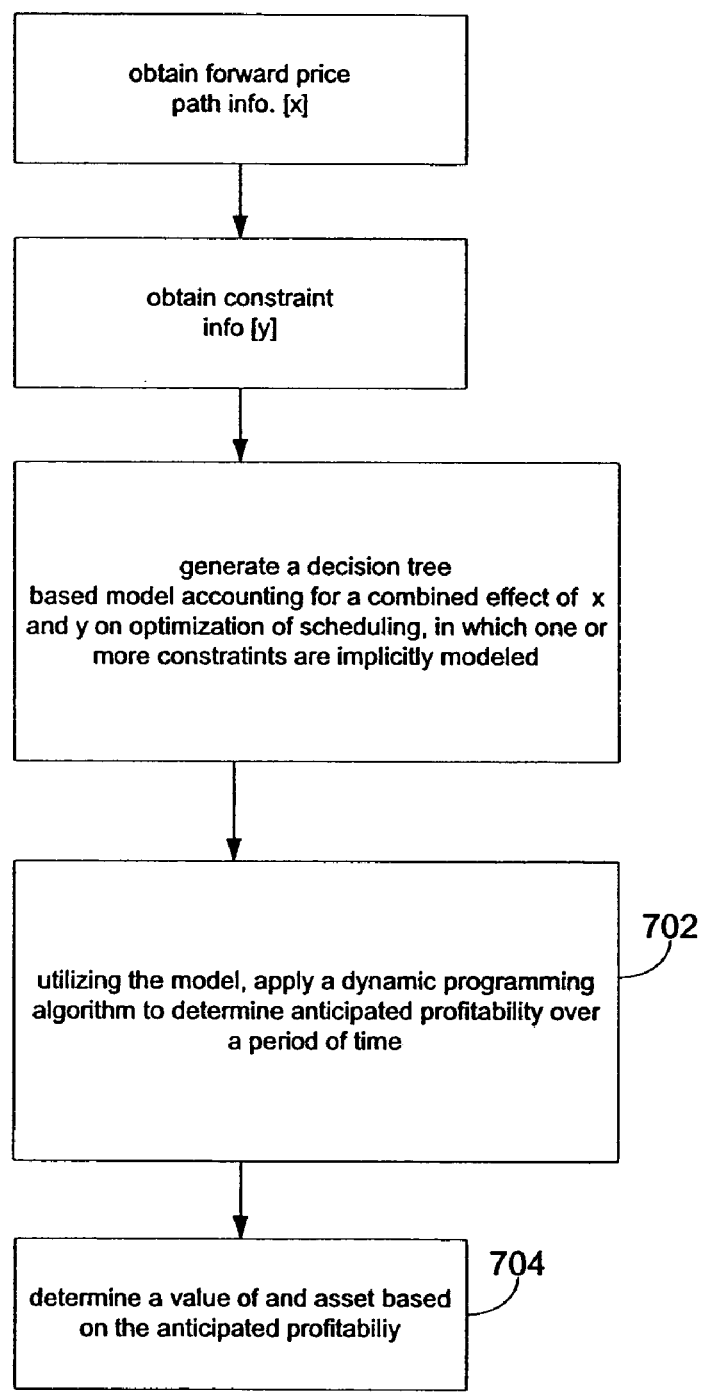
FIG. 7 is a flow chart depicting a method for operation of the asset valuation program depicted in FIG. 6, utilizing a model with implicitly modeled constraint(s), according to one embodiment of the invention.

FIG. 7 is a flow chart depicting a method 700 for operation of the asset valuation program 502 depicted in FIG. 6, utilizing a model with one or more implicitly modeled constraints, according to one embodiment of the invention. Method 700 is in some ways similar to method 400; however, at step 702, anticipated profitability is determined for the period or an interval or intervals, as necessary for asset valuation, and, at step 704, the value of the asset is determined based on the anticipated profitability.

Figure 8:
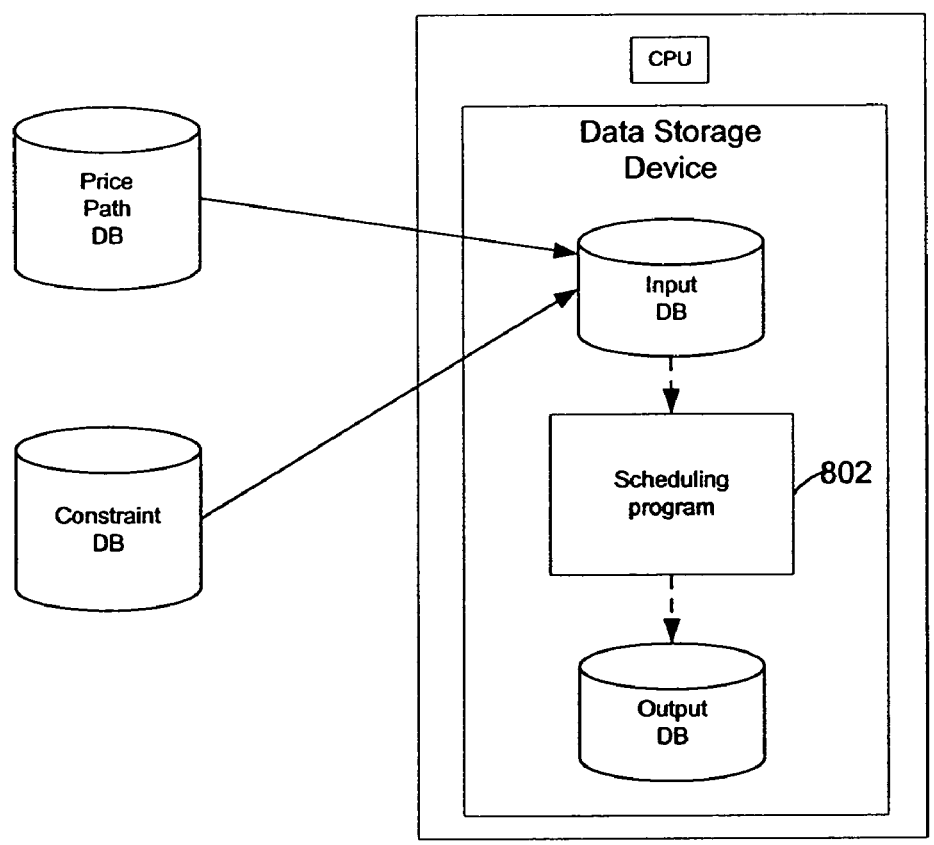
FIG. 8 is a block diagram depicting a computer system including a scheduling program that utilizes a model with implicitly modeled constraint(s), according to one embodiment of the invention.

FIG. 8 is a block diagram depicting a computer system 800 including a scheduling program that utilizes a model with one or more implicitly modeled constraints, according to one embodiment of the invention. The system 800 is in some ways similar to the system 500 depicted in FIG. 5; however, the asset valuation program 502 is replaced with a scheduling program 802.

Figure 9:
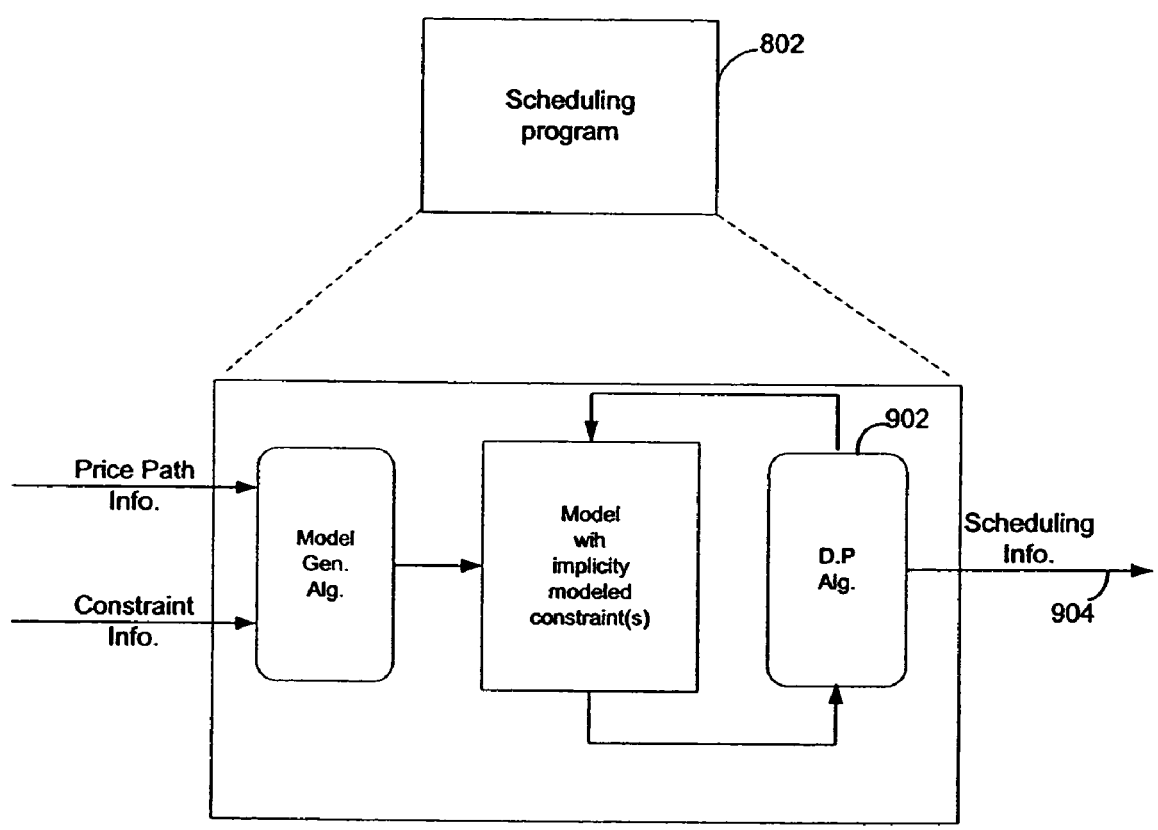
FIG. 9 is a block diagram depicting operation of the scheduling program depicted in FIG. 8, utilizing a model with implicitly modeled constraint(s), according to one embodiment of the invention.

FIG. 9 is a block diagram 900 depicting operation of the scheduling program depicted in FIG. 8, utilizing a model with one or more implicitly modeled constraints, according to one embodiment of the invention. The operation depicted in FIG. 9 is in some ways similar to that depicted FIG. 2; however, dynamic programming algorithm 902 is utilized to output scheduling information 904. Specifically, the dynamic programming algorithm 902 uses backwards iteration to determine an anticipated optimal schedule information for operation of the facility over the period of time, and utilizes this information to determine and output an optimal scheduling option for at least one interval of time during the period of time. In some embodiments, the dynamic programming algorithm 902 outputs an optimal scheduling option, or decision, for an interval immediately subsequent to a given time, such as to ramp up or down a generation rate for the interval, which can include how much to ramp up or down the generation rate for the interval, or to start up or turn off the facility for the interval. In some embodiments the scheduling program 802 can be utilized repeatedly at consecutive times, including providing the scheduling program 802 with updated price path and scheduling information at each time, so that the scheduling program 802 can determine and output an optimal scheduling option for each time or time interval. Additionally, the various programs described herein, including anticipated profitability programs and asset valuation programs, can also be used repeatedly at subsequent times and can be provided updated information, to make updated new determinations.

Figure 10:
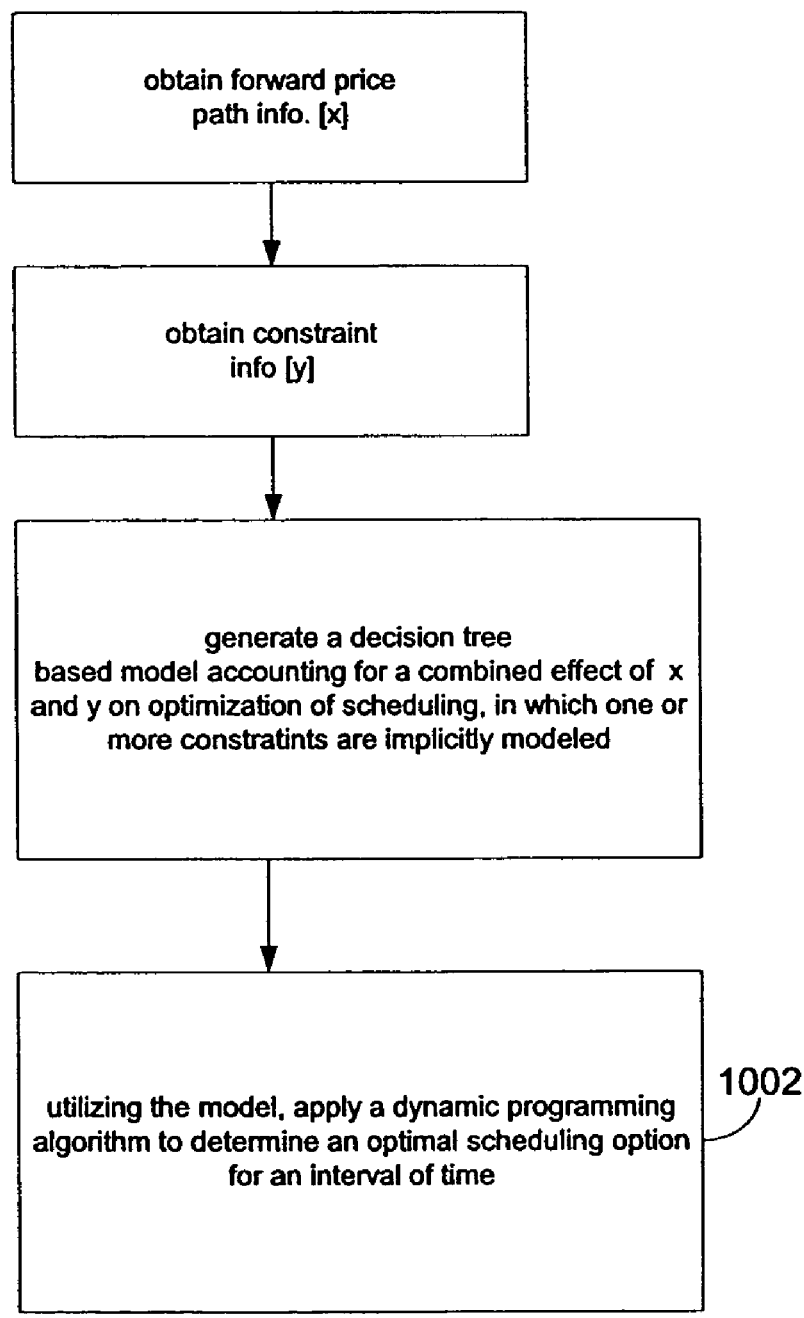
FIG. 10 is a flow chart of a method for operation of the scheduling program depicted in FIG. 9, utilizing a model with implicitly modeled constraint(s), according to one embodiment of the invention.

FIG. 10 is a flow chart of a method 1000 for operation of the scheduling program 802 depicted in FIG. 9, utilizing a model with one or more implicitly modeled constraints, according to one embodiment of the invention. Method 100 is in some ways similar to method 400; however, at step 1002, the dynamic programming algorithm 902 is utilized to determine an optimal scheduling option for one or more intervals of time.

Figure 11:
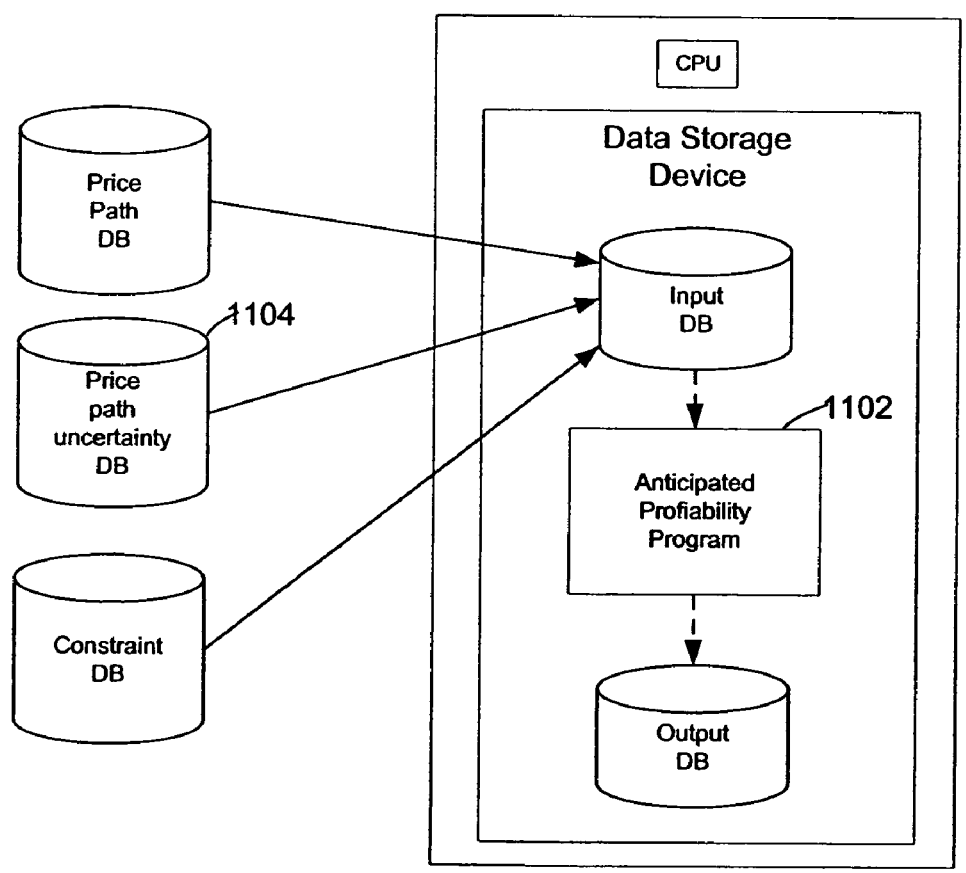
FIG. 11 is a block diagram depicting a computer system including an anticipated profitability program that utilizes price path uncertainty information, according to one embodiment of the invention.

FIG. 11 is a block diagram depicting a computer system 1100 including an anticipated profitability program 1102 that utilizes price path uncertainty information, according to one embodiment of the invention. The system 1100 is in some ways similar to the system 100 depicted in FIG. 1; however, an additional price path uncertainty database 1104 provides price path uncertainty information, and anticipated profitability program 1102 utilizes the information among other information.

Figure 12:
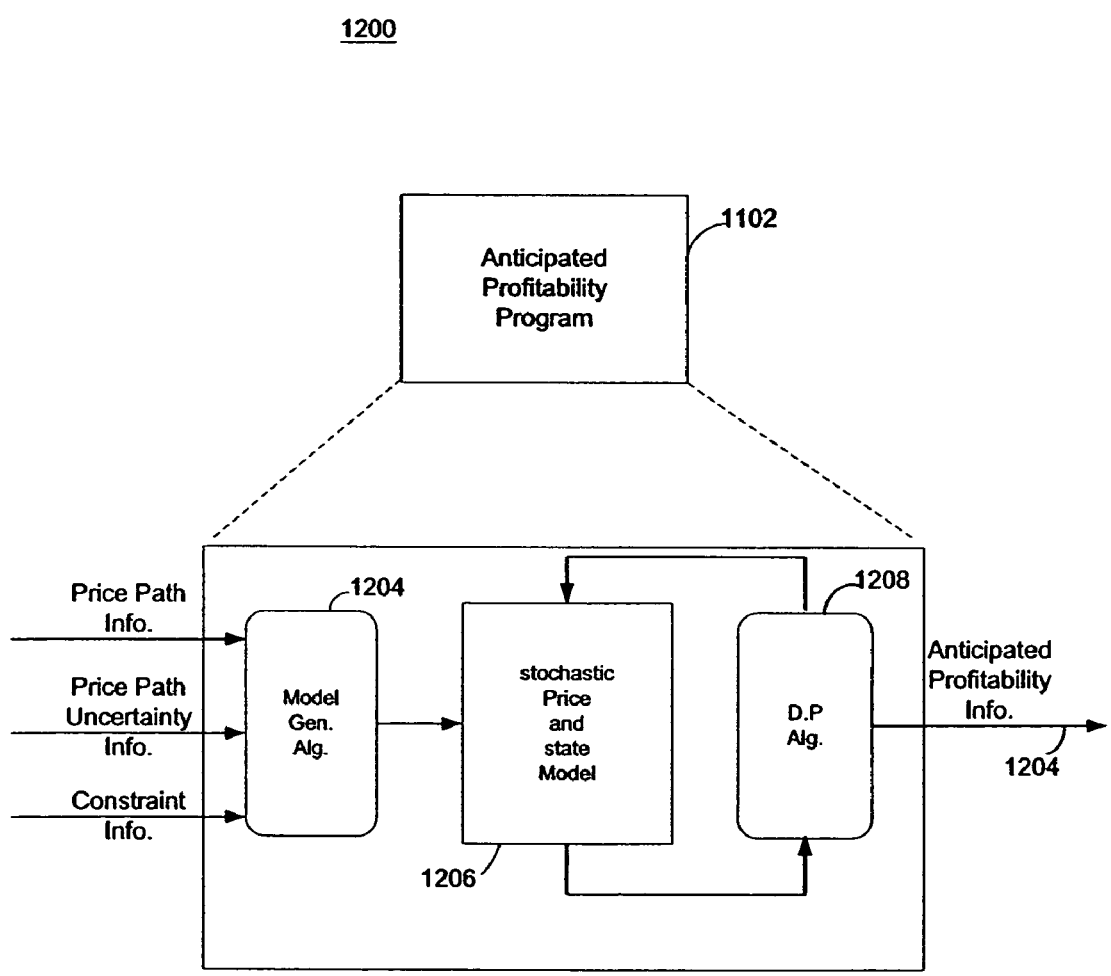
FIG. 12 is a block diagram depicting operation of the anticipated profitability program depicted in FIG. 11, utilizing price path uncertainty information, according to one embodiment of the invention.

FIG. 12 is a block diagram 1200 depicting operation of the anticipated profitability program 1102 depicted in FIG. 11, utilizing price path uncertainty information, according to one embodiment of the invention. The operation depicted in FIG. 12 is in some ways similar to that of FIG. 2; however, price path uncertainty information is included in the operation of the anticipated profitability program 1102. The model generation algorithm 1204 utilizes price path uncertainty information, or stochastic price path information, as well as price path information, which can include a forecasted price path, and constraint information. The model generation algorithm 1204 generates the stochastic price and state model 1206. Utilizing the model 1206, the dynamic programming algorithm 1208 determines and outputs anticipated profitability information 1204.

The price path uncertainty information can include, in some embodiments, the time dependent drift, mean-reversion rate and volatility, respectively, and can include other specified probabilistic characteristics, which can relate to a level of uncertainty with respect to one or more price paths.

In some embodiments of the invention, the anticipated profitability program 1102, as well as other programs described herein, utilize the price path uncertainty information to generate simulations of many possible price paths, such as by using Monte Carlo simulations, a Monte Carlo simulation engine, or other simulations or simulation engines. The simulated price paths can be utilized in model generation, as well as application of various algorithms such as dynamic programming algorithms, in determining anticipated profitability, asset valuation, or optimal scheduling. Use of such simulations is described in more detail herein.

Figure 13:
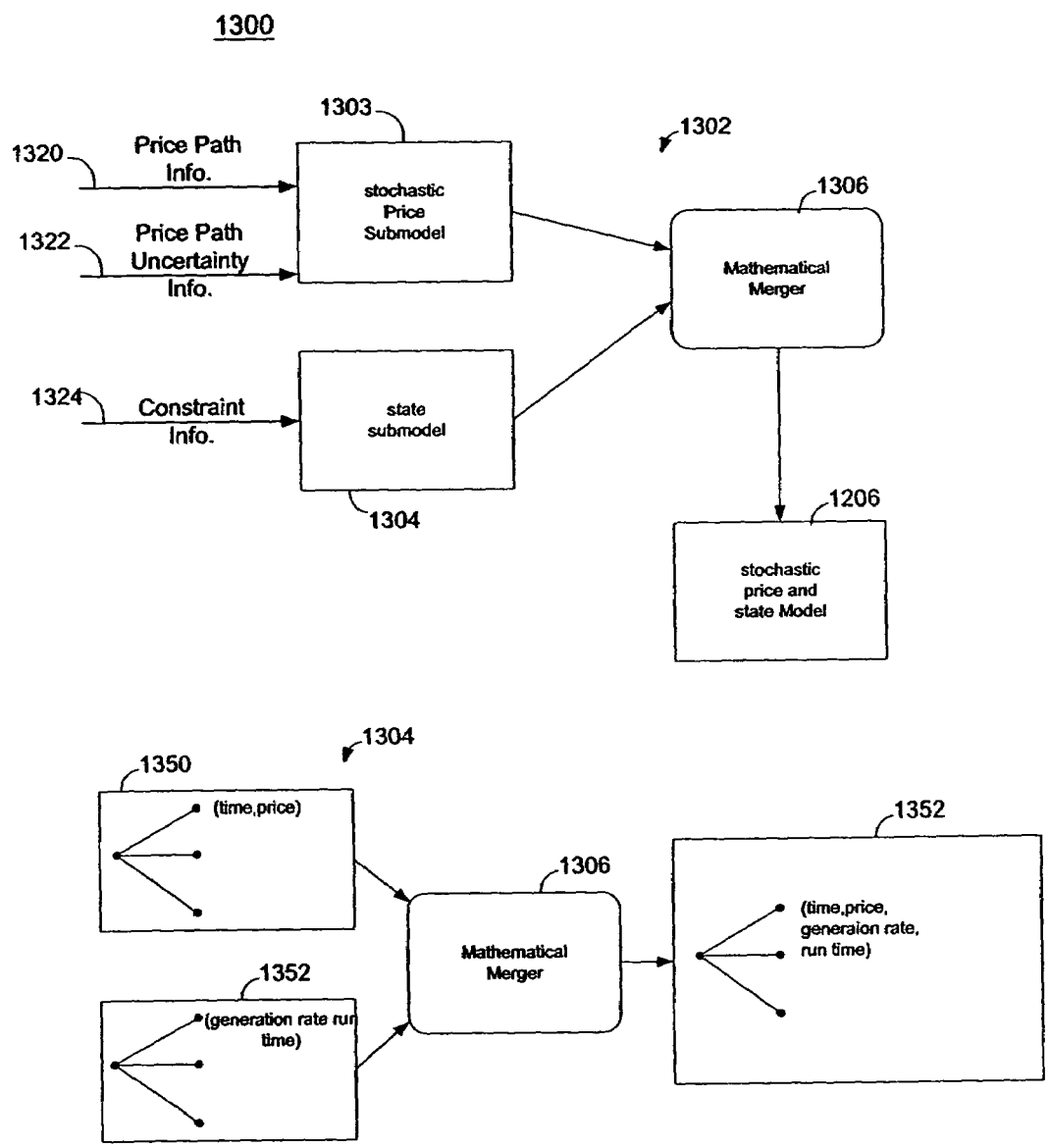
FIG. 13 is a block diagram depicting operation of the model generation algorithm as depicted in FIG. 12, according to one embodiment of the invention.

FIG. 13 is a block diagram 1300 depicting operation of the model generation algorithm 1204 as depicted in FIG. 12, according to one embodiment of the invention. As depicted in subdiagram 1302, the stochastic price and state model 1206 is generated by mathematical merger 1306 of a stochastic price submodel 1303 and an operational state submodel 1304. The stochastic price submodel 1303 is generated based on price path information 1320 and price path uncertainty information 1322. The state submodel is generated based on constraint information 1324. By mathematically merging the submodels 1303, 1304, the stochastic price and state model 1206 is generated that both stochastically models one or more price paths and models operation states, or state paths. The stochastic price and state model 1206 can therefore be utilized to account for a combined effect, on optimization of scheduling, and on anticipated profitability and asset valuation, of the price path information 1320, such as a forecasted price path, the price path uncertainty information 1322, and the constraint information 1324. In some embodiments of the invention, a stochastic price and state model can be generated in ways other than merger of submodels, such as being generated without the use of submodels.

Subdiagram 1304 depicts trinomial tree based model elements that can be utilized in the operation as depicted by subdiagram 1302. Nodes 1350 of a stochastic price submodel trinomial tree are depicted, each node having parameters of time and price. Further, nodes 1352 of an operation state submodel trinomial tree are depicted, each node having parameters of generation rate and runtime. Utilizing mathematical merger, a stochastic price and state model results with nodes 1352, each node having parameters of time, price, generation rate and runtime. In some embodiments, the stochastic price and state model is utilized to account for a combined effect, on optimization of scheduling, of price path information, price path uncertainty information, and constraint information, and thus account for a combined effect of one or more price paths, price path uncertainty, and one or more constraints.

Figure 14:
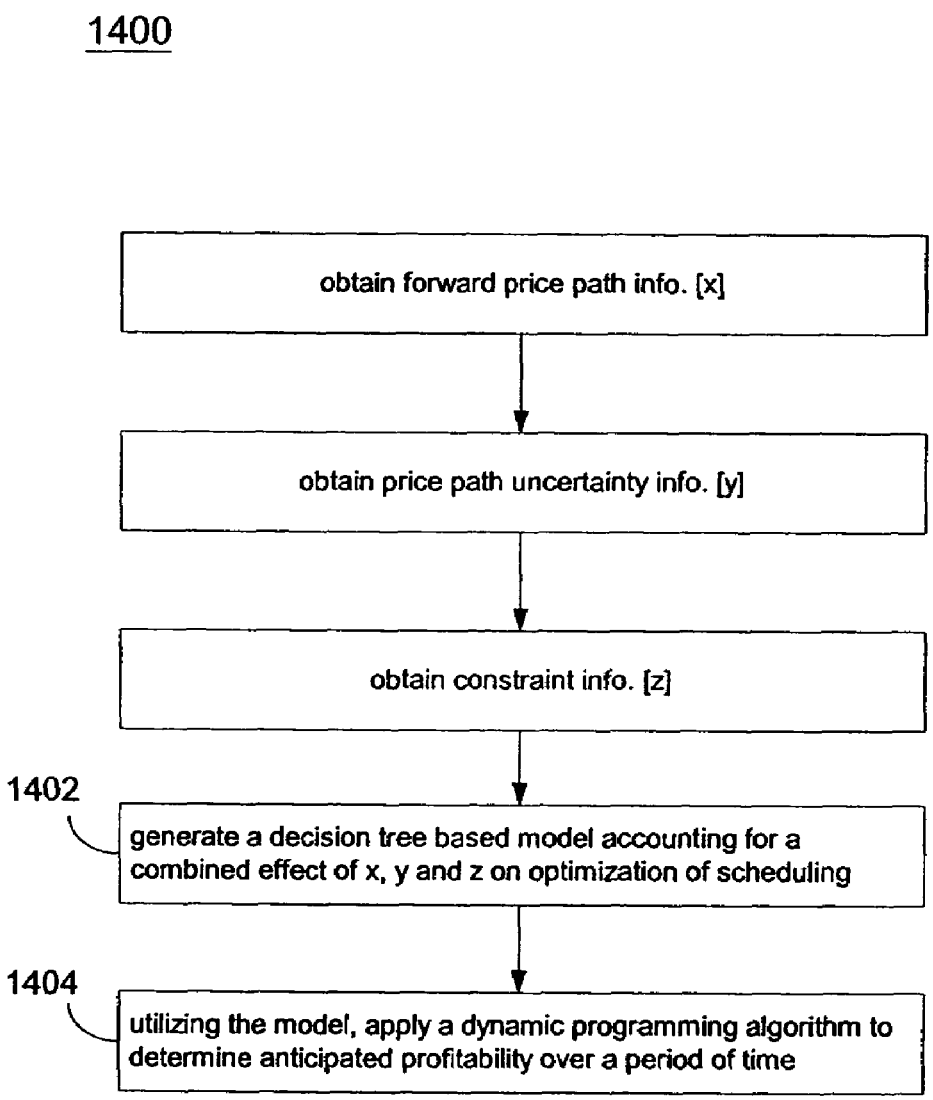
FIG. 14 is a flow chart depicting a method for operation of the anticipated profitability program depicted in FIG. 12, utilizing price path uncertainty information, according to one embodiment of the invention.

FIG. 14 is a flow chart depicting a method 1400 for operation of the anticipated profitability program depicted in FIG. 12, utilizing price path uncertainty information, according to one embodiment of the invention. The method 1400 is in some ways similar to the method 400 of FIG. 4; however, at step 1402, a decision tree based model is generated that accounts for a combined effect of price path information, price path uncertainty information, and constraint information, and, at step 1404, utilizing the model, a dynamic programming algorithm is utilized to determine anticipated profitability information.

Figure 15:
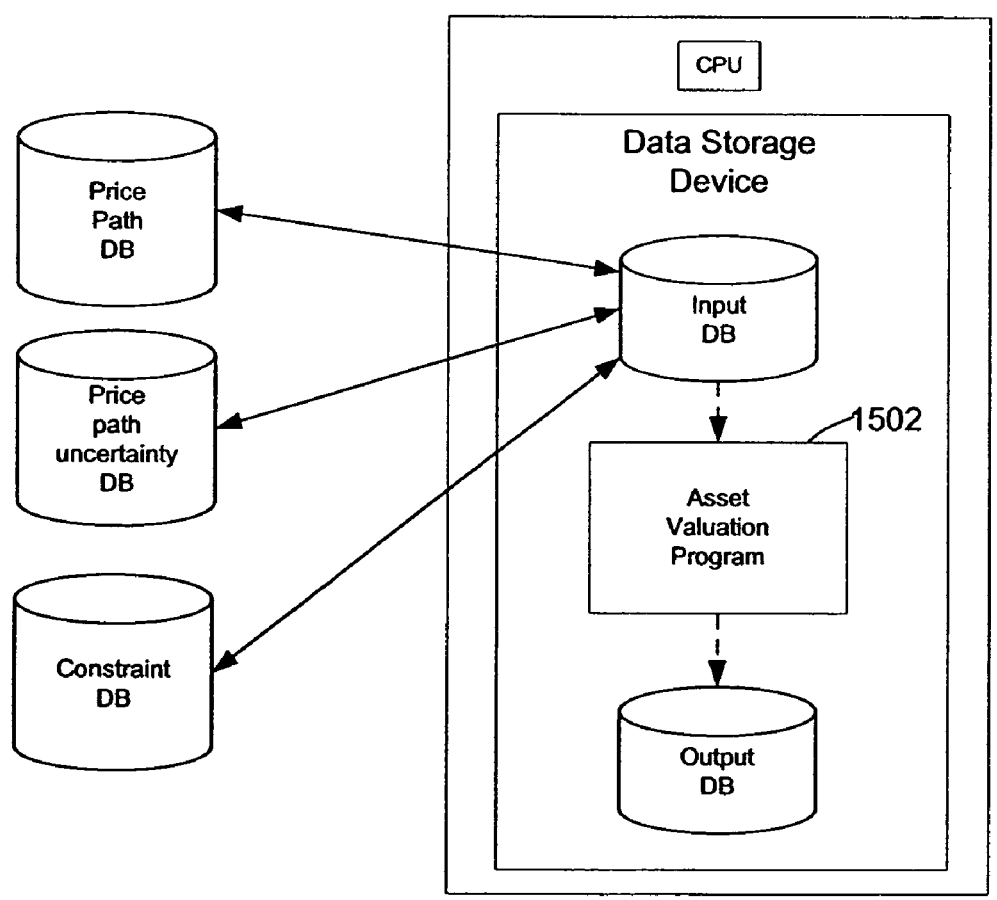
FIG. 15 is a block diagram depicting a computer system including an asset valuation program that utilizes price path uncertainty information, according to one embodiment of the invention.

FIG. 15 is a block diagram 1500 depicting a computer system including an asset valuation program 1502 that utilizes price path uncertainty information, according to one embodiment of the invention. The system depicted in FIG. 15 is in some ways similar to that of FIG. 11; however, the anticipated profitability program 1102 is replaced with an asset valuation program 1502.

Figure 16:
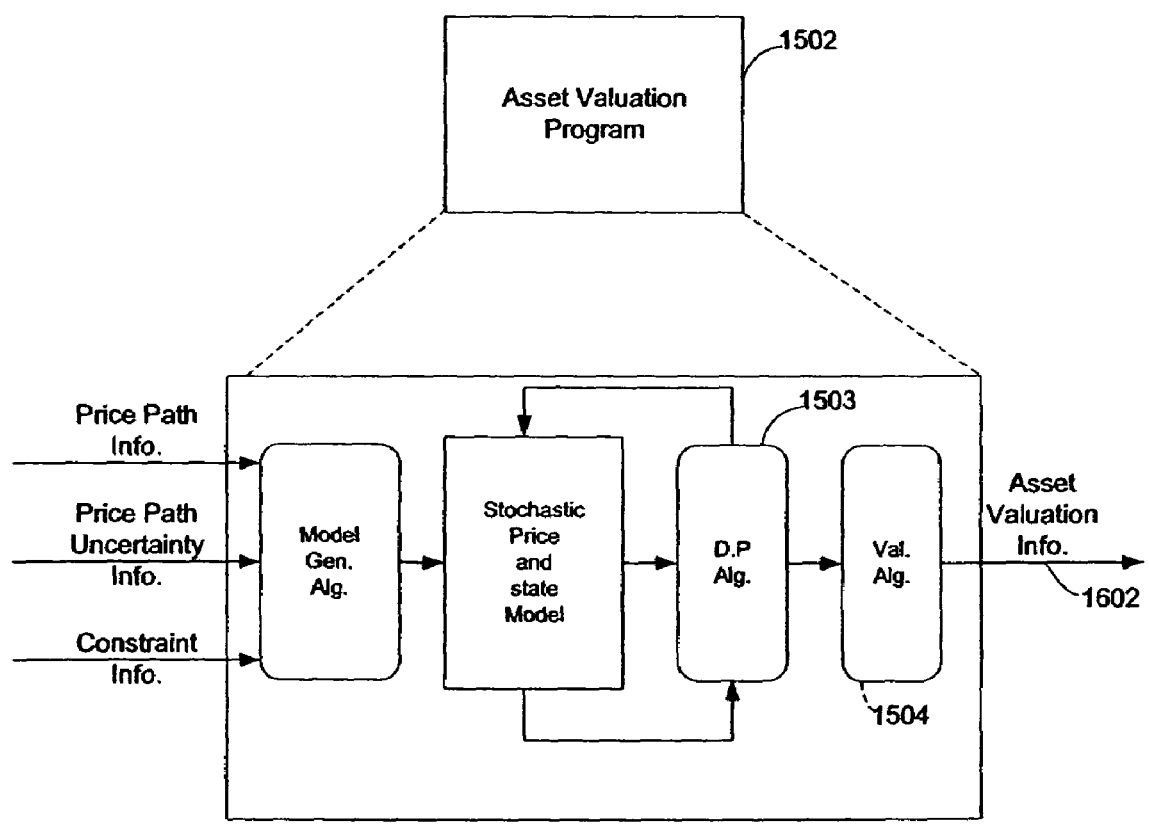
FIG. 16 is a block diagram depicting operation of the asset valuation program depicted in FIG. 15, utilizing price path uncertainty information, according to one embodiment of the invention.

FIG. 16 is a block diagram 1600 depicting operation of the asset valuation program 1502 depicted in FIG. 15, utilizing price path uncertainty information, according to one embodiment of the invention. The operation depicted in FIG. 16 is in some ways similar to that of FIG. 12; however, output of a dynamic programming algorithm 1503 is utilized by a valuation algorithm 1504 to determine and output asset valuation information 1602.

Figure 17:
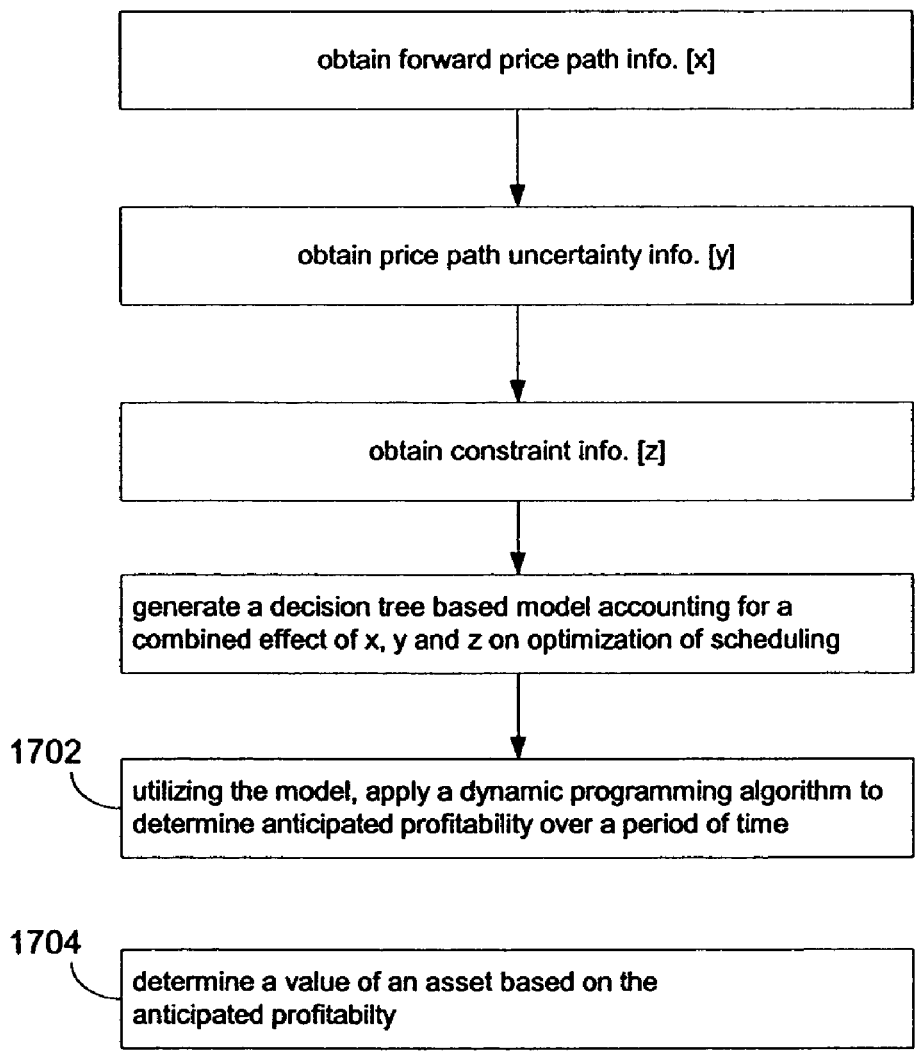
FIG. 17 is a flow chart depicting a method for operation of the asset valuation program depicted in FIG. 16, utilizing price path uncertainty information, according to one embodiment of the invention.

FIG. 17 is a flow chart depicting a method 1700 for operation of the asset valuation program 1502 depicted in FIG. 16, utilizing price path uncertainty information, according to one embodiment of the invention. The method 1700 is in some ways similar to the method 1400 depicted in FIG. 14; however, at step 1702, anticipated profitability is determined as necessary to value an asset, and, at step 1704, a value of the asset is determined based on the anticipated profitability information.

Figure 18:
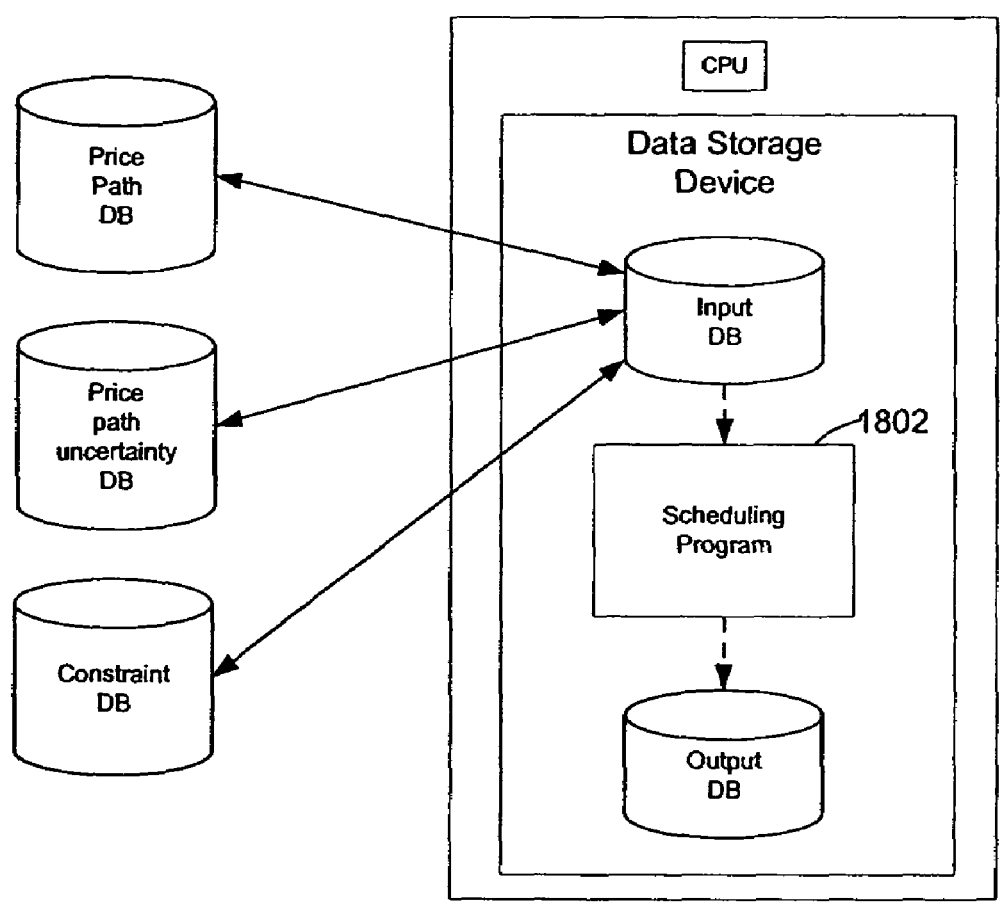
FIG. 18 is a block diagram depicting a computer system including a scheduling program that utilizes price path uncertainty information, according to one embodiment of the invention.

FIG. 18 is a block diagram 1800 depicting a computer system including a scheduling program 1802 that utilizes price path uncertainty information, according to one embodiment of the invention. The system depicted in FIG. 18 is in some ways similar to that of FIG. 15; however, the asset valuation program 1502 is replaced with a scheduling program 1802.

Figure 19:
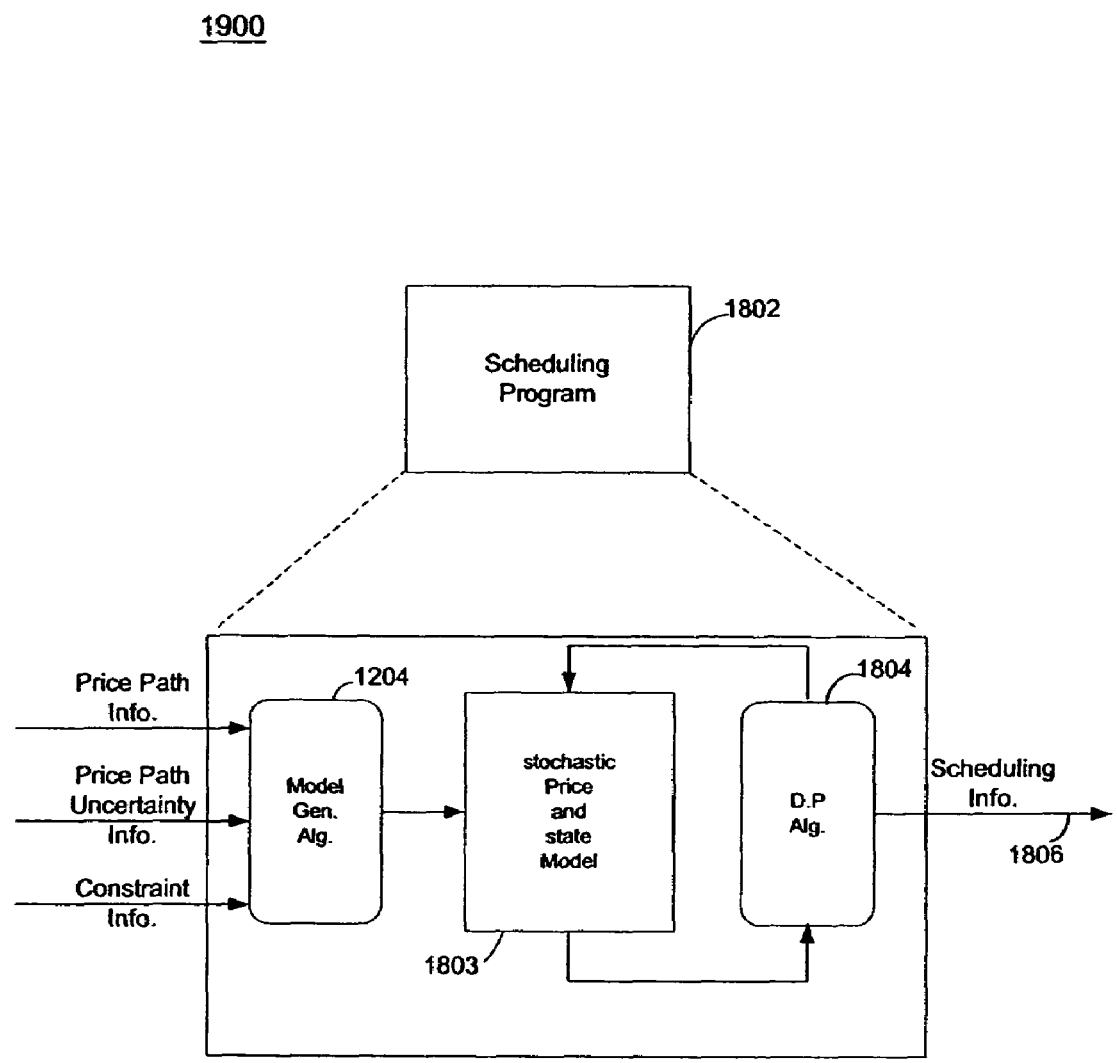
FIG. 19 is a block diagram depicting operation of the scheduling program depicted in FIG. 18, utilizing price path uncertainty information, according to one embodiment of the invention.

FIG. 19 is a block diagram depicting operation of the scheduling program 1802 depicted in FIG. 18, utilizing price path uncertainty information, according to one embodiment of the invention. The operation depicted in FIG. 19 is in some ways similar to that of FIG. 12; however, a dynamic programming algorithm 1804 is utilized to determine and output scheduling information 1806.

Figure 20:
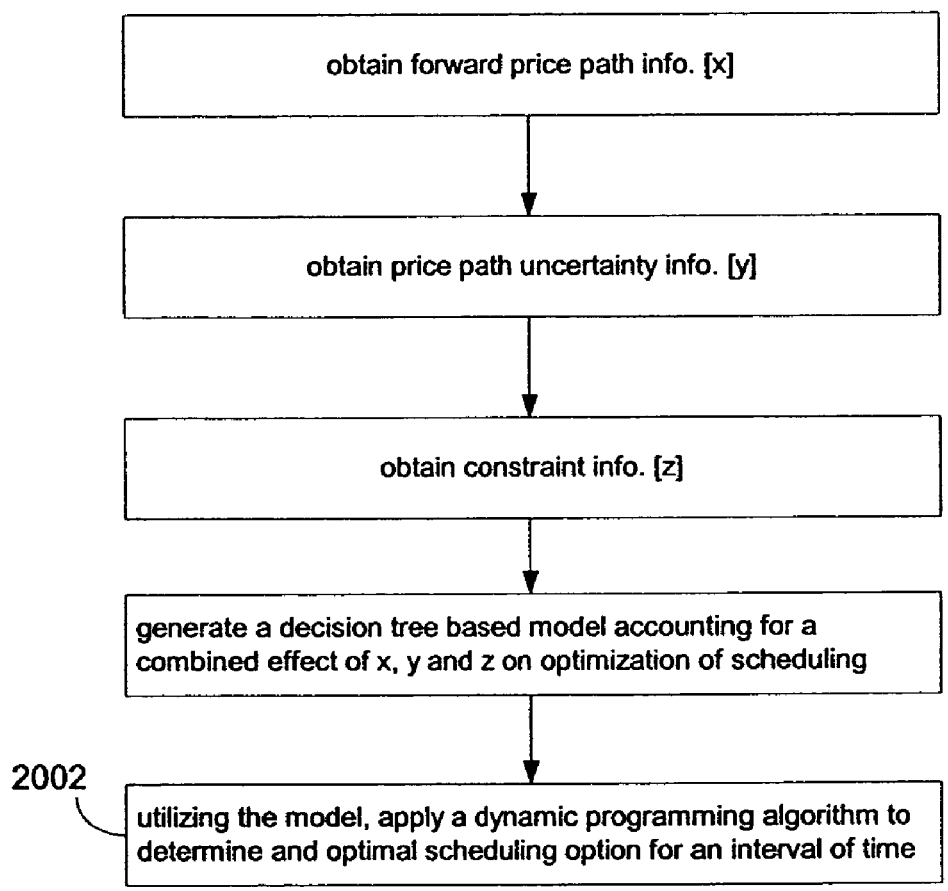
FIG. 20 is a flow chart depicting a method for operation of the scheduling program depicted in FIG. 19, utilizing price path uncertainty information, according to one embodiment of the invention.

FIG. 20 is a flow chart depicting a method 2000 for operation of the scheduling program depicted in FIG. 19, utilizing price path uncertainty information, according to one embodiment of the invention. The method 2000 is in some ways similar to the method 1700 depicted in FIG. 17; however, the method 2000 finishes at step 2002, at which, utilizing the model 1803, the dynamic programming algorithm 1804 is utilized to determine an optimal scheduling option for an interval or intervals of time.

Figure 21:
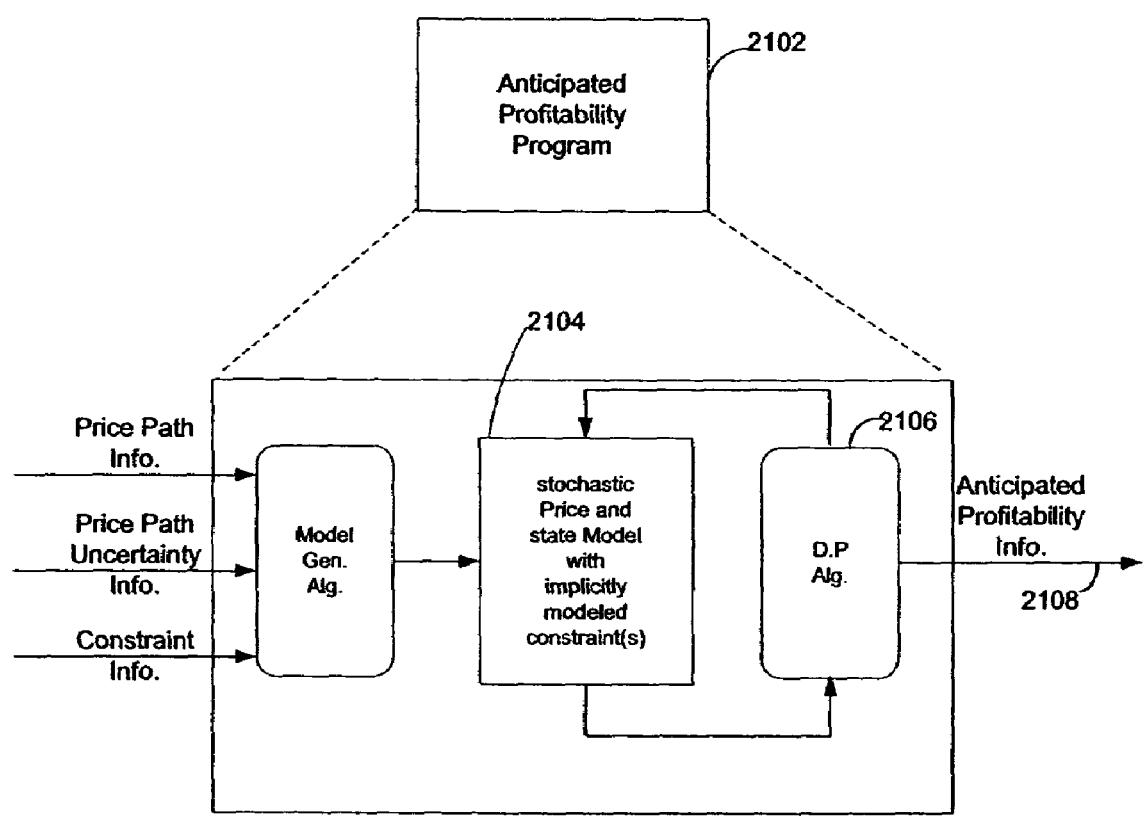
FIG. 21 is a block diagram depicting operation of an anticipated profitability program that utilizes price path uncertainty information and a model with implicitly modeled constraint(s), according to one embodiment of the invention.

FIG. 21 is a block diagram depicting operation of an anticipated profitability program 2102 that utilizes price path uncertainty information and a model 2104 with one or more implicitly modeled constraints, according to one embodiment of the invention. The system depicted in FIG. 21 is in some ways similar to that of FIG. 18; however, model 2104 is a stochastic price and state model, accounting for a combined effect, on optimization of scheduling, of price path information, price path uncertainty information, and constraint information, and including one or more implicitly modeled constraints. Utilizing the model 2104, a dynamic programming algorithm 2106 is utilized to determine and output anticipated profitability information 2108.

Figure 22:
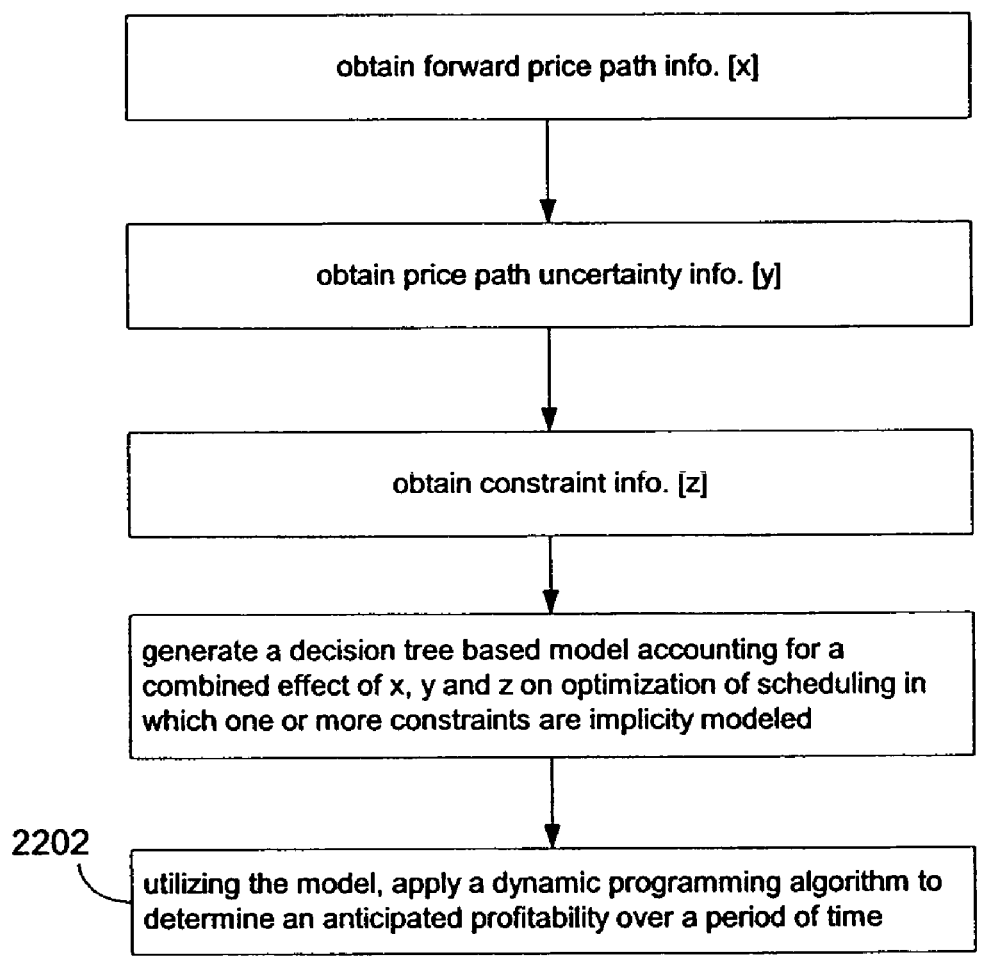
FIG. 22 is a flow chart depicting a method for operation of the anticipated profitability program depicted in FIG. 21, utilizing price path uncertainty information and a model with implicitly modeled constraint(s), according to one embodiment of the invention.

FIG. 22 is a flow chart depicting a method 2200 for operation of the anticipated profitability program 2102 depicted in FIG. 21, utilizing price path uncertainty information and a model with one or more implicitly modeled constraints, according to one embodiment of the invention. The method 2200 is in some ways similar to the method 2000 depicted in FIG. 20; however, at step 2202, utilizing the model 2104, the dynamic programming algorithm is applied to determine an anticipated profitability over an interval, intervals, or a period of time.

Figure 23:
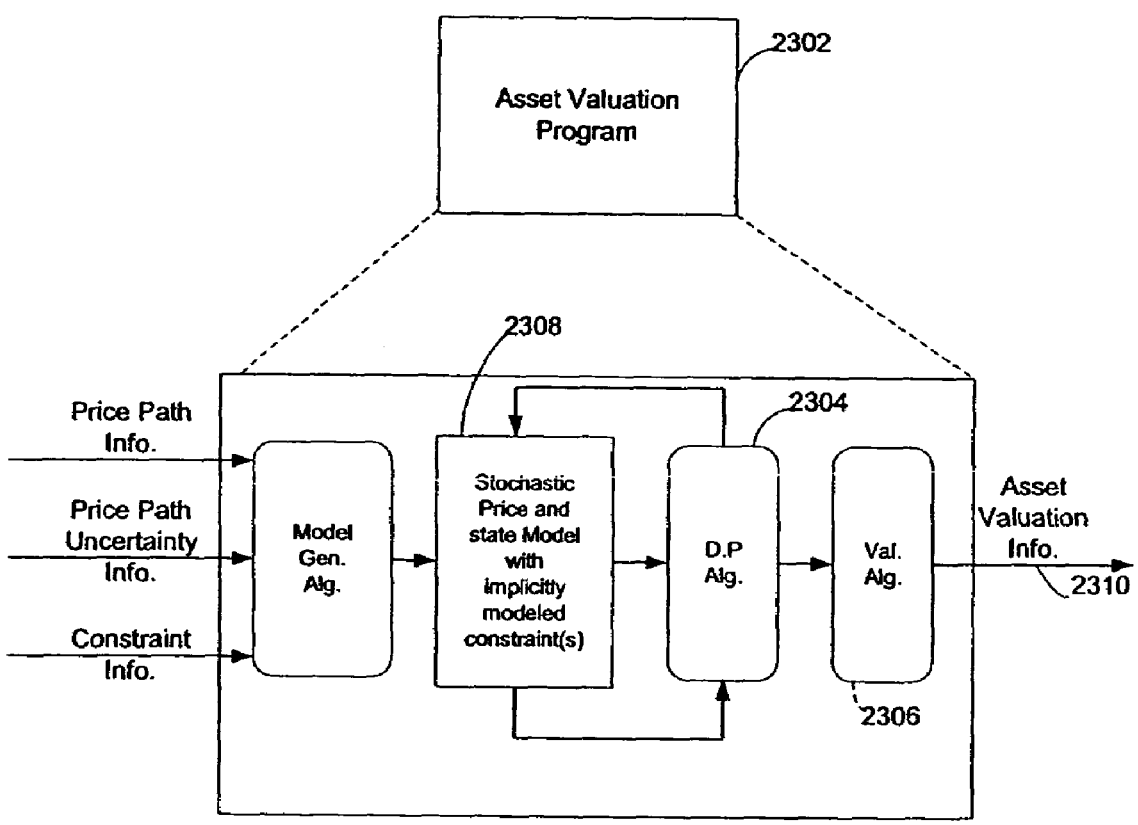
FIG. 23 is a block diagram depicting operation of an asset valuation program that utilizes price path uncertainty information and a model with implicitly modeled constraint(s), according to one embodiment of the invention.

FIG. 23 is a block diagram 2300 depicting operation of an asset valuation program 2302 that utilizes price path uncertainty information and a model 2308 with implicitly modeled constraints, according to one embodiment of the invention. The operation depicted in FIG. 23 is in some ways similar to the operation depicted in FIG. 21; however, dynamic programming algorithm 2306 determines and outputs anticipated profitability information to valuation algorithm 2306, based on which the valuation algorithm determines and outputs asset valuation information 2310.

Figure 24:
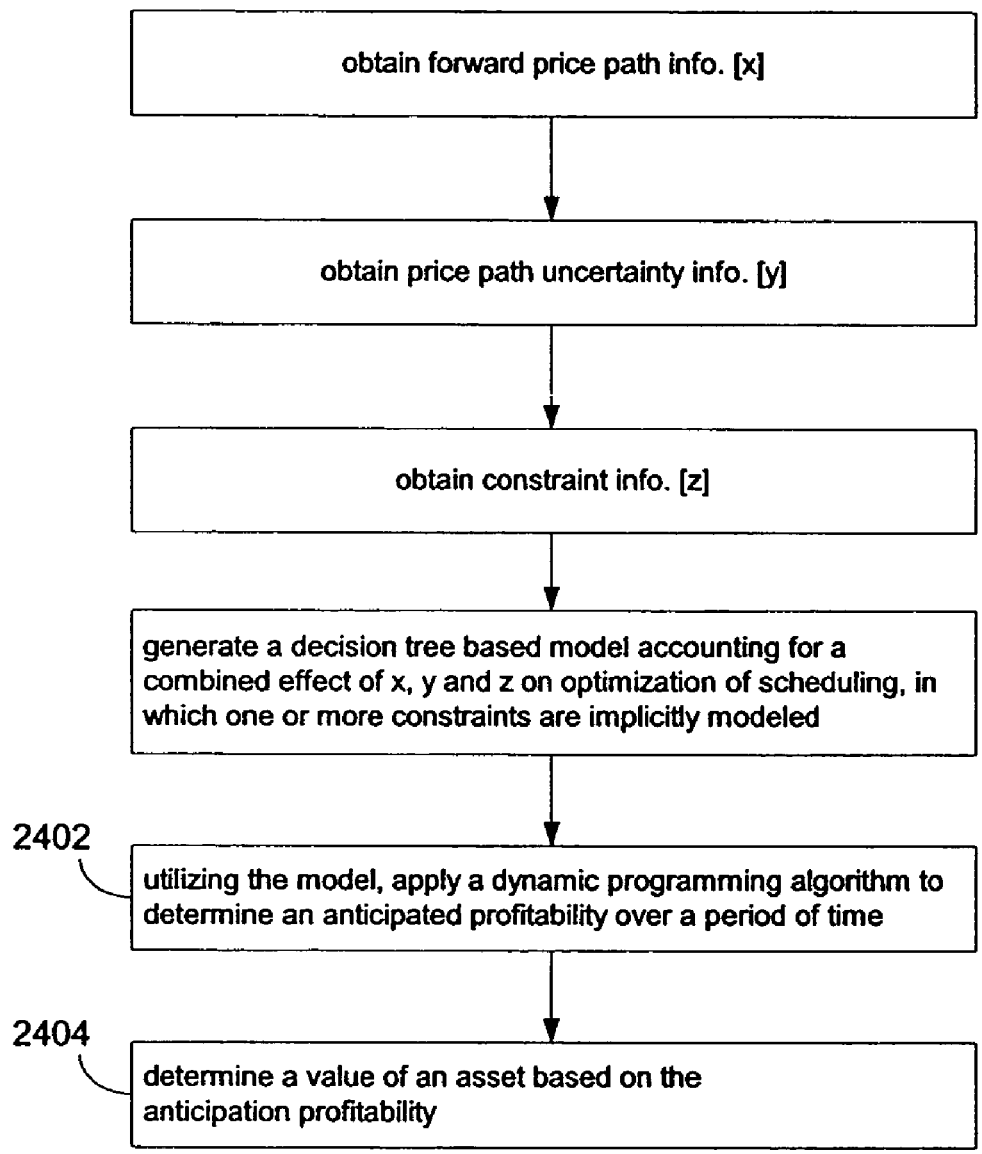
FIG. 24 is a flow chart depicting a method for operation of the asset valuation program depicted in FIG. 23, utilizing price path uncertainty information and a model with implicitly modeled constraint(s), according to one embodiment of the invention.

FIG. 24 is a flow chart depicting a method 2400 for operation of the asset valuation program 2302 depicted in FIG. 23, utilizing price path uncertainty information and a model with one or more implicitly modeled constraints, according to one embodiment of the invention. The method 2400 is in some ways similar to the method 2200 of FIG. 22; however, at step 2402, utilizing the model 2308, the dynamic programming algorithm 2304 determines an anticipated profitability and, at step 2404, the valuation algorithm 2306 determines a value of an asset based on the anticipated profitability.

Figure 25:
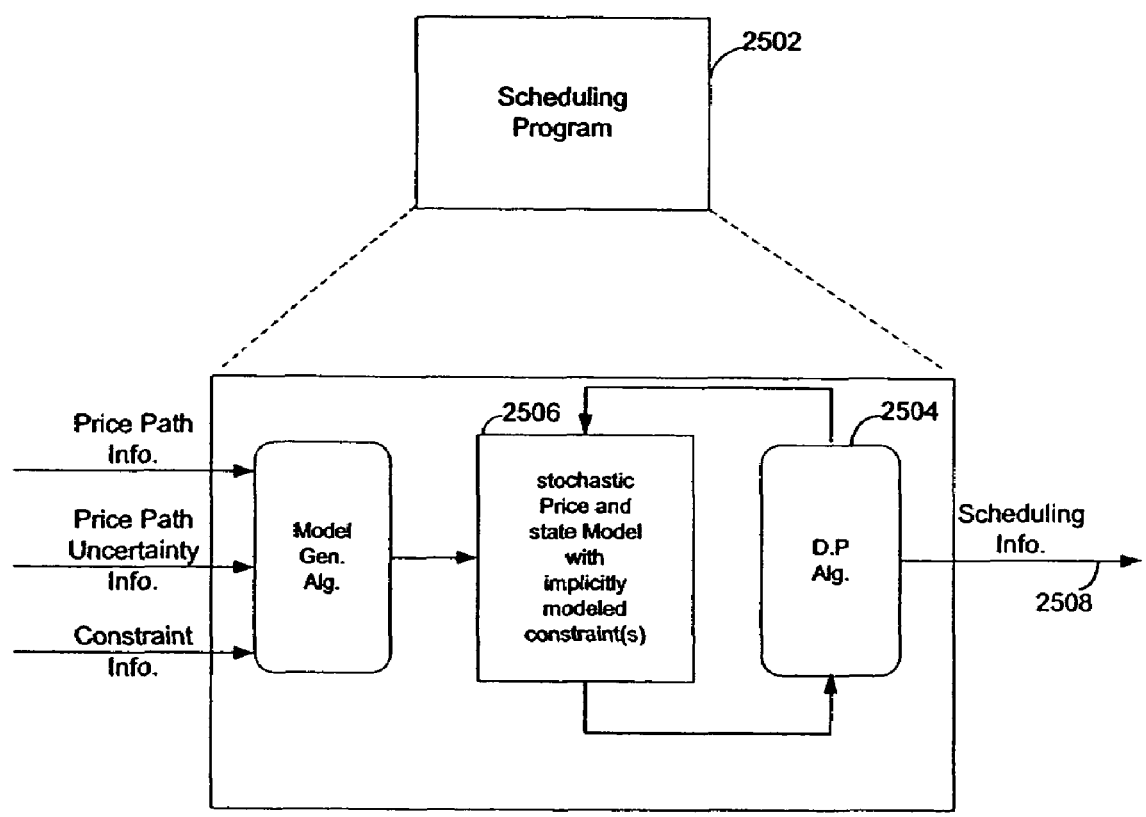
FIG. 25 is a block diagram depicting operation of an scheduling program that utilizes price path uncertainty information and a model with implicitly modeled constraint(s), according to one embodiment of the invention.

FIG. 25 is a block diagram 2500 depicting operation of a scheduling program 2502 that utilizes price path uncertainty information and a model 2506 with one or more implicitly modeled constraints, according to one embodiment of the invention. The operation depicted in FIG. 25 is in some ways similar to the operation depicted in FIG. 21; however, dynamic programming algorithm 2504 determines and outputs scheduling information 2508.

Figure 26:
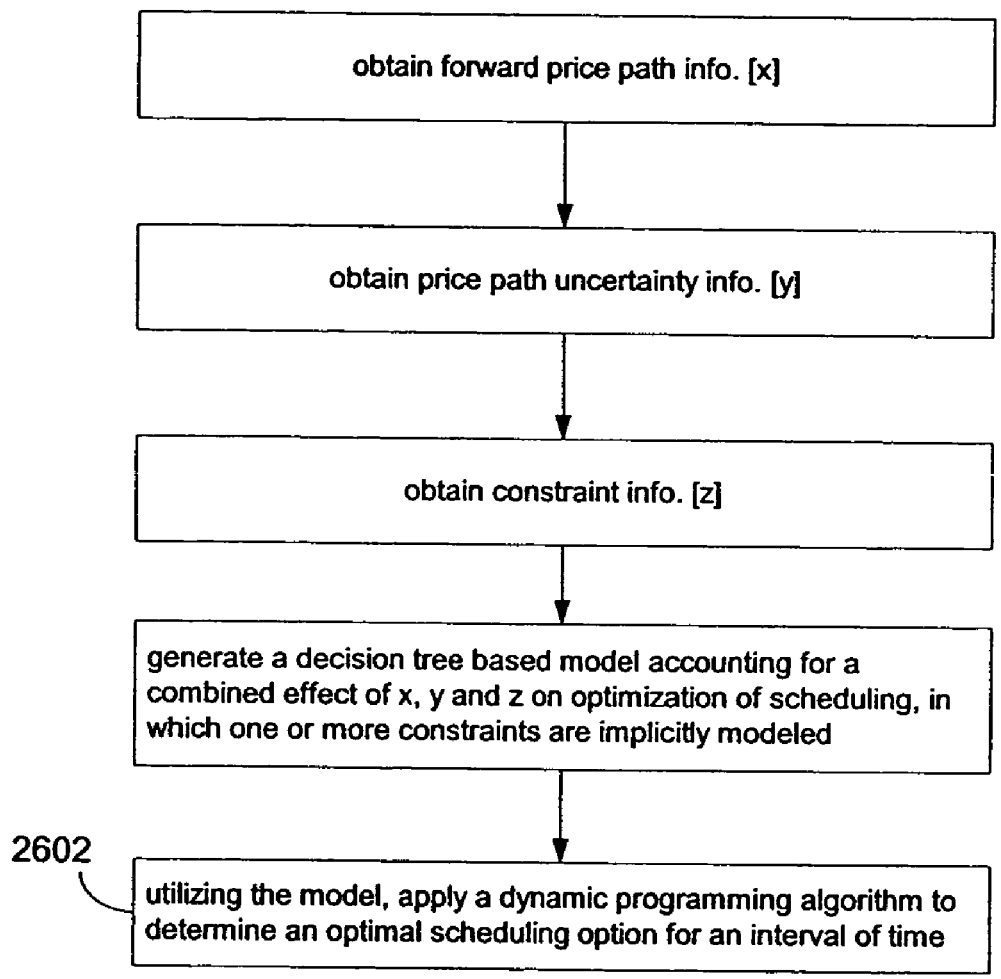
FIG. 26 is a flow chart depicting a method for operation of the scheduling program depicted in FIG. 25, utilizing price path uncertainty information and a model with implicitly modeled constraint(s), according to one embodiment of the invention.

FIG. 26 is a flow chart depicting a method for operation of the scheduling program depicted in FIG. 25, utilizing price path uncertainty information and a model with one or more implicitly modeled constraints, according to one embodiment of the invention. The method 2600 is in some ways similar to the method 2200 depicted in FIG. 22; however, at step 2602, utilizing the model 2506, the dynamic programming algorithm 2504 is applied to determine an optimal scheduling option or options for an interval, intervals, or a period of time.

Figure 27:
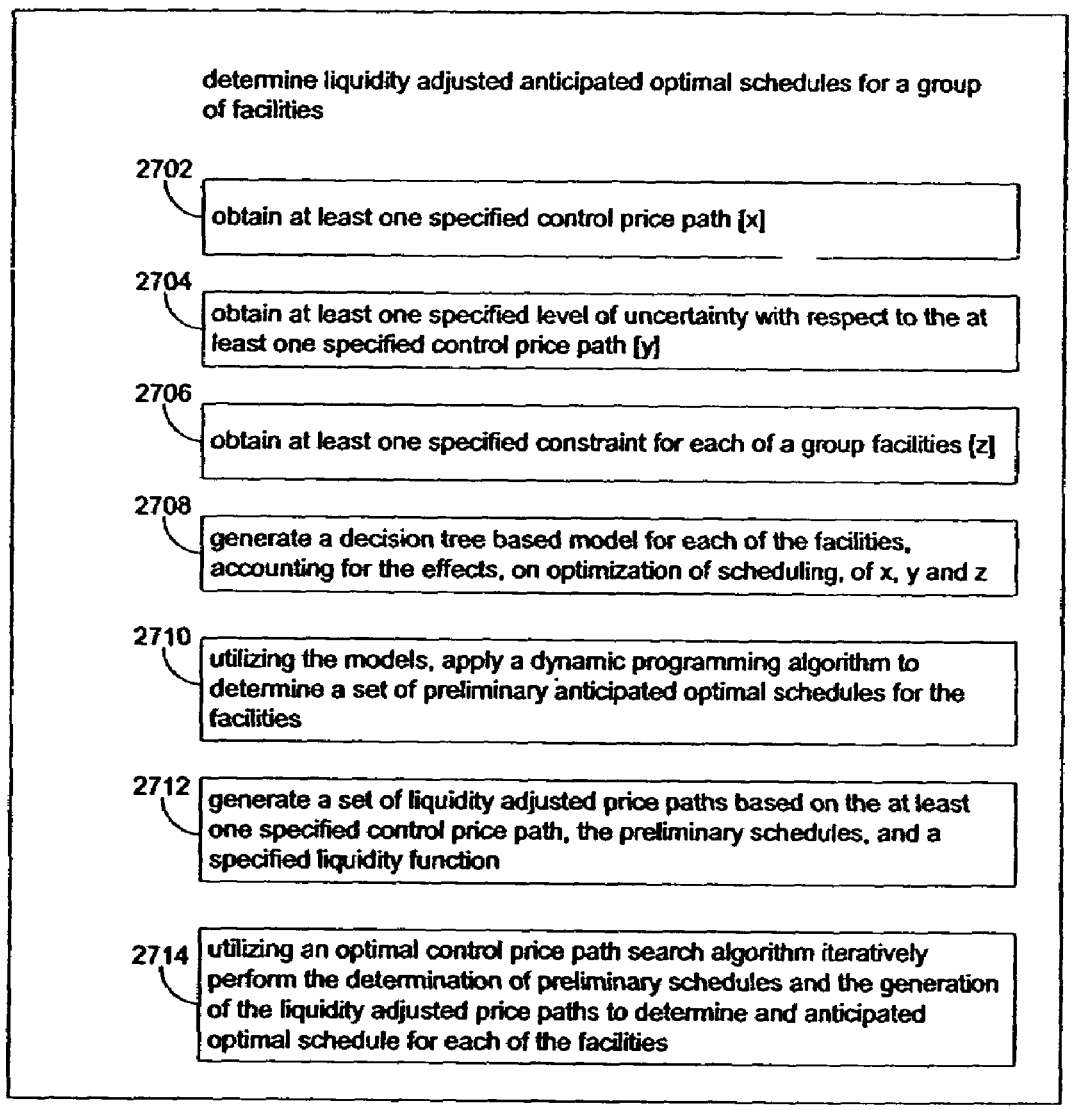
FIG. 27 is a flow chart depicting a method for determining liquidity adjusted anticipated optimal schedules for a group of facilities, according to one embodiment of the invention.

FIG. 27 is a flow chart depicting a method 2700, for determining liquidity adjusted anticipated optimal schedules for a group of facilities, according to one embodiment of the invention. As described below with reference to FIGS. 28-30, the determined liquidity adjusted anticipated optimal schedules can be utilized in determining anticipated profitability information, asset valuation information, and scheduling information for the group of facilities. In some embodiments, the methods of FIGS. 27-30 utilize methods described elsewhere herein, including, for example, models with implicitly modeled constraints, and stochastic price and state models. More detail regarding steps of FIGS. 26-30 can be found herein, among other places, under section headings, "Managing a Portfolio of Generation Assets," "Characterizing the Entity's Market Position," "Characterizing Market Liquidity," "Determining Optimal Dispatch Rules for a Portfolio of Generation Assets," "Optimizing Portfolio Dispatch Decisions," and "Suggested Search Algorithm."

At step 2702 at least one specified control price path is obtained. At step 2704, at least one specified level of uncertainty is obtained with respect to the at least one specified control price path. At step 2706, at least one specified constraint is obtained for each of a group of facilities. At step 2708, a decision tree based model is generated for each of the facilities, accounting for a combined effect, on optimization of scheduling, of the at least one specified control price path, the at least one specified level of uncertainty, and the at least one specified constraint. At step 2710, utilizing the models, a dynamic programming algorithm is applied to determine a set of preliminary anticipated optimal schedules for the facilities. At step 2712, a set of liquidity adjusted price paths is generated based on the at least one specified control price path, the preliminary schedules, and a specified liquidity function. At step 2714, utilizing an optimal control price path search algorithm, the determination of preliminary schedules and the generation of the liquidity adjusted price paths are iteratively performed to determine an anticipated optimal schedule for each of the facilities. In some embodiments, not all of the facilities in a group have constraints, and constraint information is not obtained for such facilities.

Figure 28:
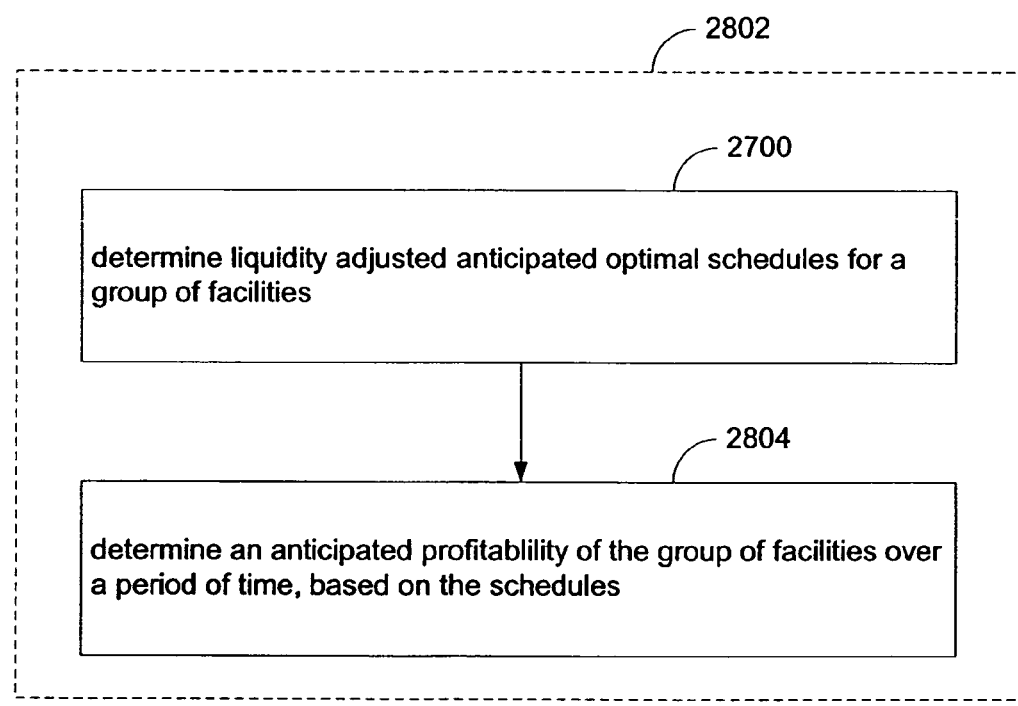
FIG. 28 is a flow chart depicting a method for using determined liquidity adjusted anticipated optimal schedules for a group of facilities to determine anticipated profitability for the group of facilities over a period of time, according to one embodiment of the invention.

FIG. 28 is a flow chart depicting a method 2800, performed by a joint anticipated profitability program 2802, conceptually represented by a broken line box, for using determined liquidity adjusted anticipated optimal schedules for a group of facilities to determine anticipated profitability for the group of facilities over an interval, intervals, or a period of time, according to one embodiment of the invention. The method 2800 commences with the method 2700, as depicted in FIG. 27. At step 2804, based on the anticipated optimal schedules determined at step 2700, anticipated profitability of the group of facilities is determined for an interval, intervals, or a period of time.

FIG. 29 is a flow chart depicting a method 2900, performed by a joint asset valuation program 2902, conceptually represented by a broken line box, for using determined liquidity adjusted anticipated optimal schedules for a group of facilities to determine a value of an asset, according to one embodiment of the invention. The method 2900 commences with the method 2700, as depicted in FIG. 27. At step 2904, based on the anticipated optimal schedules determined at step 2700, anticipated profitability information for the group of facilities is determined. At step 2906, the anticipated profitability information is utilized to determine a value of an asset associated with the group of facilities.

Figure 30:
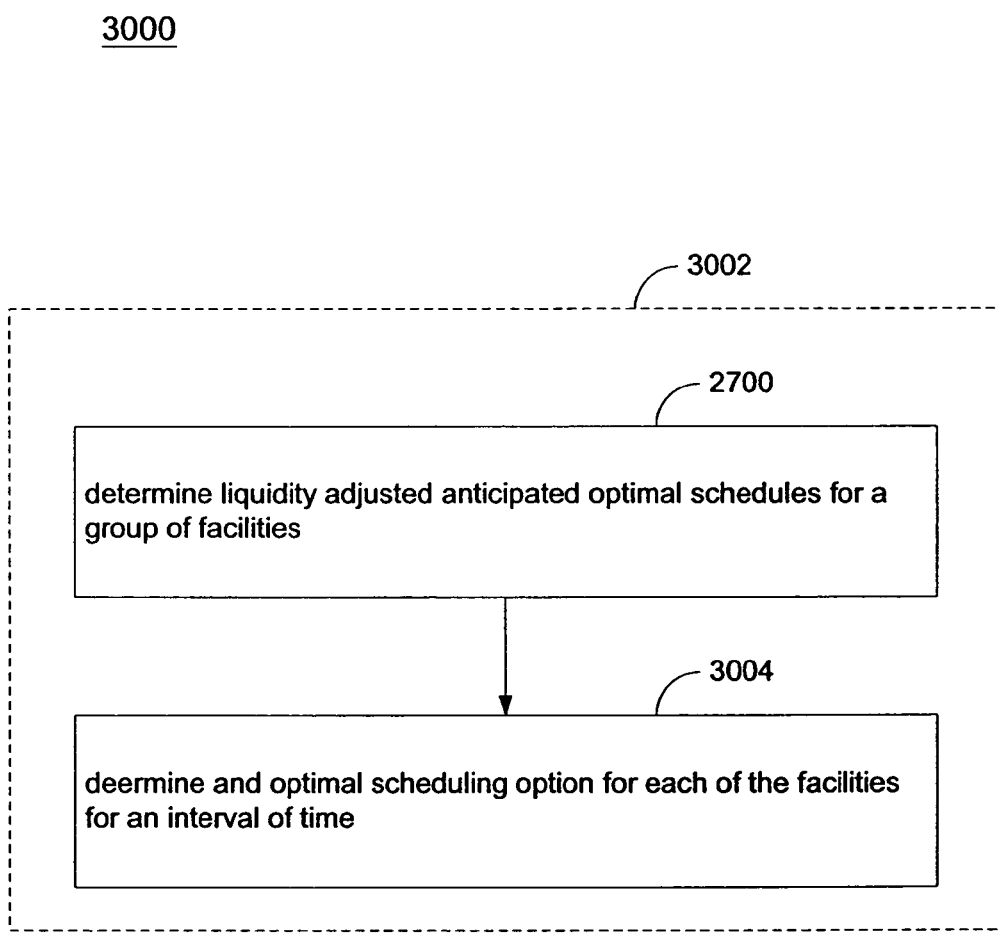
FIG. 30 is a flow chart depicting a method for using determined liquidity adjusted anticipated optimal schedules for a group of facilities to determine an optimal scheduling option for each of the group of facilities, according to one embodiment of the invention.

FIG. 30 is a flow chart depicting a method 3000, performed by a joint scheduling program 3002, conceptually represented by a broken line box, for using determined liquidity adjusted anticipated optimal schedules for a group of facilities to determine an optimal scheduling option for each of the group of facilities, according to one embodiment of the invention. The method 3000 commences with the method 2700, as depicted in FIG. 27. At step 3004, based on the anticipated optimal schedules determined at step 2700, an optimal scheduling option is determined for each of the facilities for an interval, intervals, or a period of time.

The following description provides details and examples of various embodiments and aspects of the invention.

Overview of Some Embodiments of Optimization and Modeling Methods

In some embodiments, the invention provides tools which provide decision support to electric utilities and power marketers with respect to operating, valuing and trading against generation assets. In some embodiments, the methods or systems of the invention can be broadly categorized in three stages: (1) a real option model of a generation asset, with detailed modeling of costs and physical constraints as well as market price uncertainty; (2) an integration of the real option model with a Monte Carlo simulation engine, producing as large set of statistics on the operation of the asset, and the associated costs and revenues; and, (3) a second optimization loop which iterates a set of control variables in order to maximize profit under additional constraints. These constraints can be long term operating limitations on a single asset, such as maximum number of starts in a year, or cumulative constraints on a portfolio of generator, such as the effect of an illiquid spot market.

In some embodiments, the real option model examines the price uncertainty in the market and values the physical flexibility of the asset in this context. In some embodiments, the technology of the option model can be broken apart into three pieces: (1) a trinomial tree model used to characterize price uncertainty in the market; (2) a model used to capture the costs and operating constraints associated with the asset; and, (3) an optimization algorithm which utilizes (1) and (2) in order to come up with an optimal dispatch rule for the asset and finds the associated expected profit from operating the asset.

Joint Monte Carlo and Tree Based Valuation Techniques

The tree based optimization algorithm produces a detailed set of hourly decision rules providing the user with the optimal dispatch decision for the asset as a function of the observed market prices in that hour. By combining this decision rule with a Monte Carlo engine for simulating future price paths, one can expand the amount of information provided by the model, including information on fuel usage or emission production, expected number of starts, or expected number of running hours in a given period.

Optimizing Over Global Constraints

In addition to the short term costs and constraints captured in the real option model, there may be additional limitations on the operation of the assets. One set of such constraints relate to the cumulative operation of a single asset over a long time period. This includes constraints on the maximum number of starts for a generator, minimum number of running hours in a year, or maximum fuel consumption/emissions from a unit. A second set of constraints apply the combined operation of a group, or portfolio, of assets. Up to this point, generators have been modeled as price takers in the market. The quantity of power sold out of any given generator is assumed to have no effect on the overall market price of electricity. In reality, the lack of depth in the power markets can impose significant penalties on market participants caught short in the market.

Either of these types of global constraints, long term constraints on a single asset or combined effect of a portfolio of assets, can be explicitly captured by incorporating the constrained variables as states in the real option model. However, this is typically extremely costly from a computational viewpoint, making the problem intractable. The algorithms described here use iterative search techniques in order to modify the inputs to the real option model (either the costs or market prices) to maximize the profit captured in the simulated dispatch cases. This approach has the advantage that it does not suffer from the 'curse of dimensionality' which occurs when one tries to explicitly model these constraints.

Trinomial Tree Based Real Option Model for a Generation Asset

From a financial perspective, a generation asset provides a return on investment for its owners by converting one commodity (fuel) into a second commodity (electricity) at a technology dependent conversion rate (the heat rate). As market prices for the two commodities vary, this conversion may be either profitable (the generator is said to be in the money) or unprofitable (out of the money). The operator has the flexibility to vary the output of the generator, including turning it off completely, in order to best capture the value of the spread between the commodities. The value of this optionality is modeled.

Example Problem Formulation

Maximize net profit from operating asset over a specified operating period spanned by the start and end dates, given a set of prices for fuel and electricity.

Constraints on the Generation Options

The flexibility the operator has in dispatching the asset is limited by a number of constraints. Specifically the following range of operation constraints are modeled:

Hourly constraints, limit the operation of the asset in any given hour:
$Q_{Max}$—maximum output—maximum generator output when the unit is 'on'.
$Q_{Min}$—minimum output—minimum generator output when the unit is 'on'.

Transitional constraints, limit the relative operation of the asset in consecutive hours:
$R_{Up}$—maximum ramp Up rate—maximum increase in generator output from one hour to the next.
$R_{Down}$—maximum ramp Down rate—maximum decrease in generator output from one hour to the next.

Commitment constraints, limit how frequently the generator can be turned on and off:
$RT_{ON}$—minimum ON run-time—minimum number of hours the generator must stay 'on' before being allowed to turn 'off'.
$RT_{OFF}$—minimum OFF run-time—minimum number of hours the generator must stay 'off' before being allowed to turn 'on'.

Operational Costs

There is a wide range of costs associated with the operation of generation assets. Typically, the most critical component to this is the fuel usage of the plant, dictated by its efficiency. This is generally expressed in terms of the heat rate of the plant (the lower the heat rate the more efficient the generator is). The heat rate itself can vary over the output level of the plant.

Figure 31:
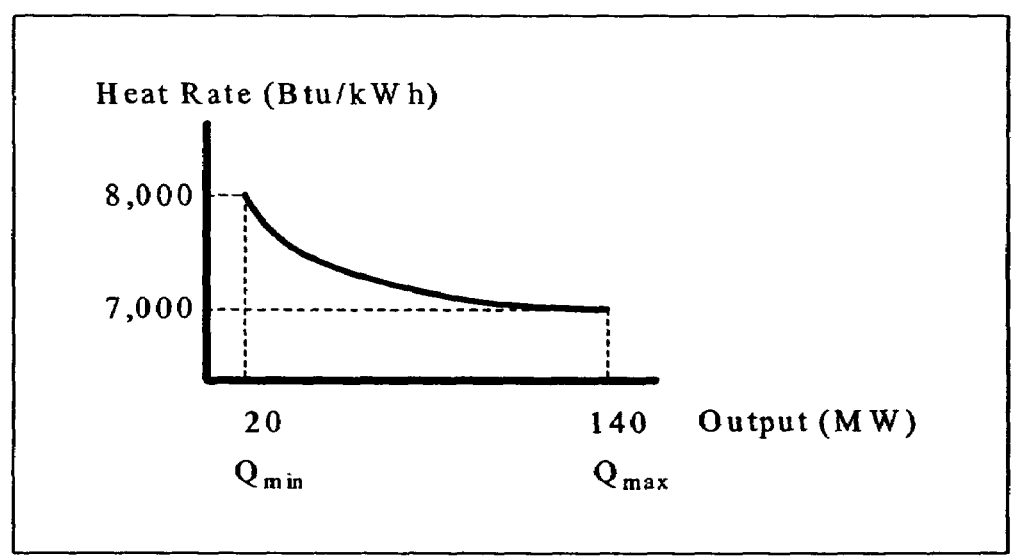
FIG. 31 depicts a graph of a heat rate function describing efficiency of a generator as a function of generation rate, according to one embodiment of the invention.

FIG. 31 depicts a graph 3100 of a heat rate function describing efficiency of a generator as a function of generation rate, according to one embodiment of the invention. The total fuel cost (TFC) in any given hour is a function of the average heat rate (HR) at the given output level (Q), and the spot price of the fuel ($S_f$):

$$TFC = HR(Q) * S_f * Q$$

In addition to the total cost of fuel, there is a component of the variable cost which is independent of the primary fuel type. The following costs are captured by the model:
NFC—non-fuel cost: proportional to the output of the generator, expressed in $/MWh.
RC—run cost: incurred in each hour the generator is in an 'on' state, independent of output level, expressed in $/h.
FC—fixed cost: cost incurred independent of operation, expressed in $/h.
Startup Cost: cost incurred when a generators is turned on, expressed in $ Shutdown Cost: cost incurred when a generator is turned off, expressed in $.

State Space Model for Generation Asset

In the previous two sections, operating costs and constraints of generation assets are described. Some of these, such as the fuel cost or maximum output level, characterize how the unit can operate at any given point in time. A second set of constraints, such as ramp rates and startup costs, describe the constraints and costs associated with changing the operating level of the asset over time. It is this second category which makes scheduling generation assets a dynamic optimization problem.

To capture the dynamic costs and constraints, a set of generator states are first defined which fully describe the operating level of the asset at any point in time:
$Q_h$—Generation Output: the power output level out of the asset in hour h, expressed in MW.
$RT_h$—Runtime: the number of hours the generator has been in an 'on' state (if it is currently on, or the number of hours the generator has been in an 'off' state (if it is currently off).

For each hour during the operation period, the state of the generator is defined by these pair of values ($Q_h$, $RT_h$). Using this convention, a decision tree is created. The decision tree captures all possible operating paths the generator can take during operating period.

Capturing Dynamic Constraints in a Decision Tree

The state pair ($Q_h$, $RT_h$), fully characterizes the operation of the generator in any hour. In addition it contains all the information needed to determine which operating states are feasible for the asset in the next operating hour. The current output combined with the maximum ramp up and ramp down rates limit the feasible output levels in the next hour. Specifically, the output level in hour h+1 is constrained as follows if the generator is running above its minimum level in our h:

$$\max\{Q_{min}, Q_h - R_{Down}\} Q_{h+1} \min\{Q_{Max}, Q_h - R_{Up}\}$$

for, $$Q_h\ Q_{min}$$

If the generator is running at the minimum output level, it has the option to either ramp up, or turn off (assuming it has fulfilled the minimum run-time requirement):

$$Q_{Min} \leq Q_{h+1} \leq \min\{Q_{Max}, Q_{Min} + R_{Up}\}$$

or, $$Q_{h+1} = 0, \text{ only if } RT_h \geq RT_{on}.$$

for, $$Q_h = Q_{min}$$

Finally, if the generator is in an off state, it has the option to stay off, or turn on (assuming it has fulfilled the minimum down-time requirement):

$$Q_{h+1} = 0$$

or, $$Q_{h+1} = Q_{Min}, \text{ only if } RT_h \geq RT_{Off}$$

for, $$Q_h = 0$$

Discrete State Space Formulation

In order to be able optimize over the possible decisions in each hour, it is first needed to create a limited number of possible decisions. This is achieved by discretizing the space of possible output levels of the generator. Two methods for this discretization are presented.

Ruthless Exercise

This approach assumes that the operator of the asset will always take full advantage of the ramp capability of the plant. That is, if a decision is made to ramp the plant up or down, it will be ramped either by the max ramp up or down rate, or until it reaches the min or max output level.

For a ruthless ramp up decision:

$Q_{h+1} = \min\{Q_h + R_{Up}, Q_{Max}\}$.

For a ruthless ramp down decision:

$Q_{h+1} = \max\{Q_h - R_{Down}, Q_{Min}\}$.

The algorithm also allows for a third decision, to stay put at the current output level:

$Q_{h+1} = Q_h$.

The concept of ruthless exercise is known in swing option modeling in finance, where it can often be shown that a ruthless strategy is always optimal. Given the complexity of constraints on the generation assets, specifically the arbitrary shape of the heat rate curve, optimality cannot be guaranteed for these types of real options. However, by limiting the generator to three dispatch decisions (up, stay, down) in each time period, one gets a very efficient spanning of the state space.

Figure 32:
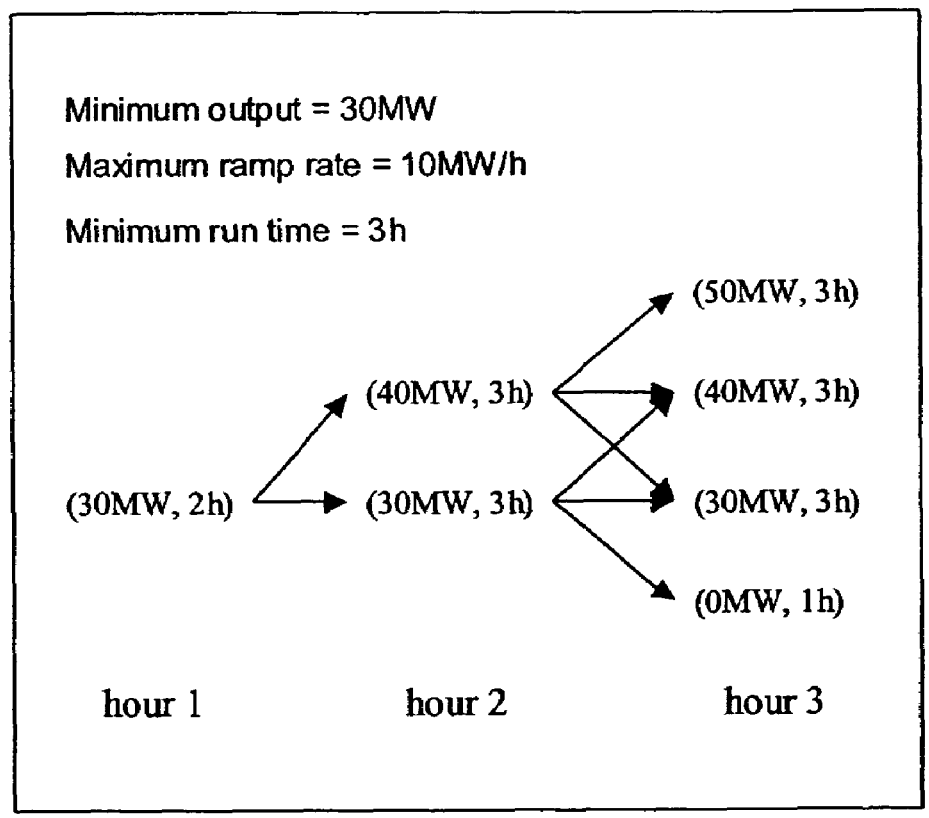
FIG. 32 depicts a decision tree for a generator, used in modeling dynamic operating constraints, according to one embodiment of the invention.

Based on these limitations on the exercise decisions of the operator, a decision tree can be created. The decision tree contains all possible operating paths for the asset over the operation period. An example of such a decision tree is given in FIG. 32, which depicts a decision tree 3200 for a generator, used in modeling dynamic operating constraints, according to one embodiment of the invention.

User Defined Operating Levels

While the ruthless exercise assumption does a good job of efficiently discretizing the output space, it may sometimes ignore intermediate output levels which are preferable to the dispatcher. For instance some gas fired plants are flexible enough to go from $Q_{Min}$ to $Q_{Max}$ in one hour. If the ruthless exercise algorithm is applied, the plant would only be dispatched at Q=0, $Q_{Min}$ and $Q_{Max}$.

Figure 33:
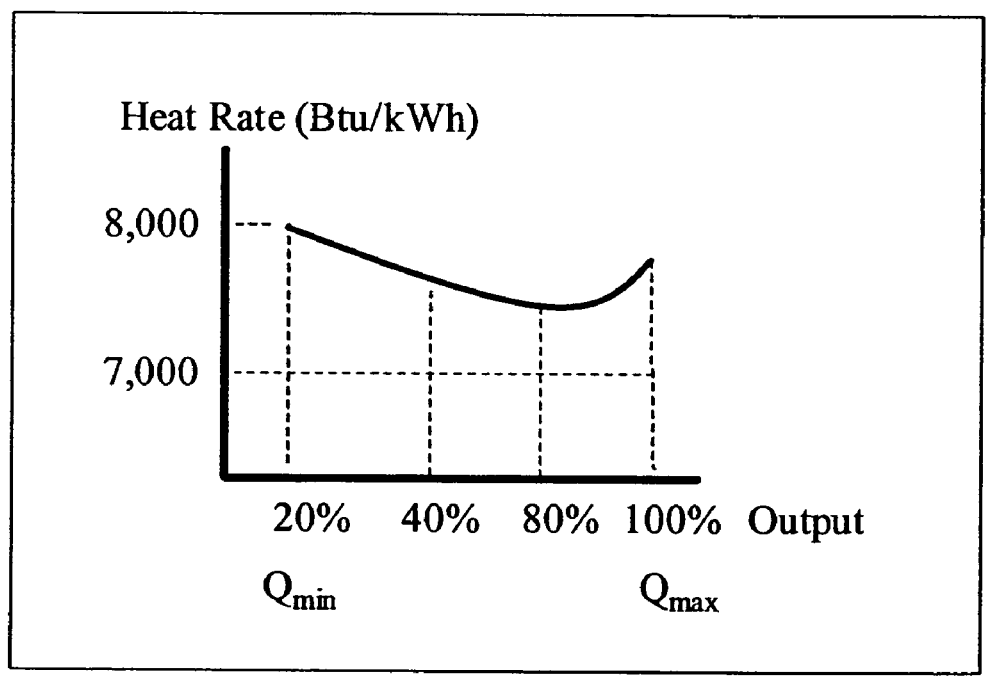
FIG. 33 depicts a graph of a heat rate function with intermediate efficient generation rates, according to one embodiment of the invention.

If, however, the plant's heat rate was significantly lower at some intermediate level, as depicted in FIG. 33, the scheduler might choose a non-ruthless dispatch rule. More specifically, FIG. 33 depicts a graph 3300 of a heat rate function with intermediate efficient generation rates, according to one embodiment of the invention.

Under the non-ruthless exercise approach, the user is able to define a series of operating levels at which the plant can be scheduled, and the average heat rate of the generator at these levels, as shown in the table 3400 depicted in FIG. 34. More specifically, FIG. 34 depicts a table 3400 of generation rates and associated heat rates for the generator associated with the heat rate function depicted in FIG. 33, according to one embodiment of the invention.

Figure 35:
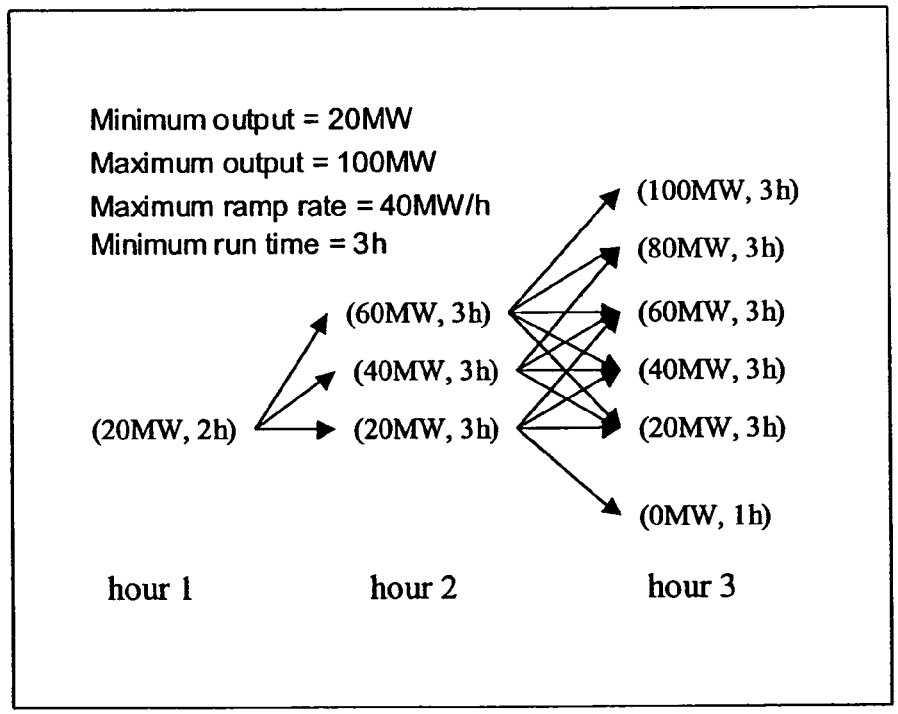
FIG. 35 depicts a decision tree, according to one embodiment of the invention.

Based on this user defined information a decision tree is then created. In contrast to the ruthless exercise approach, however, the tree can have more than three branches at any node. For instance, given the user defined levels shown in the above table, and a plant with $R_{Up} = R_{Down} = 40$ MW, the decision tree 3500 is created as shown in FIG. 35.

The user may define any number of allowable outputs (UDOs) thus enabling him to get arbitrarily close to an exact valuation. The only limit imposed is that for each state, there must be an adjacent reachable state, defined as follows:

Adjacent state constraint:

For each UDO $Q_i$, there must be at least one other UDO $Q_j$, such that:

$Q_j \geq Q_i - R_{Down}$ or, $Q_j \leq Q_i + R_{Down}$

If this condition is not fulfilled, $Q_i$ will not be reachable from any other state in the decision tree, or if $Q_i$ is chosen as the starting output level, no other states will be reachable.

Optimization for the Deterministic Case

First addressed is the problem of how to find a profit maximizing schedule for the plant given a known set of hourly future spot prices. This problem is known as the price based unit commitment problem. It has been traditionally solved using Lagrangean relaxation techniques. The use of a decision-tree methodology will allow us to capture a wider range of costs and constraints for the unit, including heat rate functions, or heat rate curves, of any shape, such as non-convex heat rate curves.

In some embodiments, the first step in optimizing the dispatch schedule of the asset is to superimpose the known future fuel and power prices on the decision tree. Given these prices it is now possible to map the applicable cost and revenue to each node in the decision tree. To each node is assigned the cost equal to:

$TFC_h + (NFC_h * Q_h) + RC_h + FC_h$

And a revenue equal to:

$S_h^e * Q_h$.

Where $S_h^e$ is the spot price of power.

Figure 36:
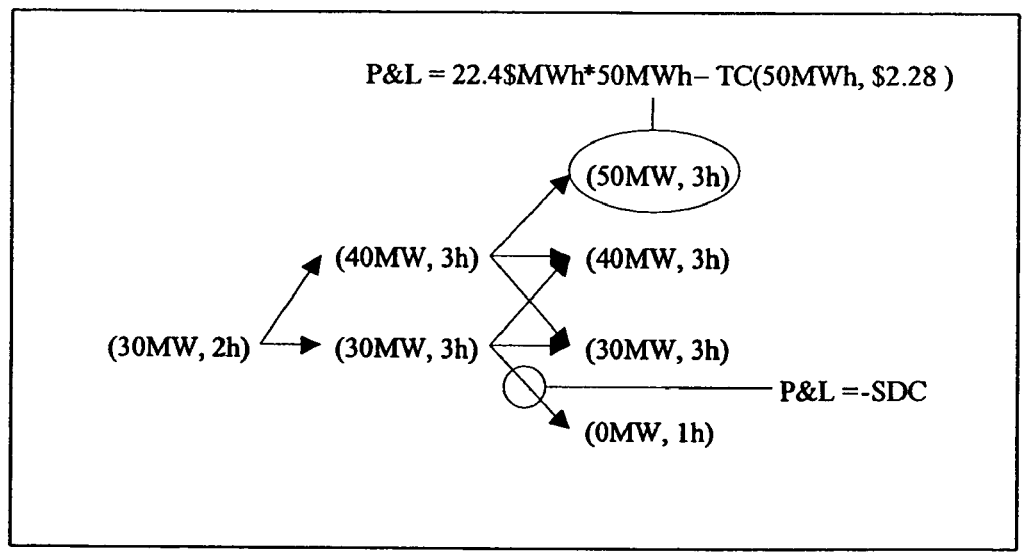
FIG. 36 depicts a decision tree including mapping of operating costs and revenues, according to one embodiment of the invention.

Finally, there are costs associated with the branches between the nodes. This is where startup and shutdown costs are captured. FIG. 36 depicts a decision tree including mapping of operating costs and revenues, according to one embodiment of the invention. FIG. 37 depicts a table 3700 of prices used in mapping of operating costs and revenues to a decision tree, according to one embodiment of the invention.

Having assigned a P&L value to each node, one can proceed to search for a profit maximizing path through the decision tree. A backward iterating algorithm can be applied, starting at the last time step in the operation period. In some embodiments, the methodology is as follows:

Each node in the last time step is assigned a value (V) equal to the P&L in that period as shown above. The notation ($V_{ijk}$) is used for the value of a node in time step i, with output j, and run-time k.

Select a node in the second to last time period; this will be referred to as the selected node.

Calculated the P&L for the selected node.

Find all nodes in the last period which are reachable from the selected node; these will be referred to as reachable nodes.

Assign an option value to each reachable node. The option value is equal to the value of the reachable node minus the cost associated with the branch from the current to the reachable node.

Select the reachable node with the highest option value; this will be referred to as the best reachable node. The branch from the current node to the best reachable node is stored as the optimal decision for the current node.

The current node is assigned a value equal to the P&L at that node, plus the option value of the best reachable node.

This process is repeated until a value has been assigned to all nodes in the second to last time period.

The process is then repeated for the third to last time period, and so on until the first hour of the operation period is reached.

Figure 38:
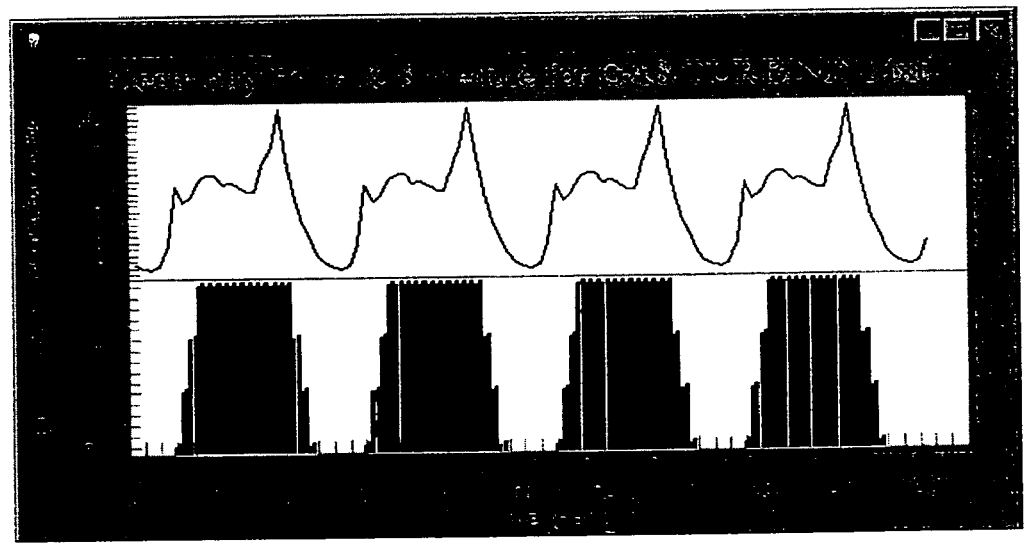
FIG. 38 depicts a graph showing a price forecast and anticipated optimal operating schedule, according to one embodiment of the invention.

In the first hour of the operating period, there is only a single possible operating state (the start state). The value at this state represents the total profit from optimally dispatching the asset over the entire operating period. Furthermore, beginning at the start node and following the optimal decision for each node, one can extract the optimal dispatch schedule for the period. FIG. 38 depicts a graph 3800 showing the forecasted price for electricity, and the associated profit maximizing operating schedule for a generator, according to one embodiment of the invention.

Optimization Under Uncertain Market Conditions

The scheduling optimization algorithm assumes that the operator of the asset has an exact knowledge of what the spot price of the fuel and power will be in each hour of the operating period. In reality, however, there is significant uncertainty associated with future price levels. Under these conditions the operators objective is to maximize the expected profit from scheduling the asset.

Utilizing the Arrival of New Information

As one approaches a given hour of operation, more information becomes available to help forecast the energy prices in this period (updated weather forecasts for instance). As a result the operator is constantly updating his dispatching decisions to reflect the best current knowledge of the future. This is a critical differentiator between the stochastic and deterministic optimization problems. In the deterministic case, it was sufficient to search for an optimal path of operating states over the period of operation. In the stochastic case, the optimal path will change as a function of the random outcomes of the stochastic price process.

In this model it is assumed that the dispatcher can update his dispatch decisions on an hourly basis, as new information arrives. To understand how to best apply this information, it is needed to first make some assumption of how price uncertainty is correlated over time. This is here done by building a stochastic spot price model.

Stochastic Price Model

It is assumed that that the spot price S(t) of the energy commodity follows a risk-neutral stochastic process defined in terms of the logarithm of the price by:

$$d \ln S(t) = [\alpha(t) - k(t) \ln S(t)] dt + \sigma(t) dW(t)$$

with $\alpha(t), k(t)$ and $\sigma(t)$ the time dependent drift, mean-reversion rate and volatility, respectively.

Therefore the following types of risk-neutral processes for the spot price are considered:

(i) Geometric Brownian motion process with constant volatility ($k(t)=0$ and $\sigma(t)=\sigma=$constant).

(ii) Mean-reverting process with constant volatility and constant mean-reversion rate ($k(t)=k=$constant and $\sigma(t)=\sigma=$constant).

(iii) Mean-reverting process with time varying volatility $\sigma(t)$ and time varying mean-reversion rate $k(t)$.

This model captures two crucial properties of electricity prices:

Seasonality—Average power prices vary predictably with respect to time of day, day of week and month of year. This is captured by the time varying drift parameter $k(t)$.

Mean reversion—Prices may suddenly spike, but tend to return to normal levels within a few hours or days. This property is captured by the mean reversion rate $\alpha(t)$.

The spot price model corresponds to a one-factor futures price model with a futures price stochastic process under the risk-neutral measure $$dF(t,T) = F(t,T)\sigma(t,T)dW(t),$$

and with the futures price instantaneous volatility $\sigma(t,T)$ being a deterministic function of time t and maturity T of the form:

$$\sigma(t,T) = \sigma(t) e^{-\int_t^T k(s)ds}$$

Trinomial Tree Model of Market Price Uncertainty

As with the decision states, it is needed to discretize the space of possible price levels in order to perform the optimization. This is done utilizing a trinomial-tree based methodology. The stochastic process is approximated for ln S(t) over a time interval $[T_0, T]$, where $T_0=t$ is the valuation date and T is the expiry (end of operation) date, with a trinomial tree process with N time steps defined by the sequence of dates $T_0, T_1, T_2, \ldots, T_N$. It is assumed that the initial forward price curve is available as input; that is, it is assumed to be given the sequence of futures prices $$S(t) = F(T_0, T_0), F(T_0, T_1), F(T_0, T_2), \ldots, F(T_0, T_N).$$

It is also assumed that the values of the mean-reversion rate function k(t) and of the spot price volatility function $\sigma(t)$ are known at the specified tree time slices, that is, $k(T_0), k(T_1), k(T_2), \ldots, k(T_N)$ and $\sigma(T_0), \sigma(T_1), \sigma(T_2), \ldots, \sigma(T_N)$, are given.

In some embodiments, the trinomial tree approximation of the price process can be built in two stages. In the first stage, a tree is built for the state variable $X(t)=\ln S(t)$ on the assumption that $\alpha(t)=0$ and $X(T_0)=0$. Starting from the vertex of the tree at $T_0$, for each successive time slice $T_i$ and each tree node at the given time slice, the rules for branching and the transition probabilities to the next time slice $T_{i+1}$ are chosen so as to match the conditional mean and variance of the state variable X(t) at $T_{i+1}$ conditional on the value of X(t) at the given node at $T_i$.

The second stage consists in creating the final tree for $S(t)=e^{X(t)}$ from the tree constructed in stage one by using forward induction and adjusting the values for X(t), at each tree time slice $T_i$, such that the tree gives an exact match of the initial forward price term structure which is assumed to be known. More precisely, the final tree for the price S(t) will be such that for each time slice $T_i$, the expectation of $S(T^i)=e^{X(T_i)}$ computed with the risk-neutral tree probabilities equals the forward price $F(T_0, T_i)$.

Figure 39:
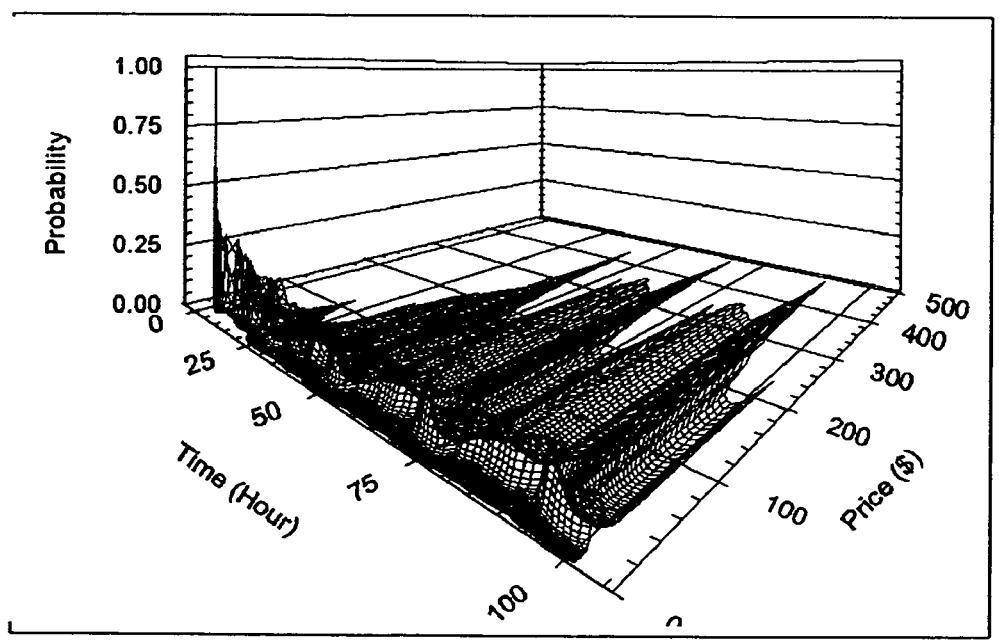
FIG. 39 depicts a spot price probability distribution graph generated by a trinomial tree based model, according to one embodiment of the invention.

A price state in the tree will be referred to as a node and label the nodes by (i,j), where i refers to the time slice $T_i$ (and equals the number of times steps from $T_0$) and j indicates the price level. Thus, $S_{i,j}$ will denote the price at node (i,j). FIG. 39 depicts a spot price probability distribution graph 3900 generated by a trinomial tree based model, according to one embodiment of the invention Optimization Algorithm for the Stochastic Case In some embodiments, the generation option model is valued using a multi-level trinomial tree—trinomial forest—methodology: trinomial tree approximation of the stochastic evolution of the electricity spot price in a one-factor model as outlined above, followed by option valuation by 'backwards induction' through the trinomial forest.

A node in the forest is characterized by time, price, and a pair (output level, run-time) characterizing the state of the generator, and thus labeled by (i,j,(Q,RT)). One can regard the forest as containing a tree isomorphic to the spot price tree for each possible generator state (Q, RT).

Working backwards from the final date in the exercise period to the valuation date through the trinomial forest, one computes the option value at each node (i,j,(Q,RT)) in the forest, as the maximum of the following possibilities—if these are permitted from the current (output level, run-time) state:

(i) If in an 'on' state, that is, a state (i,j,(Q*,RT*)) with Q*>0:
  No exercise decision value: equal to generator output value in current state plus the discounted expectation of the option values at the next time step i+1 from the tree with (Q=Q*,RT=RT*+1).
  Ramp up decision value: equal to generator output value in current state plus the discounted expectation of the option values at the next time step i+1 from the tree with (Q=min(Q*+$R_{Up}$·hb, $Q_{Max}$),RT=RT*+1).
  Ramp down decision value: equal to generator output value in current state plus the discounted expectation of the option values at the next time step i+1 from the tree with (max(Q−$R_{Dw}$·hb,$Q_{Min}$),RT+1).
  Turn-off decision value: equal to generator output value in current state minus the shutdown cost sdC plus the discounted expectation of the option values at the next time step i+1 from the tree with (Q=0, RT=1). The turn-off decision is considered only if the current run-time RT*≧$RT_{ON}$.

The generator output value $V_{(i,j,(Q^*,RT^*))}$ in the current state i,j,(Q*,RT*)) is:

$$V_{(i,j,(Q^*,RT))}=Q^*\cdot hb\cdot S_{i,j}-TC(T_i,Q^*)$$

(ii) If in an 'off' state, that is, a state (i,j,(Q*,RT*)) with Q*=0:
  No exercise decision value: equal to the discounted expectation of the option values at the next time step i+1 from the tree with (Q=0,RT*+1).
  Turn-on decision value: equal to the discounted expectation of the option values at the next time step i+1 from the tree with (Q=$Q_{Min}$,RT=1) minus the start-up cost suC. The turn-on decision is considered only if the current run-time RT*≧$RT_{OFF}$.

Figure 40:
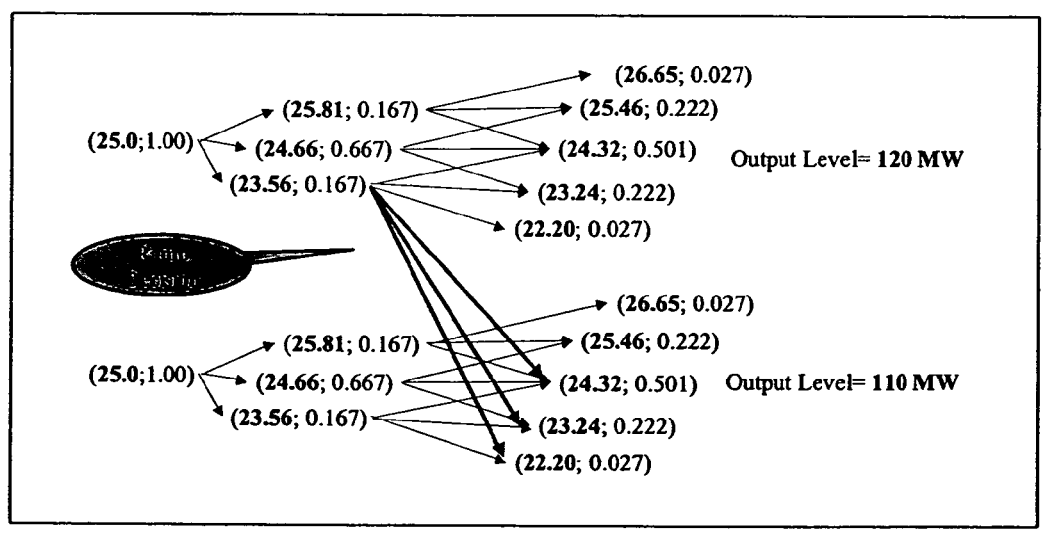
FIG. 40 depicts a trinomial forest, according to one embodiment of the invention.

For time steps i corresponding to dates $T_i$ prior to the starting date, $T^S$, one needs only to roll backwards the option values from the nodes at time step i from the tree corresponding to the specified starting state of the generator ($Q^S,RT^S$) in order to compute the final option value at the valuation date $T_0$=t. FIG. 40 depicts a trinomial forest 4000, according to one embodiment of the invention.

Outputs Returned by the Stochastic Optimization Algorithm

In some embodiments, the stochastic optimization algorithm returns two sets of results.
  Value of asset over the operation period. This is equal to the expected P&L earned by optimally dispatching the unit over this period.
  Decision rules for the asset at each time period and operating state and price. The algorithm stores the optimal dispatch rule at each node in the tree. This includes the optimal price issued at the current node in the tree.

Figure 41:
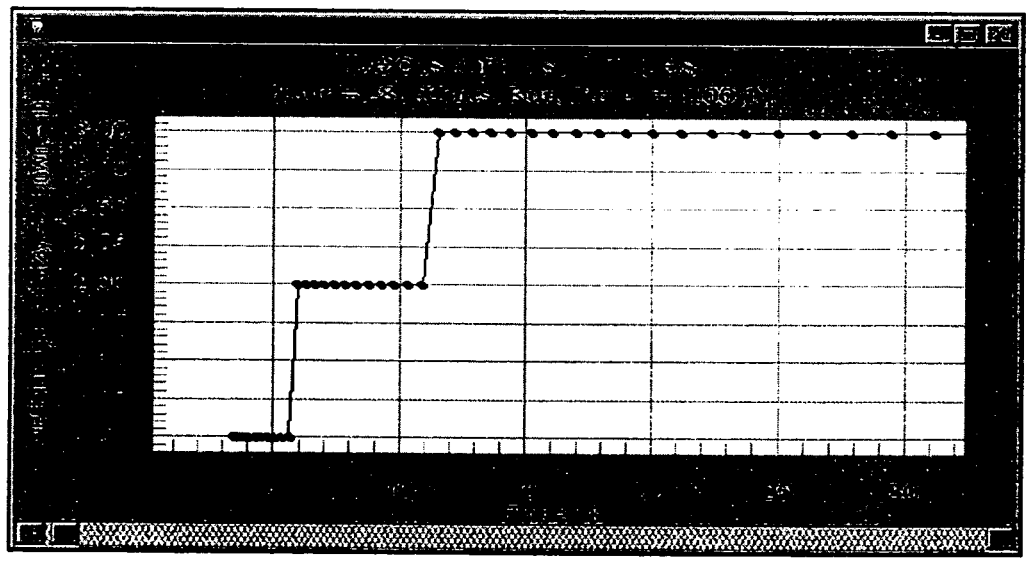
FIG. 41 depicts a graph showing an optimal decision rule generated by a stochastic optimization algorithm, according to one embodiment of the invention.

FIG. 41 depicts a graph 4100 showing optimal decision rule generated by a stochastic optimization algorithm, according to one embodiment of the invention.

Using Combined Tree and MC Methods

The trinomial tree based option model returns an accurate valuation of the option. However, to effectively operate and trade against an asset, the user may want more detailed information, including: (1) a decision rule for how do dispatch the plant under different market prices; (2) an hour by hour forecast of the expected output of the quantity of power produced by the unit, and a measure of the variability around this forecast; and, (3) expected fuel usage by hour, with a variability measure.

There are also factors influencing the return from operating the asset which are not under direct control of the operator, nor a function of market price uncertainty. Specifically, generation assets are subject to forced outages, periods where the generator is unavailable due to mechanical failure. Forced outages are random in nature, and can be of varying duration.

Extracting Decision Surfaces

The tree based optimization model returns an optimal exercise decision (ramp up/stay put/ramp down) at each node in the trinomial forest, as seen in FIG. 41. These decision rules are defined only in discrete price space (for the specific price nodes at each time step in the trinomial tree). In order to optimally schedule the generator given a path of simulated prices, however, a decision rule is needed over a continuous price space. To achieve this, it is taken advantage of that the decision is monotonic in price (see FIG. 42) and can therefore be compressed into two critical price trigger levels, the breakpoint between a ramp down and stay put decision (Low Boundary), and the breakpoint between a stay put and ramp up decision (High Boundary).

Figure 42:
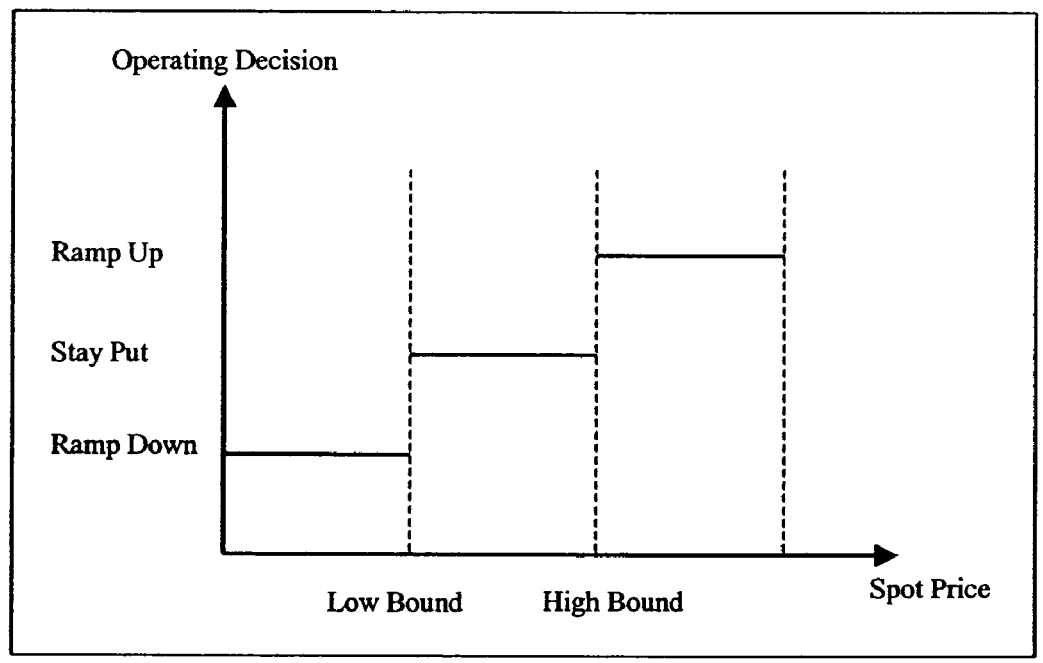
FIG. 42 depicts a graph showing optimal decision rule for a given time and output level, according to one embodiment of the invention.

A unique low/high boundary price pair is stored for each hour and possible operating state (output level, run time) during the operating period. FIG. 42 depicts a graph 4200 showing an optimal decision rule for a given time and output level, according to one embodiment of the invention. FIG. 43 depicts a table 4300 of values associated with an optimal decision rule, according to one embodiment of the invention.

Passing Simulations Through the Model

Hourly price simulations are generated based on the same stochastic differential equation which was used in the construction of the price tree:

$$d\ln S(t)=[\alpha(t)-k(t)\ln S(t)]dt+\sigma(t)dW(t)$$

At each step in the simulation process, the following process is repeated:
(1) the algorithm checks for the current state (unit/runtime) of the generator;
(2) the high/low boundary prices corresponding to this time period and state are retrieved;

(3) according to the relative value of the boundary prices and the simulated spot price for this period, the algorithm assigns an optimal dispatch decision (ramp up/stay/ramp down);

(4) the state of the generator is updated with the dispatch decision; and, (5) the simulated price for the next period is retrieved and the process is repeated.

Figure 44:
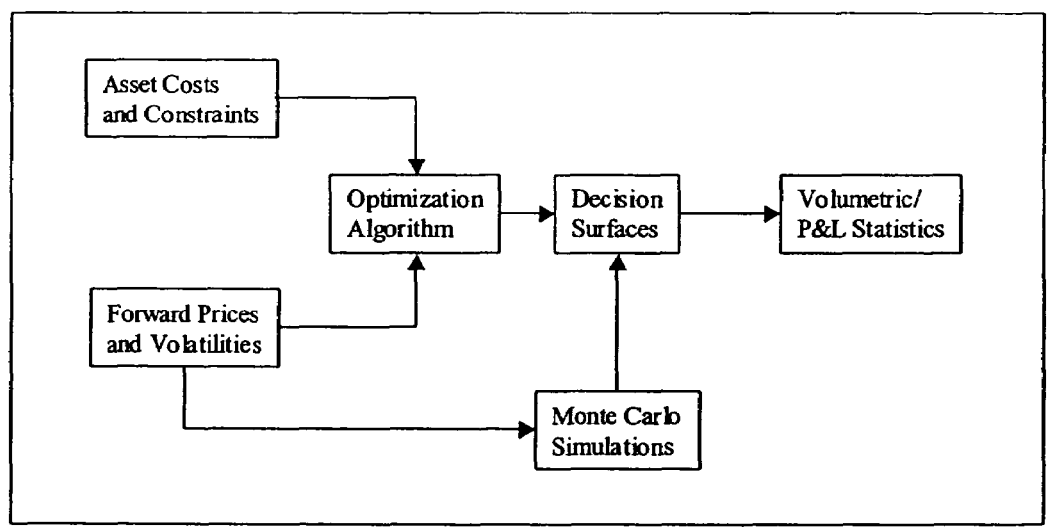
FIG. 44 depicts a block diagram of framework 4400 for incorporating Monte Carlo simulations into a dynamic optimization technique, according to one embodiment of the invention.

For each simulated price path, the algorithm keeps track of the hourly MWs production, associated fuel usage and total cost of production. This allows calculation of hourly statistics across all simulations, such as the expected output level and profit, as well as the standard deviation and confidence bounds around these expected levels. FIG. 44 depicts a block diagram of framework 4400 for incorporating Monte Carlo simulations into a dynamic optimization technique, according to one embodiment of the invention.

Incorporating Forced Outages

The simulation of the unit dispatch can be accompanied by a random process characterizing forced outages of the asset. Two sets of probabilities can be associated with a forced outage: (1) when the asset is in a spinning state (nonzero output level) there is a spinning outage probability; and, (2) when the asset is in a startup state (transitioning form a zero to minimum output level), there is a startup outage probability.

Figure 45:
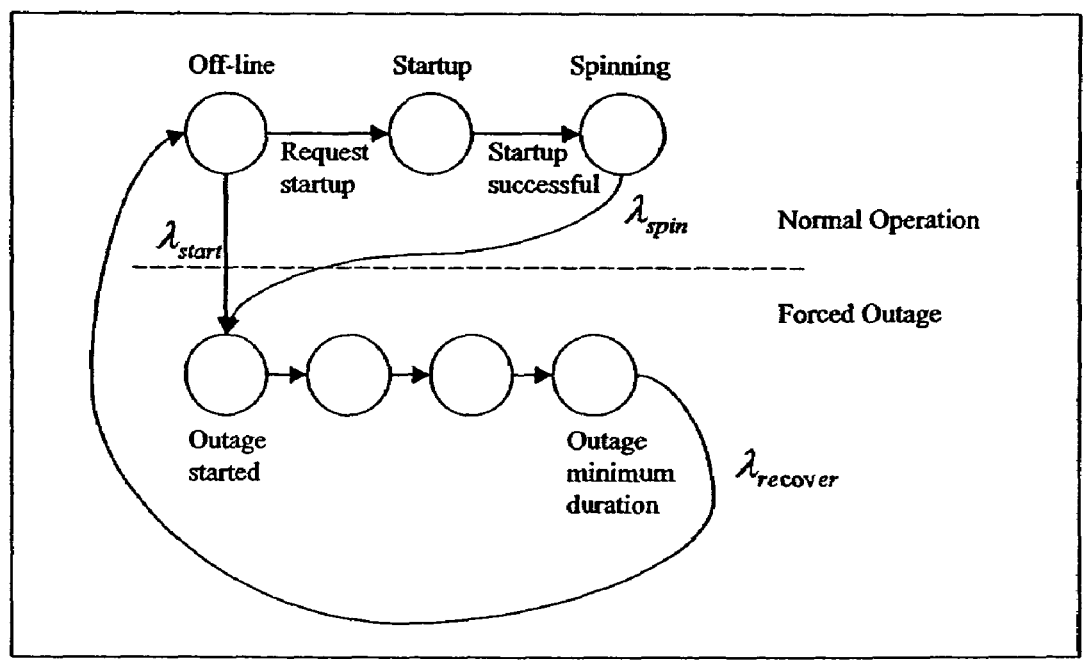
FIG. 45 depicts a flow diagram of operation of a generator in a forced outage situation, according to one embodiment of the invention.

In each hour that the unit is ether spinning or staring up, a random draw is taken to determine if an outage occurs. If the outage occurs, the generators output is forced to zero for a period equal to the user specified minimum outage duration. After this period, a random draw is taken to check the unit is allowed to return to normal operation, based on the user defined recovery probability. FIG. 45 depicts a flow diagram 4500 of operation of a generator in a forced outage situation, according to one embodiment of the invention.

Incorporating Long Term Constraints

Up to this point, the focus has largely been on optimizing the dispatch of the generation asset with respect to short term operational costs and constraints. Under certain circumstances, however, there can exist longer term constraints which effect the day to day operation of the asset. Examples of such constraints include the following.

1. Maximum number of total starts or cycles of the unit per year. Starting up and shutting down generation assets can put tremendous strain on the equipment. It is therefore common to impose a maximum limit on the number of turn on/turn off cycles that the unit can perform in a year.

2. Emissions constraints. Some regions have imposed limits on the total amount of emission gasses which can be produced out of a given unit each year. This effectively puts an annual limit on the number of MWh's produced by the plant.

3. Cogeneration constraints. Some plants are contracted to supply steam to neighboring industries (used for instance in paper mills). In order to meet this requirement, the plant must be in an 'on' state for a minimum number of hours each year.

Any of the above constraints can be captured explicitly by appending additional states to the operational model. For instance, a state could be added which tracks the cumulative number of starts up to the current operating hour, or a state could be added which tracks the cumulative number of MWhs of energy the generator has produced so far this year. The effect of this is to add another dimension to the decision tree. While conceptually this is a simple change, it can have a significant effect on the performance of the optimization algorithm. If the maximum number of starts allowed is 100 for instance, this will increase the width of the decision tree towards the end of the optimization period by a factor of 100. This is known as the 'curse of dimensionality' problem in dynamic programming. As more states are added to the model, the optimization problem quickly becomes computationally infeasible.

In order to circumvent the curse of dimensionality problem, a methodology is introduced for capturing long term constraints. To explain the approach, the case is used of a limited number of annual cycles as an example. Assume the generator is allowed 100 starts per year. The optimization algorithm, according to some embodiments, would be as follows:

1. Use the trinomial tree based model to calculate optimal decision rules at each time step, applying only the short term costs and constraints.

2. Simulate a set of N spot price paths over the operating period.

3. Apply the decision rules calculated in (1) to each of the simulated spot price paths to derive a set of N operating schedules for the generator over the operating period.

4. For each operating path, calculated the total number of starts over the operating period.

At this point, the performance of the decision rules can be evaluated with respect to the long term operating constraints. Since the maximum number of starts constraint was ignored when deriving the operating constraint, it is possible that some or all of the N operating paths violate this constraint. The user now has to select a condition for what constitutes a reasonable criterion for compliance with the constraint. Candidate conditions could be:

The average number of starts per year over all simulated paths is less than the maximum allowable number of starts.

Fewer that X % of the paths violate the maximum number of starts criterion.

Given a criterion for compliance, the algorithm proceeds to modify the hourly decision rules in order to meet this criterion. This can be done by applying a penalty factor to each start up decision for the asset. Since there is already a parameter associated with the start-up cost of the asset, this variable can simply be modified until the long-term criterion is met.

5. Compare the number of starts from the simulated paths with the compliance criterion. If the criterion is satisfied, the process is done. If the criterion is violated, proceed to search for the minimum increase in the startup cost which will satisfy the compliance criterion.

6. A number of different search techniques can be applied to find the new startup cost. A simple but effective approach is to use a binary search algorithm.

Double the startup cost, and re-run the tree based optimization algorithm to arrive at a new set of hourly decision rules.

Apply these rules to a set of N simulated spot price paths to calculate N operating paths for the asset.

Compare the number of paths to compliance criterion. If the criterion is satisfied, select the midpoint between the current and the previous startup costs and re-run the optimization algorithm.

Repeat this process until an acceptable level of accuracy is achieved.

Figure 46:
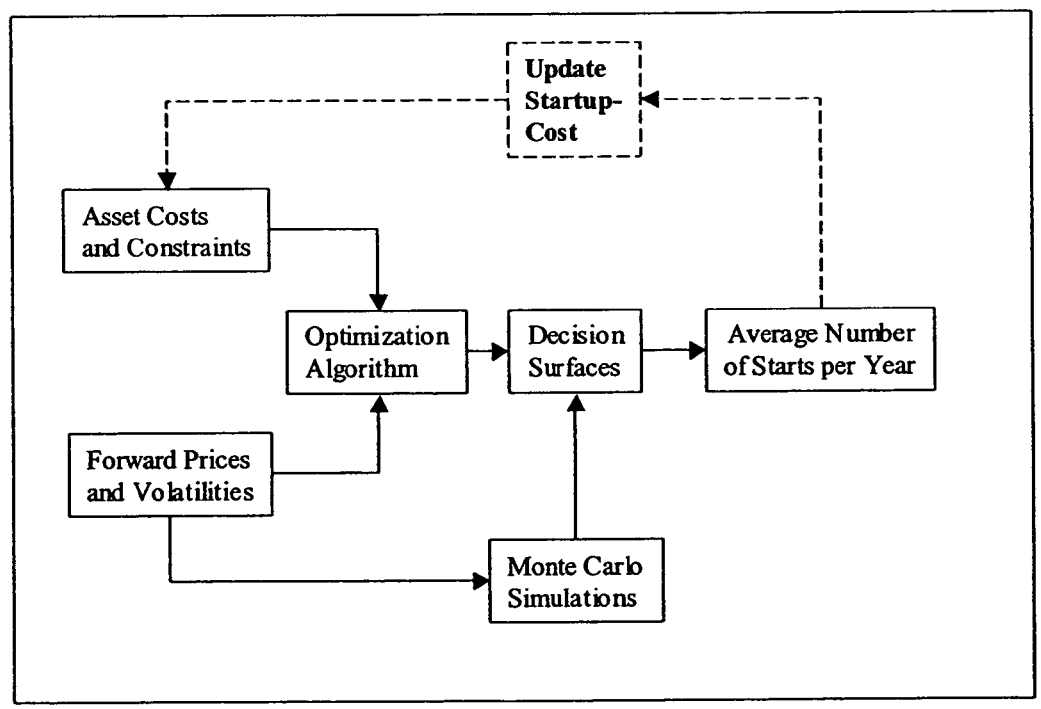
FIG. 46 depicts a flow diagram showing a method of dynamic optimization for operation of a generator incorporating a constraint on a number of starts per year for the generator, according to one embodiment of the invention.

At the end of the process the algorithm returns the minimum increase in the startup cost for which the long term operating criterion is met. This variable also has an intuitive interpretation. It represents the opportunity cost of using up one start given that the number of total starts are limited. FIG. 46 depicts a flow diagram 4600 showing a method of dynamic optimization for operation of a generator incorporating a constraint on a number of starts per year for the generator, according to one embodiment of the invention.

The same algorithm can be applied for the two other examples mentioned. In the case where the total number of MWh of energy produced is limited, the cost which is incremented is the non-fuel cost component. Increasing this cost will decrease the level of output of the plant at any given price level. Alternatively, if the emissions produced by a plant are a nonlinear function of the operating level, then the heat-rate itself can be iterated. For the case where there is a minimum constraint on the number of hours the unit is in an 'on' state, the 'run cost' parameter is altered in the plant cost function in order to effect the dispatching decision. Lowering the run cost will cause the plant to be dispatched for more hours during the year.

From here on, the incremental changes in any of the cost parameters of the plant due to long term constraints will be referred to as 'shadow costs'. As will be shown, it is important to separate these costs out from the 'real' operational costs of the plant when valuing the asset.

Application of Shadow Costs in Asset Valuation

When valuing an asset or tolling agreement with long term constraints using this methodology, it is significant to be careful in how the shadow costs are applied in calculating the expected P&L. Once the shadow cost has been calculated for the associated long term constraint, the valuation of the asset or contract can take place in three steps.

The shadow cost is added to the original plant costs, and the combined costs are used to calculate the optimal hourly decision rules.

The decision rules are applied to simulated price paths in order to generate a set of operating paths for the asset.

From the operation paths, the revenue and cost for each path is calculated using the original cost parameters (ignoring the shadow costs). The value of the asset is given as the average net profit over all simulated paths.

Figure 47:
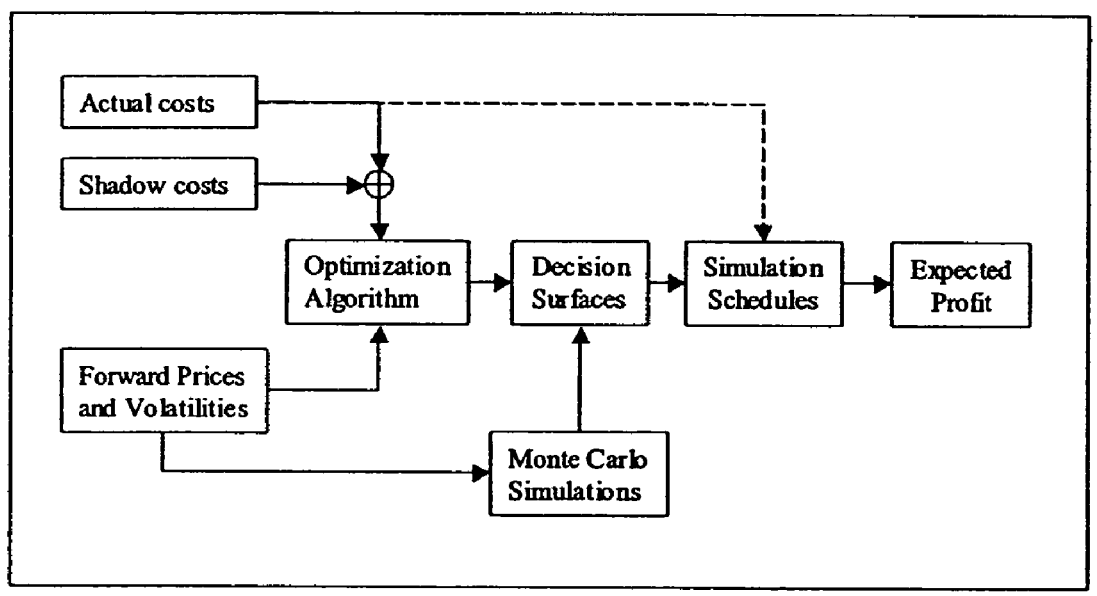
FIG. 47 depicts a block diagram showing a technique for anticipated profitability determination, accounting for actual and shadow cost factors, according to one embodiment of the invention.

In essence, the shadow costs are used to alter the optimal decision rules created by the trinomial tree based optimization algorithm. However, since the shadow cost parameters do not reflect actual payments by the owner of the asset, they are not included when calculating the expected net profit from operating the asset. FIG. 47 depicts a block diagram 4700 showing a technique for anticipated profitability determination, accounting for actual and shadow cost factors, according to one embodiment of the invention.

Managing a Portfolio of Generation Assets

An electric utility may own a large number of power plants, with varying generation technologies and fuel sources. In addition they typically have long term obligations to provide electricity to end users on a residential, commercial or industrial level. The mix of assets and obligations affiliated with a given entity is referred to herein as its portfolio.

A major concern of utilities therefore is how to, given their assets in place, fulfill their obligations while maximizing their profit. An algorithm has been described for arriving at optimal decision rules for a generator given a set of uncertain market conditions. The decision rules are designed to maximize the expected net profit earned from the asset, and they are independent of any other assets or obligations affiliated with the owner. The assumption is that multiple power plants are controlled by the same entity, and their value can be optimized by maximizing the value returned by each plant individually. This assumption will hold true only if the dispatch decision of one set of plants does not effect the revenue received by any other plant in the portfolio. Net profit from a plant is given by:

$$\Pi = (S^e * Q) - TC(S^f, Q).$$

Where $S^e$ is the spot price of electricity, $S^f$ is the spot price of the fuel, and TC is the total cost function of the plant depending on the total output Q. The quantity is controlled by the dispatcher on a plant by plant basis, while the spot price of fuel and electricity are treated as exogenous random variables. As long as the spot prices are assumed to be independent of the quantity of power produced by the generator, then a profit maximizing dispatch rule can be derived on a plant basis as described earlier in this document. This assumes that the markets for electricity and fuel are sufficiently liquid so that any trade by a single entity does not affect price levels. Unfortunately, markets for electricity often do not fit this criteria. Regions may be severely limited by transmission capacity as to how much power can be imported or exported. This creates situations where only limited amount of power is available on the spot markets, or where attempts to buy large quantities drives the price of power up significantly. Limitations on the liquidity of spot markets can have a profound effect on the decision process of the portfolio manager. Deciding to turn off an out of the money generator may cause the price of power to go up, and thereby increase the cost of meeting the load obligations. To optimize the profit of the overall portfolio under such circumstances, it is no longer sufficient to independently optimize the dispatch of each generator. The portfolio has to be viewed as a whole, and each individual dispatch decision viewed in context of the decision made by other generators.

Generalized Method for Optimizing Portfolio Asset Dispatch in Illiquid or Imperfect Markets The methodology as described herein primarily with reference to use in valuing and scheduling portfolios of generation assets under price uncertainty when markets are imperfect can be generalized to apply to a wider set of asset scheduling and option exercise problems. Specifically, the methodology applies to various situations, including situations in which an entity owns or controls a portfolio of assets (including derivatives) to be scheduled or exercised, where the market is imperfect, and where the resulting price of the underlying commodity or commodities is affected by the scheduling or exercise decisions of the owner or operator of the facility or facilities.

The methodology is described herein particularly with reference to cases where the constraints or payoffs on the assets are path dependent, requiring dynamic optimization techniques to derive an optimal exercise strategy. In general these problems can be solved by jointly optimizing over all assets in the portfolio. However, for dynamic optimization problems, such an approach often becomes intractable due to the "curse of dimensionality" effect where the number of states in the optimization grows exponentially with the number of assets in the portfolio.

In some embodiments, the methodology described herein utilizes an iterative approach in which, during each iteration, the exercise strategy for each asset is individually optimized subject to a control price curve. Between each iteration, the control price curve is modified, until the objective function of the owner is maximized.

Components of the Algorithm

In some embodiments, the algorithm consists of four components: the asset model, the market model, asset optimization algorithm, and the portfolio iteration logic.

The Asset Model

In some embodiments, the asset model provides a detailed model of the dynamic costs and constraints associated with the asset or assets.

The Market Model

In some embodiments, the market model is a model describing the uncertain behavior of market prices. Also, for illiquid markets, the market model provides a description of the impact of a market participant's actions on the market price or prices.

The Asset Optimization Algorithm

In some embodiments, the asset optimization algorithm provides an algorithm that takes as inputs the asset model and market model parameters, and generates a set of exercise rules for operating the asset in future periods.

The Portfolio Optimization Algorithm

In some embodiments, a set of input parameters for the market model are designated as the control curve (for example the forward curve). Each asset in the portfolio is scheduled based on the default set of market parameters (first iteration). The portfolio optimization algorithm contains the logic for updating the control curve based on the results from each iteration, until satisfactory optimum or near-optimum scheduling has been reached. In different embodiments, the portfolio optimization algorithm can include numerous search methodologies (such as grid or binary searches) as well as optimal control techniques.

Characterizing the Entity's Market Position

Figure 48:
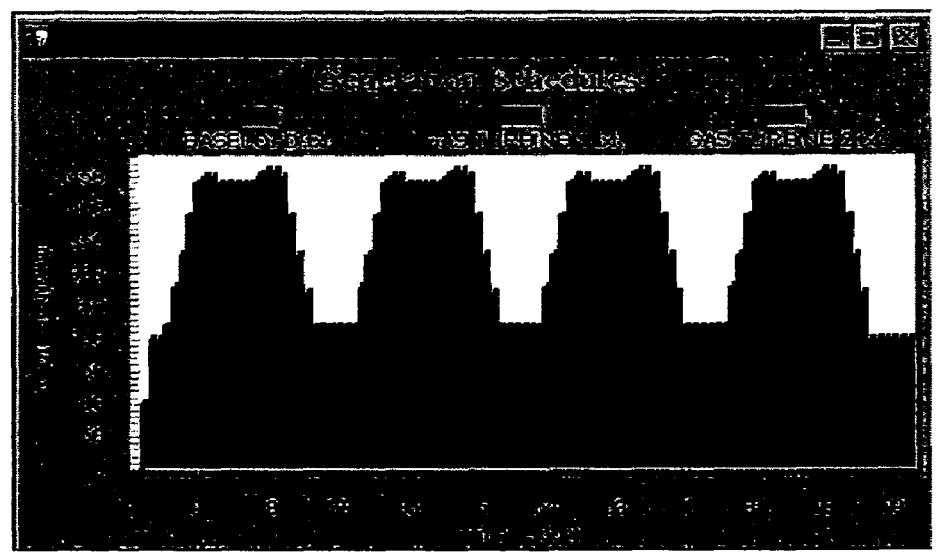
FIG. 48 depicts a graph showing a total generation schedule for a portfolio of generators, according to one embodiment of the invention.

To establish the net market position of an entity, it is needed to model its net long and short positions in the market. The long positions are given by adding up the production schedules for all the generators in the portfolio (see FIG. 48). The short positions are characterized by load obligations. Obligations to serve load are typically characterized as hourly profiles, denoting the amount of power to be delivered in each time period. FIG. 48 depicts a graph 4800 showing a total generation schedule for a portfolio of generators, according to one embodiment of the invention.

Subtracting the total scheduled generation from the total load obligation gives us the net position of the entity in the spot market. The net position can change from hour to hour, and it is referred to as the imbalance curve ($I_h$), $$I_h = \left(\sum_i Q_h^i\right) - L_h$$

Figure 49:
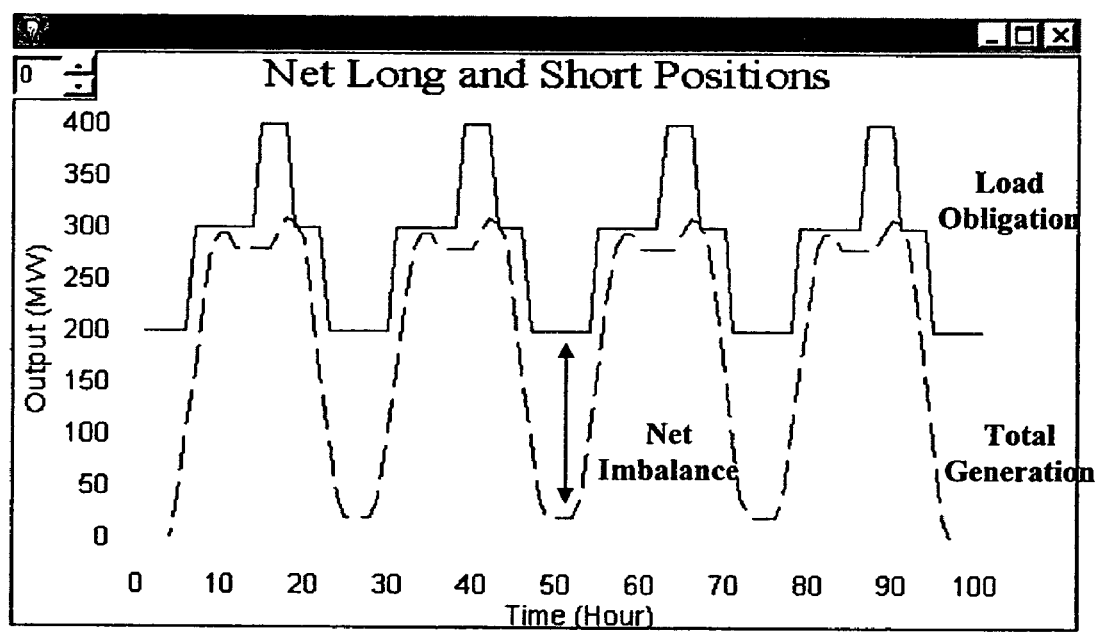
FIG. 49 depicts a graph showing an imbalance between total generation and load obligations for a portfolio of generators, according to one embodiment of the invention.

$L_h$ ≙ Total load obligation for hour h
$Q_h^i$ ≙ Ouptput from plant i for hour h FIG. 49 depicts a graph 4900 showing an imbalance between total generation and load obligations for a portfolio of generators, according to one embodiment of the invention.

Characterizing Market Liquidity

The imbalance between the load obligations and generation must be compensated for by purchasing or selling power on the spot market. As demand on the spot market increases, however, prices tend to go up. This property of the market is characterized by introducing a liquidity function. The liquidity function characterizes the resulting spot price ($S_h$) in hour h as a function of the net long-short position of the market participant:

$$S_h = f(I_h)$$

Figure 50:
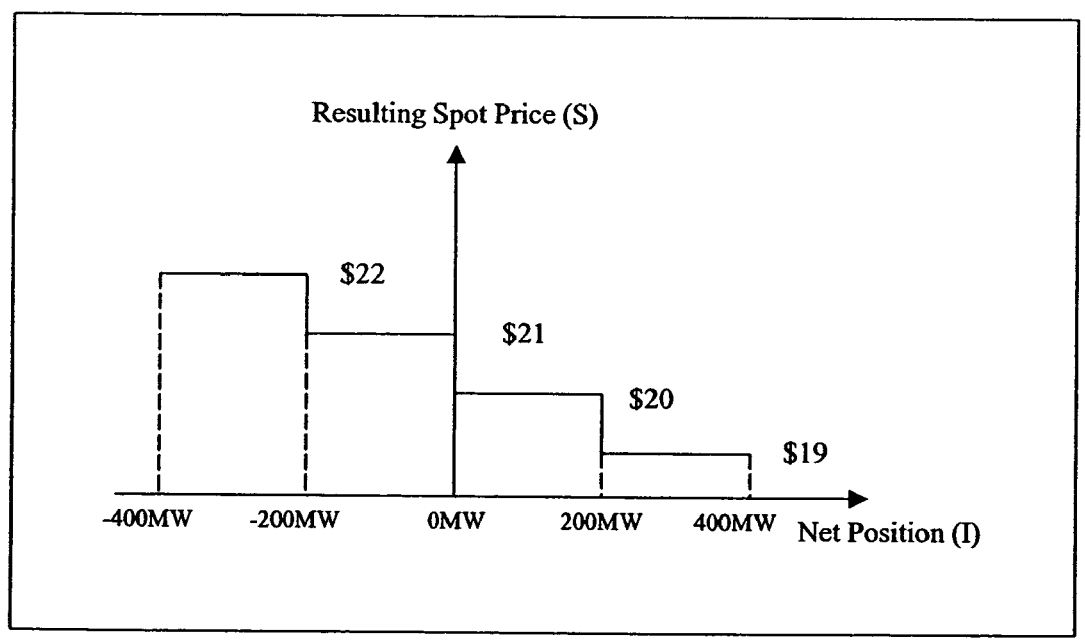
FIG. 50 depicts a liquidity curve characterizing spot prices as a function of net purchase and sale decisions, according to one embodiment of the invention.

In effect it describes the residual demand/supply curve faced by the market participants. Estimating the liquidity function may be difficult. In some regional markets, historical bids from suppliers are published after a delay period. This information can then be used to try and estimate the shape of the liquidity functions. When such information is not made public, one may have to rely on knowledge of the installed generation capacity of various technologies in a region, and the relative costs of productions from these technologies. The latter is often referred to as the generation stack of a region, and is carefully tracked by most market participants. FIG. 50 depicts a liquidity curve 500 characterizing spot prices as a function of net purchase and sale decisions, according to one embodiment of the invention.

Determining Optimal Dispatch Rules for a Portfolio of Generation Assets

As mentioned, once the spot price becomes a function of the dispatch decision of individual generators in the portfolio, a profit maximizing dispatch rule can no longer be determined in a distributed manner. The output of all the generators in the portfolio must be considered simultaneously. However, the dynamic constraints relating to maximum ramp rates and minimum run and down times must still be considered on an individual basis. This can be achieved by creating a single state space model for the portfolio of assets. For a portfolio with N generators, there would be 2*N states in the model, representing the output and runtimes of each individual generator. The state vector $X_h$ would be given by:

$$X_h \equiv \begin{bmatrix} Q_h^1 \\ RT_h^1 \\ \vdots \\ Q_h^N \\ RT_h^N \end{bmatrix}.$$

The effect of the dispatch decisions on the market price is captured by summing the quantity states over all the generators, $$Q_h^{Total} = \sum_{i=1}^{N} Q_h^i,$$

and then applying the liquidity function in order to determine the resulting spot price. The spot price can therefore be treated as an output variable to the model. The problem with this approach lies in the number of possible portfolio dispatch decisions at each time step. A portfolio dispatch decision can be thought of to be an N-dimensional vector ($D_h$), where each entry is the dispatch decision of an individual generator in the portfolio, $$D_h = \begin{bmatrix} D_h^1 \\ \vdots \\ D_h^i \\ \vdots \\ D_h^N \end{bmatrix}.$$

The feasible values for the decision of each generator i is constrained by the current state of that generator ($Q_h^i$, $RT_h^i$), and the operating constraints associated with it (max/min output, max ramp, min on/off times). Because the constraints are associated with each individual generator, each combination of entries in the decision vector must be considered as a possible portfolio decision. Even if the ruthless exercise method is used, there are $3^N$ unique combinations of ramp up, stay put and ramp down decisions for the generation portfolio. This is another example of how the curse of dimensionality problem causes a well posed optimization problem to become computationally intractable.

Optimizing Portfolio Dispatch Decisions

The exploding size of the decision space for a portfolio of generation assets is a significant hurdle to finding an optimal set of decision rules. To overcome this obstacle, in some embodiments, a methodology is applied which deconstructs the problem into a series of iterative steps. In each step, the perfect market problem (spot price is independent of the generators dispatch decision) is solved for each of the generators in parallel.

Between each step a set of control parameters are updated. The forward price applied in the creation of the decision rule is used for each individual generator as the control variables. In each iteration, the following methodology can be applied:

I. Calculating Schedules for an Individual Generator Using Tree Based Decision Rules.
   a. To construct the trinomial price tree for electricity prices, the user sends the market implied volatility and mean reversion rate curves for the operating period. Instead of the forward price curve, however, a control price curve is provided. This control price curve is going to be used to alter the behavior of the generator in order to maximize profits.
   b. The assets operating costs and constraints are provided.
   c. Based on the control prices and asset constraints, optimal decision rules are calculated for the operating period.
   d. Monte Carlo simulations of spot price paths in the operating period are generated based on the actual market forward prices/volatilities/mean reversion rate.
   e. The simulated price paths are passed through the decision rules, thus generating a set of simulation based operating schedules for the asset.

Figure 51:
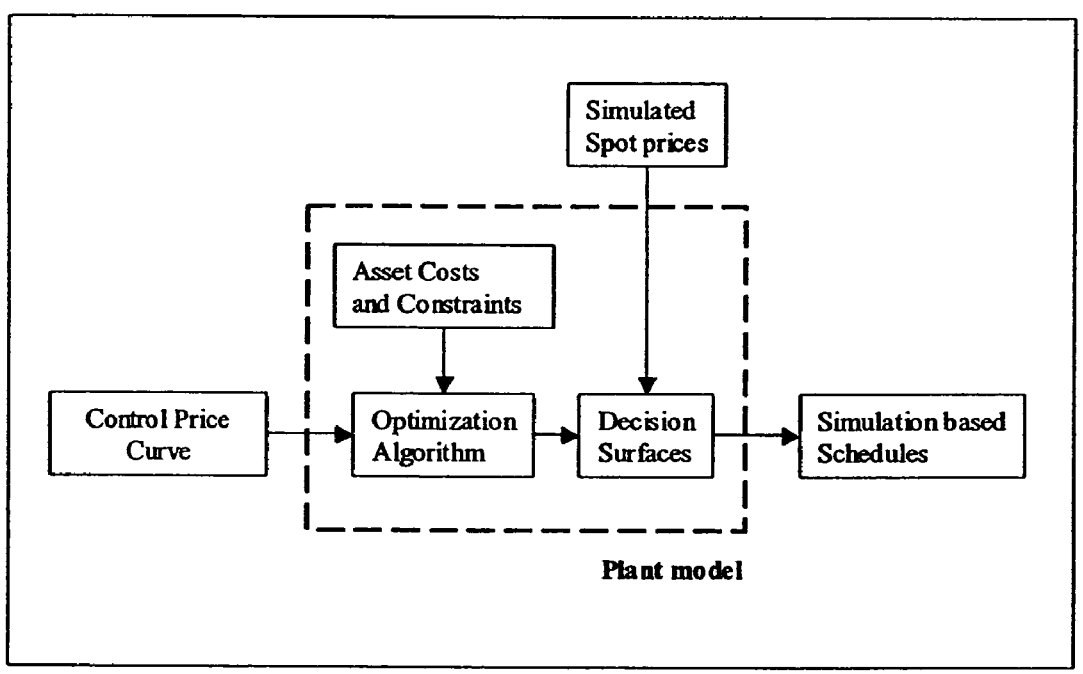
FIG. 51 depicts a block diagram of a generator portfolio operation dynamic optimization technique utilizing a plant model, according to one embodiment of the invention.

This part of the methodology, taking as inputs a control price path and simulated price paths, and generating a set of operating schedules for a given asset, will be referred to as the plant module. FIG. 51 depicts a block diagram 5100 of a generator portfolio operation dynamic optimization technique utilizing a plant model, according to one embodiment of the invention.

II. Capturing the Joint Schedules for a Group of Generators Selling into the Same Market Location.

Figure 52:
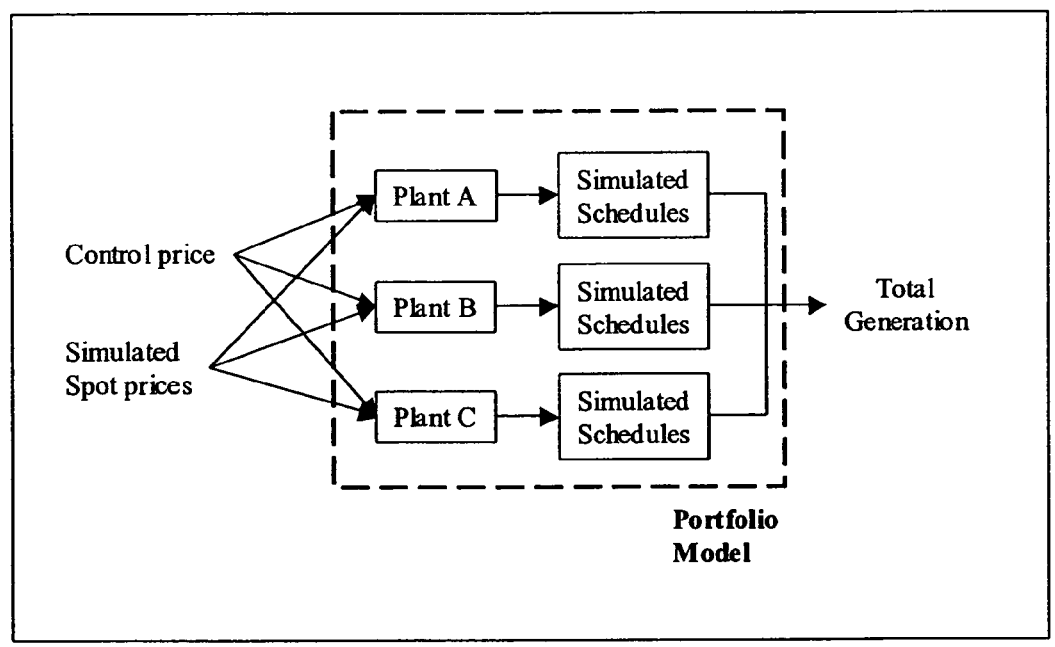
FIG. 52 depicts a block diagram of a generator portfolio operation dynamic optimization technique utilizing a generator portfolio model, according to one embodiment of the invention.

In some embodiments, the next step is to consider the aggregate behavior of a group of generators located in the same area, and therefore exposed to the same market prices. Each individual generator is characterized according to the plant module, accounting for its unique operating costs and constraints. The same set of control prices and simulated spot price paths are then send to each of the plant modules. For each simulated spot price path, the scheduled production of the individual plants are aggregated to create a total generation path over the operating period. This part of the methodology is referred to as the portfolio model. FIG. 52 depicts a block diagram 5200 of a generator portfolio operation dynamic optimization technique utilizing a generator portfolio model, according to one embodiment of the invention.

III. Incorporating Liquidity Adjustments

Figure 53:
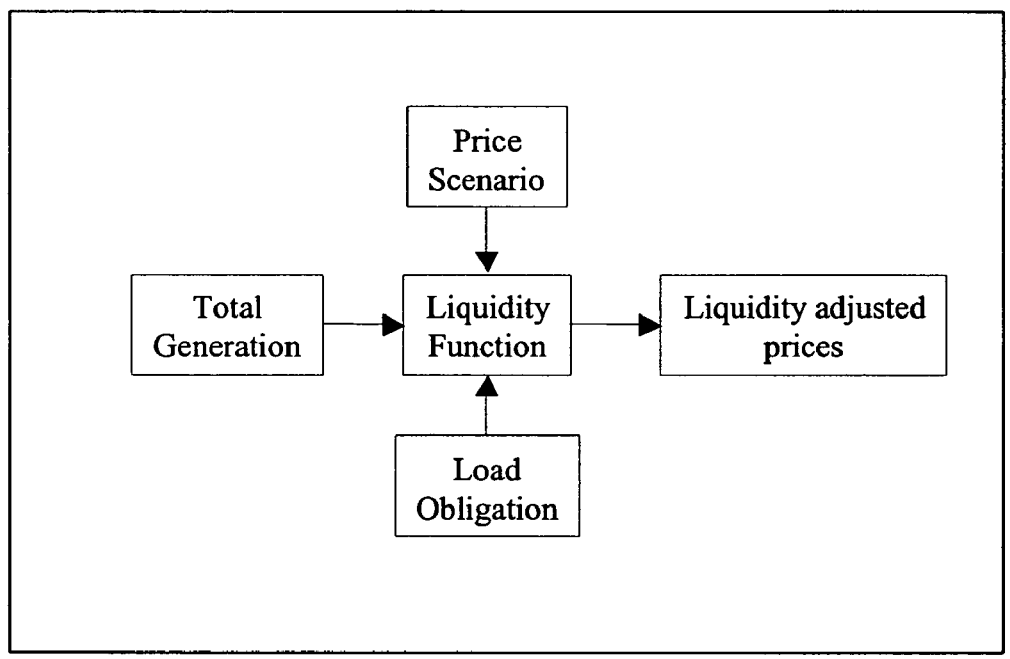
FIG. 53 depicts a generator portfolio liquidity model, according to one embodiment of the invention.

Since the producers in the market are not assumed to be price takers, the effect must be considered of the total production schedule on the market price. This effect is characterized by the liquidity function. As described in the previous section, the liquidity function returns the change in the electricity spot price as a function of the difference between the load obligation and the method of usage in this part of the world. The total generation schedules generated by the portfolio module are fed to the liquidity function, together with the associated simulated price scenario and the total load obligation. The liquidity function outputs an adjusted price curve. FIG. 53 depicts a generator portfolio liquidity model 5300, according to one embodiment of the invention.

IV. Searching for an Optimal Set of Control Prices

Figure 54:
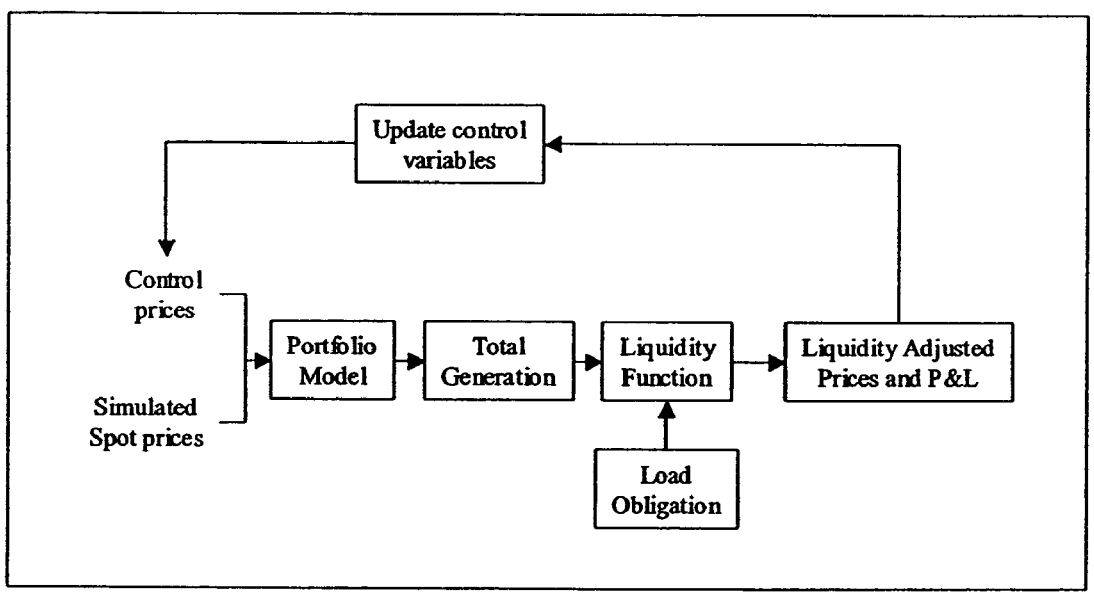
FIG. 54 depicts a block diagram of a generator portfolio operation dynamic optimization technique to determine liquidity adjusted prices as well as profit and loss, according to one embodiment of the invention; and Figure depicts 55 depicts a block diagram of generator portfolio operation dynamic optimization technique utilizing search algorithms in determining optimal shadow costs and optimal shadow prices, according to one embodiment of the invention.
Figure 55:
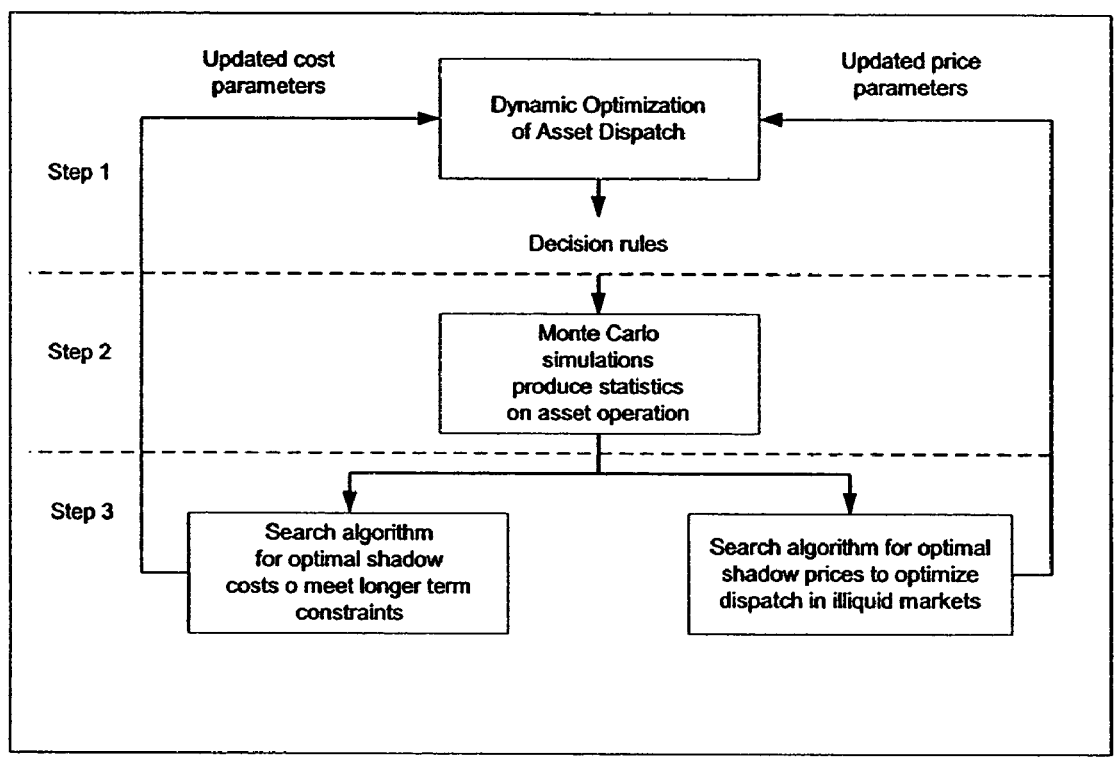

Next, all these pieces are brought together, as shown in the FIG. 54, which depicts a block diagram 5400 of a generator portfolio operation dynamic optimization technique to determine liquidity adjusted prices as well as profit and loss, according to one embodiment of the invention. In the embodiment shown, a set of simulated spot prices are fed to the model, together with a control price curve with associated volatilities and mean reversion rates. Using the control price curves, sets of decision rules are created for the individual plants. The simulated price paths are then fed through the decision rules to create schedules. Schedules are aggregated to create a set of total generation paths. Applying the generation schedule, load obligations and simulated price curves to the liquidity function, a set of liquidity adjusted price curves are created. The net profit associated with each schedule is then calculated based on the adjusted price paths. The expected profit affiliated with the current set of control prices is calculated by averaging the profit across all the simulated scenarios.

Having calculated the expected profit from a specific method, search techniques can now be applied in order to identify the control price path which will maximize the expected profit. Figure depicts 55 depicts a block diagram 5500 of generator portfolio operation dynamic optimization technique utilizing search algorithms in determining optimal shadow costs and optimal shadow prices, according to one embodiment of the invention.

Suggested Search Algorithm

In some embodiments, the optimization algorithm searches to find a set of control prices which will maximize the expected P&L from the asset. There are any number of possible algorithms which can be applied to accomplish this.

In some embodiments, to make the search efficient, it is crucial to bound the search space. There can be a simple method for this. In some embodiments, the following loop is performed:
   1. Use the current market forward price as an initial guess for the control price curve.

2. Run the algorithm as described above, but instead of a set of simulated spot prices, use only a single price scenario, equal to the market forward curve.
3. The algorithm produces a liquidity adjusted price curve based on the current forward curve, call this curve A.
4. Repeat the algorithm, this time using curve A as the control price curve.
5. The algorithm produces a liquidity adjusted price curve based on the current forward curve, call this curve B.
6. Curve A and curve B represent the upper and lower bounds for the control prices in each operating hour.

When the boundaries have been set, a simple binary or grid search algorithm can be applied in order to determine the control price path which maximizes the expected P&L from the portfolio of assets and load obligations.

The two price series, the current forward curve and the resulting price curve, represent bounds on optimal control price curve. The reasoning behind this goes as follows. Apply the new spot price curve back to the optimization function and generate a new output schedule. A positive imbalance (long position) will lower the spot price and therefore lower the net generation, thereby reducing the imbalance. Conversely a negative imbalance (short position) will increase spot prices thereby increasing the net generation, and again reducing the magnitude of the imbalance.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for facilitating joint scheduling of operation of each of a plurality of facilities for at least a first time interval of a period of time implemented at least in part on a computing system, the method comprising:
   determining a set of preliminary anticipated optimal schedules for each of the plurality of facilities, comprising:
      generating a decision tree based model for each of the plurality of facilities, each of the decision tree based models accounting for a combined effect, on the optimization of the scheduling of the operation of the respective facility, of:
         at least one specified control price path including at least one price, over the period of time, of at least one commodity associated with the operation of each of the plurality of facilities, the at least one price of the at least one commodity being affected by the operation of each of the facilities over the period of time;
         at least one specified level of uncertainty with regard to the at least one control price path; and,
         at least one specified constraint associated with at least a first state of at least one state of at least one operating parameter associated with the operation of each of the plurality of facilities; and,
      applying a dynamic optimization algorithm to the decision tree based models to determine a set of preliminary anticipated optimal schedules, the set of preliminary anticipated optimal schedules including a schedule for each of the plurality of facilities over the period of time;
   generating a set of liquidity adjusted price paths for the at least on commodity over the period of time, the set of liquidity adjusted price paths being generated based at least on the at least one specified control price path, the set of preliminary anticipated optimal schedules, and a specified liquidity function;
   utilizing an optimal control price path search algorithm that utilizes iterative performance of the determining step and the generating step with updating of the at least one control price paths according to the liquidity adjusted price paths, determining an optimal control price path and an anticipated optimal set of schedules, the anticipated optimal set of schedules including a schedule for each of the plurality of facilities;
   determining an optimal scheduling option for each of the plurality of facilities based on anticipated optimal set of schedules; and,
   storing in a memory optimal scheduling information associated with the optimal scheduling option for each of the plurality of facilities.

2. The method of claim 1, wherein one or more constraints of the at least one specified constraint are implicitly modeled.

3. The method of claim 1, wherein each of the optimal scheduling options is selected from the group consisting of ramping down a generation rate, ramping up a generation rate, and maintaining a generation rate at a steady level.

4. The method of claim 1, wherein generating a decision tree based model comprises generating a decision tree based model including one or more implicitly modeled constraints.

5. The method of claim 4, wherein generating a decision tree based model comprises generating a decision tree based model utilizing parameters consisting of a time parameter, a price parameter, generation parameter, a runtime parameter.

6. A method for determining an anticipated profitability of operation of a plurality of facilities for a period of time implemented at least in part on a computing system, the method comprising:
   determining a set of preliminary anticipated optimal schedules for each of the plurality of facilities, comprising:
      generating a decision tree based model for each of the plurality of facilities, each of the decision tree based models accounting for a combined effect, on the optimization of the scheduling of the operation of the respective facility, of:
         at least one specified control price path including at least one price, over the period of time, of at least one commodity associated with the operation of each of the plurality of facilities, the at least one price of the at least one commodity being affected by the operation of each of the facilities over the period of time;
         at least one specified level of uncertainty with regard to the at least one specified control price path; and,
         at least one specified constraint associated with at least a first state of at least one state of at least one operating parameter associated with the operation of each of the plurality of facilities; and
      applying a dynamic programming algorithm to the decision tree based models to determine a set of preliminary anticipated optimal schedules, the set of preliminary anticipated optimal schedules including a schedule for each of the plurality of facilities over the period of time;
   generating a set of liquidity adjusted price paths for the at least on commodity over the period of time, the set of liquidity adjusted price paths being generated based at least on the at least one specified control price path, the set of preliminary anticipated optimal schedules, and a specified liquidity function;

utilizing an optimal control price path search algorithm that utilizes iterative performance of the determining step and the generating step with updating of the at least one control price paths according to the liquidity adjusted price paths, determining an optimal control price path and an anticipated optimal set of schedules, the anticipated optimal set of schedules including a schedule for each of the plurality of facilities;

determining the anticipated profitability of the plurality of facilities based on the anticipated optimal set of schedules; and, storing in a memory the anticipated profitability information associated with the anticipated profitability.

7. The method of claim 6, wherein one or more constraints of the at least one specified constraint are implicitly modeled.

8. The method of claim 6, comprising determining a value of an asset based on the anticipated profitability.

9. The method of claim 6, wherein applying the dynamic programming algorithm comprises determining an optimal decision rule, for one or more of the plurality of facilities, at each of one or more nodes of each of the decision tree based models, each node representing a time in the period, and each optimal decision rule specifying an optimal dispatch option at each of the times.

10. The method of claim 6, comprising generating a set of liquidity adjusted price paths for the at least on commodity over the period of time, the set of liquidity adjusted price paths being generated based at least on the one or more at least one specified control price path, the set of preliminary schedules, load obligations, and a specified liquidity function, wherein the specified liquidity function is specified in accordance with the formula:

$$S_h = f(I_h)$$

wherein $S_h$ is a spot price for the at least one commodity at time, and $I_h$ is a net long-short position of a participant in a market for the at least one commodity, and comprising determining $I_h$ in accordance with the equation:

$$I_h = \left(\sum_i Q_h^i\right) - L_h$$

wherein $Q_h^i$ is a generation output at time interval h from a facility i of the facilities, and wherein $L_n$ is a total load obligation for time interval h from the facility i.

11. The method of claim 10, comprising generating the plurality of possible price paths utilizing Monte Carlo simulation.

12. The method of claim 6, wherein generating a decision tree based model comprises generating a decision tree based model including one or more implicitly modeled constraints.

13. The method of claim 12, wherein generating a decision tree based model comprises generating a decision tree based model utilizing parameters consisting of a time parameter, a price parameter, generation parameter, a runtime parameter.

14. A computer usable medium storing program code which, when executed by a computer, causes the computer to execute a computerized method for facilitating joint scheduling of operation of each of a plurality of facilities for at least a first time interval of a period of time, the method comprising:

determining a set of preliminary anticipated optimal schedules for each of the plurality of facilities, comprising:

generating a decision tree based model for each of the plurality of facilities, each of the decision tree based models accounting for a combined effect, on the optimization of the scheduling of the operation of the respective facility, of:

at least one specified control price path including at least one price, over the period of time, of at least one commodity associated with the operation of each of the plurality of facilities, the at least one price of the at least one commodity being affected by the operation of each of the facilities over the period of time;

at least one specified level of uncertainty with regard to the at least one specified control price path; and, at least one specified constraint associated with at least a first state of at least one state of at least one operating parameter associated with the operation of each of the plurality of facilities; and, applying a dynamic optimization algorithm to the decision tree based models to determine a set of preliminary anticipated optimal schedules, the set of preliminary anticipated optimal schedules including a schedule for each of the plurality of facilities over the period of time;

generating a set of liquidity adjusted price paths for the at least on commodity over the period of time, the set of liquidity adjusted price paths being generated based at least on the at least one specified control price path, the set of preliminary anticipated optimal schedules, and a specified liquidity function;

utilizing an optimal control price path search algorithm that utilizes iterative performance of the determining step and the generating step with updating of the at least one control price paths according to the liquidity adjusted price paths, determining an optimal control price path and an anticipated optimal set of schedules, the anticipated optimal set of schedules including a schedule for each of the plurality of facilities;

determining an optimal scheduling option for each of the plurality of facilities based on anticipated optimal set of schedules; and, storing in a memory optimal scheduling information associated with the optimal scheduling option for each of the plurality of facilities.

15. The computer usable medium of claim 14, wherein one or more constraints of the at least one specified constraint are implicitly modeled.

16. A computer usable medium storing program code which, when executed by a computer, causes the computer to execute a computerized method for determining an anticipated profitability of operation of a plurality of facilities for a period of time, the method comprising:

determining a set of preliminary anticipated optimal schedules for each of the plurality of facilities, comprising:

generating a decision tree based model for each of the plurality of facilities, each of the decision tree based models accounting for a combined effect, on the optimization of the scheduling of the operation of the respective facility, of:

at least one specified control price path including at least one price, over the period of time, of at least one commodity associated with the operation of each of the plurality of facilities, the at least one price of the at least one commodity being affected by the operation of each of the facilities over the period of time;

at least one specified level of uncertainty with regard to the at least one specified control price path; and, at least one specified constraint associated with at least a first state of at least one state of at least one operating parameter associated with the operation of each of the plurality of facilities; and applying a dynamic programming algorithm to the decision tree based models to determine a set of preliminary anticipated optimal schedules, the set of preliminary anticipated optimal schedules including a schedule for each of the plurality of facilities over the period of time;

generating a set of liquidity adjusted price paths for the at least on commodity over the period of time, the set of liquidity adjusted price paths being generated based at least on the at least one specified control price path, the set of preliminary anticipated optimal schedules, and a specified liquidity function;

utilizing an optimal control price path search algorithm that utilizes iterative performance of the determining step and the generating step with updating of the at least one control price paths according to the liquidity adjusted price paths, determining an optimal control price path and an anticipated optimal set of schedules, the anticipated optimal set of schedules including a schedule for each of the plurality of facilities;

determining the anticipated profitability of the plurality of facilities based on the anticipated optimal set of schedules; and, storing in a memory anticipated profitability information associated with the anticipated profitability of the plurality of facilities.

17. The computer usable medium of claim 16, wherein one or more constraints of the at least one specified constraint are implicitly modeled.

18. A system for facilitating joint scheduling of operation of each of a plurality of facilities for at least a first time interval of a period of time, the system comprising:

means for determining a set of preliminary anticipated optimal schedules for each of the plurality of facilities, comprising:

means for generating a decision tree based model for each of the plurality of facilities, each of the decision tree based models accounting for a combined effect, on the optimization of the scheduling of the operation of the respective facility, of:

at least one specified control price path including at least one price, over the period of time, of at least one commodity associated with the operation of each of the plurality of facilities, the at least one price of the at least one commodity being affected by the operation of each of the facilities over the period of time;

at least one specified level of uncertainty with regard to the at least one specified control price path; and, at least one specified constraint associated with at least a first state of at least one state of at least one operating parameter associated with the operation of each of the plurality of facilities; and, means for applying a dynamic optimization algorithm to the decision tree based models to determine a set of preliminary anticipated optimal schedules, the set of preliminary anticipated optimal schedules including a schedule for each of the plurality of facilities over the period of time;

means for generating a set of liquidity adjusted price paths for the at least on commodity over the period of time, the set of liquidity adjusted price paths being generated based at least on the at least one specified control price path, the set of preliminary anticipated optimal schedules, and a specified liquidity function;

means for utilizing an optimal control price path search algorithm that utilizes iterative performance of the determining step and the generating step with updating of the at least one control price paths according to the liquidity adjusted price paths, determining an optimal control price path and an anticipated optimal set of schedules, the anticipated optimal set of schedules including a schedule for each of the plurality of facilities;

means for determining an optimal scheduling option for each of the plurality of facilities based on anticipated optimal set of schedules; and means for storing in a memory optimal scheduling option information associated with the optimal scheduling option for each of the plurality of facilities.

19. The system of claim 18, wherein one or more constraints of the at least one specified constraint are implicitly modeled.

20. A system for determining an anticipated profitability of operation of a plurality of facilities for a period of time, the system comprising:

means for determining a set of preliminary anticipated optimal schedules for each of the plurality of facilities, comprising:

means for generating a decision tree based model for each of the plurality of facilities, each of the decision tree based models accounting for a combined effect, on the optimization of the scheduling of the operation of the respective facility, of:

at least one specified control price path including at least one price, over the period of time, of at least one commodity associated with the operation of each of the plurality of facilities, the at least one price of the at least one commodity being affected by the operation of each of the facilities over the period of time;

at least one specified level of uncertainty with regard to the at least one specified control price path; and, at least one specified constraint associated with at least a first state of at least one state of at least one operating parameter associated with the operation of each of the plurality of facilities; and means for applying a dynamic programming algorithm to the decision tree based models to determine a set of preliminary anticipated optimal schedules, the set of preliminary anticipated optimal schedules including a schedule for each of the plurality of facilities over the period of time;

means for generating a set of liquidity adjusted price paths for the at least on commodity over the period of time, the set of liquidity adjusted price paths being generated based at least on the at least one specified control price path, the set of preliminary anticipated optimal schedules, and a specified liquidity function;

means for utilizing an optimal control price path search algorithm that utilizes iterative performance of the determining step and the generating step with updating of the at least one control price paths according to the liquidity adjusted price paths, determining an optimal control price path and an anticipated optimal set of schedules, the anticipated optimal set of schedules including a schedule for each of the plurality of facilities;

means for determining the anticipated profitability of the plurality of facilities based on the anticipated optimal set of schedules; and, means for storing in a memory anticipated profitability information associated with the anticipated profitability of the plurality of facilities.

21. The system of claim 20, wherein one or more constraints of the at least one specified constraint are implicitly modeled.

22. A system for facilitating joint scheduling of operation of each of a plurality of facilities for at least a first time interval of a period of time, the system comprising:

a processor; and memory accessible by the processor;

wherein the processor is programmed for:

determining a set of preliminary anticipated optimal schedules for each of the plurality of facilities, comprising:

generating a decision tree based model for each of the plurality of facilities, each of the decision tree based models accounting for a combined effect, on the optimization of the scheduling of the operation of the respective facility, of:

at least one specified control price path including at least one price, over the period of time, of at least one commodity associated with the operation of each of the plurality of facilities, the at least one price of the at least one commodity being affected by the operation of each of the facilities over the period of time;

at least one specified level of uncertainty with regard to the at least one specified control price path; and, at least one specified constraint associated with at least a first state of at least one state of at least one operating parameter associated with the operation of each of the plurality of facilities; and, applying a dynamic optimization algorithm to the decision tree based models to determine a set of preliminary anticipated optimal schedules, the set of preliminary anticipated optimal schedules including a schedule for each of the plurality of facilities over the period of time;

generating a set of liquidity adjusted price paths for the at least on commodity over the period of time, the set of liquidity adjusted price paths being generated based at least on the at least one specified control price path, the set of preliminary anticipated optimal schedules, and a specified liquidity function;

utilizing an optimal control price path search algorithm that utilizes iterative performance of the determining step and the generating step with updating of the at least one control price paths according to the liquidity adjusted price paths, determining an optimal control price path and an anticipated optimal set of schedules, the anticipated optimal set of schedules including a schedule for each of the plurality of facilities; and, determining an optimal scheduling option for each of the plurality of facilities based on anticipated optimal set of schedules.

23. The system of claim 22, wherein one or more constraints of the at least one specified constraint are implicitly modeled.

24. A method for facilitating joint scheduling of operation of each of a plurality of facilities for at least a first time interval of a period of time implemented at least in part on a computing system, the method comprising:

determining a set of anticipated optimal schedules for each of the plurality of facilities, comprising:

generating a decision tree based model for each of the plurality of facilities, each of the decision tree based models accounting for a combined effect, on the optimization of the scheduling of the operation of the respective facility, of:

at least one specified control price path including at least one price, over the period of time, of at least one commodity associated with the operation of each of the plurality of facilities, the at least one price of the at least one commodity being affected by the operation of each of the facilities over the period of time;

at least one specified level of uncertainty with regard to the at least one control price path, said at least one specified level of uncertainty comprising a level of reversion rate and a level of volatility; and at least one specified constraint associated with at least a first state of at least one state of at least one operating parameter associated with the operation of each of the plurality of facilities; and iteratively applying a dynamic optimization algorithm to the decision tree based models to determine a set of anticipated optimal schedules including a schedule for each of the plurality of facilities over the period of time, comprising, at each iteration:

updating the at least one specified control price path; and applying the dynamic optimization algorithm utilizing the updated at least one specified control price path; and generating a set of liquidity adjusted price paths for the at least one commodity over the period of time, the set of liquidity adjusted price paths being generated based at least on the at least one specified control price path, the set of preliminary anticipated optimal schedules, and a specified liquidity function;

utilizing an optimal control price path search algorithm that utilizes iterative performance of the determining step and the generating step with updating of the at least one control price paths according to the liquidity adjusted price paths, determining an optimal control price path and an anticipated optimal set of schedules, the anticipated optimal set of schedules including a schedule for each of the plurality of facilities;

determining an optimal scheduling option for each of the plurality of facilities based on the set of anticipated optimal schedules; and storing in a memory optimal scheduling information associated with the optimal scheduling option for each of the plurality of facilities.

25. The method of claim 24, wherein generating a decision tree based model comprises generating an asset model and a market model.

26. The method of claim 24, wherein iteratively applying a dynamic optimization algorithm comprises applying a dynamic optimization algorithm comprising logic for updating the at least one specified control price path based on results from a previous iteration.

* * * * *